(12) United States Patent
Takahashi et al.

(10) Patent No.: US 7,952,659 B2
(45) Date of Patent: May 31, 2011

(54) COLOR FILTER, METHOD OF FABRICATING THE SAME AND LIQUID-CRYSTAL DISPLAY DEVICE

(75) Inventors: Sounosuke Takahashi, Kanagawa (JP); Yoshikazu Sakaguchi, Kanagawa (JP); Shinichi Nishida, Kanagawa (JP); Mamoru Okamoto, Kanagawa (JP)

(73) Assignee: NEC Corporation, Tokyo (JP)

( * ) Notice: Subject to any disclaimer, the term of this patent is extended or adjusted under 35 U.S.C. 154(b) by 1093 days.

(21) Appl. No.: 11/723,317

(22) Filed: Mar. 19, 2007

(65) Prior Publication Data

US 2007/0216832 A1    Sep. 20, 2007

(30) Foreign Application Priority Data

Mar. 20, 2006   (JP) .................................. 2006-077483

(51) Int. Cl.
   *G02F 1/1335*   (2006.01)
(52) U.S. Cl. ....................................................... 349/106
(58) Field of Classification Search .................. 349/106, 349/109
   See application file for complete search history.

(56) References Cited

U.S. PATENT DOCUMENTS

| | | | |
|---|---|---|---|
| 2004/0189895 A1* | 9/2004 | Chen et al. ..................... | 349/106 |
| 2005/0253984 A1 | 11/2005 | Kim et al. | |
| 2007/0002218 A1* | 1/2007 | Park et al. ..................... | 349/106 |

FOREIGN PATENT DOCUMENTS

| | | |
|---|---|---|
| CN | 1677207 | 10/2005 |
| JP | 62-181927 | 11/1987 |
| JP | 8-95021 | 4/1996 |
| JP | 2590858 | 12/1996 |
| JP | 2000-29014 | 1/2000 |
| JP | 2002-82630 | 3/2002 |
| JP | 2003-14917 | 1/2003 |
| JP | 2005-241923 | 9/2005 |

OTHER PUBLICATIONS

Chinese Office Action dated Oct. 30, 2009, with partial English translation.

* cited by examiner

*Primary Examiner* — Richard H Kim
(74) *Attorney, Agent, or Firm* — McGinn IP Law Group, PLLC

(57) ABSTRACT

A color filter having two-layered light-shielding sections without a black matrix is provided, which reduces the level difference from the colored materials for pixels with a simple method and makes it possible to remove the color layer on the said sections. A red color layer having stripe-shaped red pixel formation sections and a blue color layer having stripe-shaped blue pixel formation sections are overlapped to form two-layered light-shielding sections. A green color layer having island-shaped green pixel formation sections is overlapped with the red and blue color layers, placing the green pixel formation sections in the overlapped green pixel windows of the red and blue color layers. Only the peripheries of the green pixel formation sections are placed on the light-shielding sections to facilitate the removal of the peripheries by polishing.

25 Claims, 23 Drawing Sheets

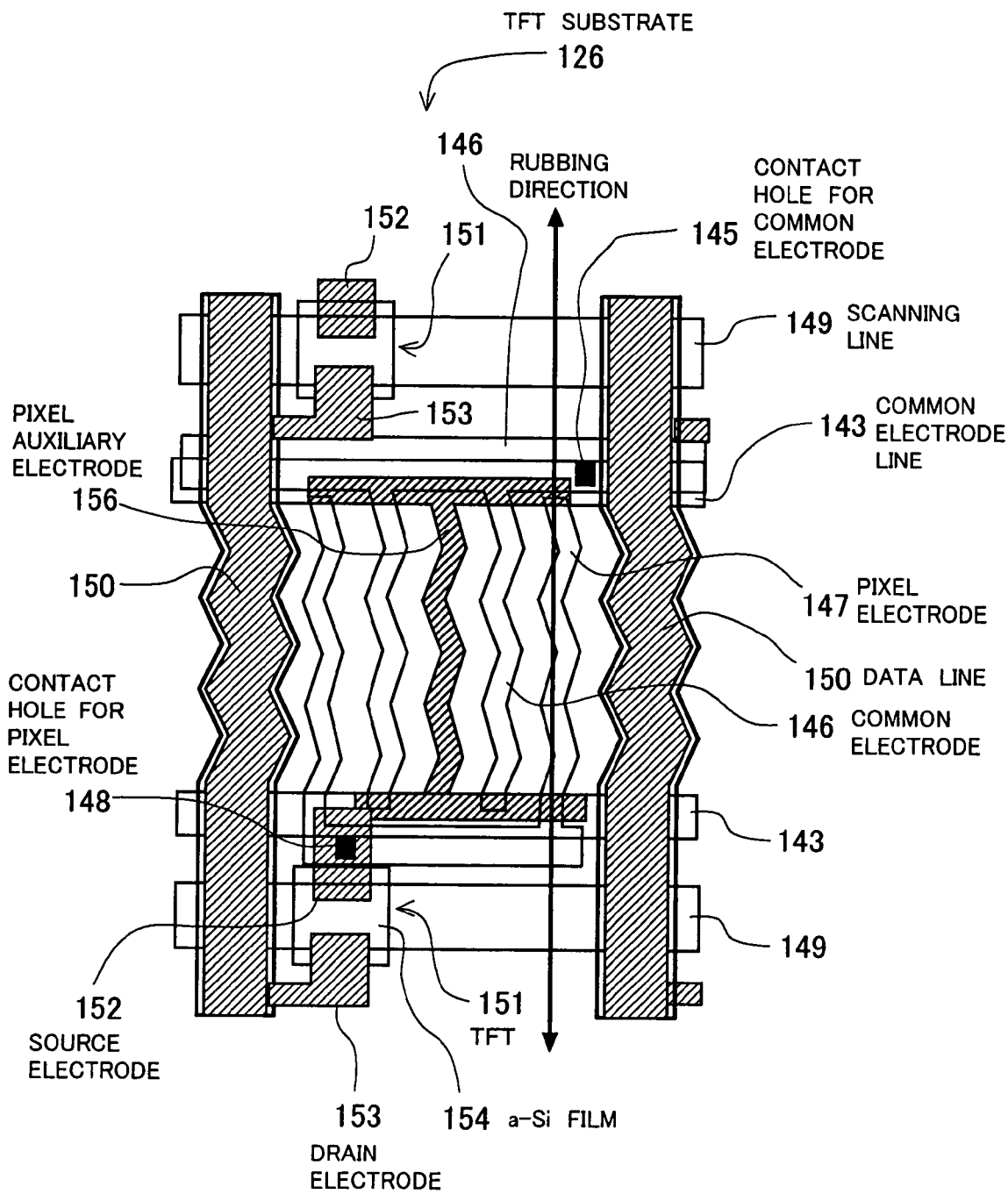

COLOR FILTER, METHOD OF FABRICATING THE SAME AND LIQUID-CRYSTAL DISPLAY DEVICE

BACKGROUND OF THE INVENTION

1. Field of the Invention

The present invention relates to a color filter and more particularly, to a color filter whose light-shielding sections are formed by overlapping two different color layers without using a black matrix, a method of fabricating the color filter, and a Liquid-Crystal Display (LCD) device using the said color filter.

The present invention is applicable to not only LCD devices of various types but also any other devices using a color filter, such as field-emission type display devices, vacuum fluorescent display devices, plasma display devices and image pickup devices.

2. Description of the Related Art

Conventionally, the color filter used for LCD devices comprises colored materials of red (R), blue (B) and green (G) arranged in the respective openings for the pixels to have a predetermined layout (e.g., mosaic, stripe, or delta layout), and a patterned black matrix (which is made of black resin or metal oxide) formed in the light-shielding sections other than the openings. The main reason why the black matrix is used is to raise the contrast, to prevent the mixture among the red, blue, and green colored materials, and to shield the light toward the semiconductor films of the TFTs (Thin-Film Transistors).

With the LCD devices for cellular phones and small-sized LCD devices, essential contrast is not so high. Therefore, no black matrix is used; alternatively, light-shielding sections are formed by partially overlapping the colored materials located in the adjoining openings to realize a light-shielding function similar to that of the black matrix. This is because there is an advantage that the materials, process steps and fabrication cost are reduced since the black matrix is not used.

On the other hand, with the LCD devices for display monitors for personal computers or televisions (TVs), high contrast is essential. Therefore, to omit the black matrix, a structure having an equivalent light-shielding function to that of the black matrix is required. However, if an equivalent light-shielding function to that of the black matrix is obtained by overlapping the colored materials located in the adjoining openings in the typical color filter including colored materials of three primary colors (i.e., red, blue and green), the light-shielding performance of the overlapped parts (stacked parts) of the red and green colored materials is lower than that of the overlapped parts of the other colored materials. This means that the backlight is unable to be shielded sufficiently. For this reason, various ideas have ever been presented and announced to solve this problem.

For example, the Japanese Non-Examined Patent Publication No. 2000-29014 discloses a color filter substrate, which realizes the light-shielding function in the frame area that surrounds the effective display region without the black matrix. With this color filter substrate, three colored layers of red, green and blue are formed in the effective display region and at the same time, two or three of the red, green and blue colored layers are overlapped to form the light-shielding layers in the frame area. In the Publication No. 2000-29014, it is said that the red and blue colored layers are preferably overlapped to realize the light-shielding function. This is because when the red and blue colored layers are overlapped with each other, its transmittance of light can be lowered compared with the areas where the green and blue colored layers are overlapped or the red and green ones are overlapped. In addition, it is said in the Publication No. 2000-29014 that the inter-pixel shielding of light in the effective display region is conducted by overlapping the red and green colored layers, the green and blue colored layers, or the blue and red colored layers (See claims 1 to 2 and FIG. 1).

Therefore, with the color filter substrate of the Publication No. 2000-29014, the inter-pixel light-shielding sections in the effective display region have a two-layer structure of two adjacent ones of the red, blue, and green colored layers. On the other hand, the light-shielding sections in the frame area have a three-layer structure of the red, blue, and green colored layers or a two-layer structure of two adjacent ones thereof.

The Japanese Non-Examined Utility-Model Publication No. 62-181927 discloses a color LCD device, where color images are displayed with three primary colors (i.e., red, green and blue) while the background region is made black. The feature of this device is as follows: Three color filters are provided to realize three primary colors on different surfaces of the substrate and polarizer. One of these color filters is formed on the whole surface for a display color and the two remaining color filters are formed in the background region alone. The background region is made black with a three-layer structure of the three color filters overlapped (See claim 1 and FIG. 1).

With the LCD device of the Publication No. 62-181927, since the background region to be made black is constituted by the three-layer structure of the three primary color filters, the inter-pixel light-shielding sections have a three-layer structure of the said color filters.

The Japanese Patent No. 2590858 (which corresponds to the Japanese Non-Examined Patent Publication No. 63-187277) discloses a color filter, which comprises colored patterns of red, green and blue, and black patterns, all of which are arranged on a transparent support. The black patterns, which are placed in the peripheral area of the screen, are formed by overlapping the three colored layers of red, green and blue, or the two colored layers thereof. The feature of this color filter is as follows: In the boundary and adjacent areas of the respective colored patterns of red, green and blue, the black patterns are formed by overlapping the three colored layers of red, green and blue. On the other hand, in the peripheral area of the screen, the black patterns are formed by overlapping the two colored layers of red and blue (See claim 1 and FIGS. 1 to 4).

Therefore, with the color filter of the U.S. Pat. No. 2,590,858, the inter-pixel light-shielding sections in the display region have a three-layer structure of the red, blue, and green colored layers, and the frame area is formed by a two-layer structure of red and blue colored layers.

The Japanese Non-Examined Patent Publication No. 08-095021 discloses a method of fabricating a color filter, where the black matrix layer is formed by overlapping the transparent colored layers during the process of forming the respective colored layers to obtain a color filter with good flatness. The feature of this method is as follows: The three-layered black matrix layer is formed by using a photomask with half-tone masking regions corresponding to the light-shielding sections at the same time as the formation of the three colored layers of red, green and blue (See claim 1 and FIGS. 1 to 2).

With the color filter fabricated by the method of the Publication No. 08-095021, both the inter-pixel light-shielding sections in the display region and the light-shielding sections in the frame area have a three-layer structure of the red, blue, and green colored layers.

The Japanese Non-Examined Patent Publication No. 2003-014917 discloses three color filters as follows (See claims 1 to 3 and FIGS. 1 to 2).

(i) A first one of the color filters comprises pixels formed and arranged by colored layers on a transparent substrate, where the frame area, which is located in the periphery of the display region, is formed by at least two ones of the colored layers. The feature of this color filter is that the red colored layer has an average transmittance of 1% or less in the wavelength region of 460 to 570 nm.

(ii) A second one of the color filters comprises pixels formed and arranged by colored layers on a transparent substrate, where the frame area is formed by at least two ones of the colored layers. The feature of this color filter is that the blue colored layer has an average transmittance of 1% or less in the wavelength region of 560 to 750 nm.

(iii) A third one of the color filters comprises pixels formed and arranged by colored layers on a transparent substrate, where the frame area is formed by at least two ones of the colored layers. The feature of this color filter is that each of the red and blue colored layers has an average transmittance of 2.5% or less in the wavelength region of 555 to 575 nm.

In the Publication No. 2003-014917, it is said that high OD (Optical Density) values can be obtained by only the stacked or overlapped structure of the colored layers in the frame area and the light-shielding sections opposite to the TFTs. With these filters, the frame area, the inter-pixel light-shielding sections, and the light-shielding sections opposite to the TFTs are formed by a three-layer structure of the red, blue, and green colored layers, or a two-layer structure thereof.

The Japanese Non-Examined Patent Publication No. 2002-082630 discloses two electrooptic devices as follows (See claims 1 to 2 and FIGS. 1 to 2):

(i) A first one of the electrooptic devices comprises TFTs, and light-shielding sections formed by overlapping a first colored layer and a second colored layer, wherein the light-shielding sections are overlapped with at least the channel formation regions of the TFTs.

(ii) A second one of the electrooptic devices comprises pixel electrodes, and light-shielding sections formed by overlapping a first colored layer and a second colored layer, wherein the light-shielding sections are by overlapped with the intervening areas between one of the pixel electrodes and another adjacent thereto.

In the Publication No. 2002-082630, it is said that the first colored layer is preferably blue and the second colored layer is preferably red. With these two electrooptic devices, the light-shielding sections corresponding to the channel formation regions of the TFTs or the inter-pixel light-shielding sections have a two-layer structure formed by two of the red, blue, and green colored layers.

As described above, various ideas have ever been presented and announced to realize sufficient shielding performance of backlight without the black matrix.

By the way, according to the sRGB (standard RGB) or EBU (European Broadcasting Union) standard, required color reproductivity for the display monitors for personal computers and the LCD devices for TV is 72% of the NTSC (National Television System Committee) standard or higher. Therefore, in the case of the combination of a color filter using photosensitive color resists formed by the popular pigment dispersion method and a backlight unit using cold-cathode fluorescent lamps (CCFLs), each of the red, green, and blue color layers has a thickness of 1.8 to 2.0 μm. For this reason, if the whole black matrix is replaced with the three-layered light-shielding sections formed by overlapping the red, green, and blue color layers, the level difference will be 3.6 to 4.0 μm at the maximum in the vicinities of the frame area. Here, the level difference means the difference between the thickness of the pixels (which are formed by one of the red, green, and blue color layers) and the thickness of the light-shielding sections (which are formed by three of the red, green, and blue color layers).

In recent years, there is the growing need to speed the response characteristic of the LCD device up. To answer this need, it is necessary for the cell gap (i.e., the thickness of the liquid-crystal layer) of the LCD panel to be equal to 4.0 μm or lower, preferably, at approximately 3.0 μm. If the cell gap is decreased to such a value, the thickness difference (3.6 to 4.0 μm at the maximum), i.e., the level difference between the pixels and the light-shielding sections, will be greater than the cell gap (3.0 μm or less). Thus, with the color filters for the display monitors for personal computers and the LCD devices for TV that necessitates high-speed response characteristics, the light-shielding sections are unable to be formed by the layered structure of the three color layers. This means that the light-shielding sections need to be formed by the layered structure of the two color layers.

FIGS. 1A, 1B and 1C show an example of the prior-art color filters used for the LCD devices of this type, where the light-shielding sections are formed by two different color layers overlapped. FIG. 1A is an explanatory partial plan view showing the pattern of the red color layer used in this color filter, FIG. 1B is an explanatory partial plan view showing the pattern of the blue color layer thereof, and FIG. 1C is an explanatory partial plan view showing the pattern of the green color layer thereof. FIG. 2 is an explanatory partial plan view of the prior-art color filter constituted by the red, blue and green color layers shown in FIGS. 1A, 1B, and 1C.

The red color layer 101 used for this prior-art color filter is formed on a surface (X-Y plane) of a transparent glass plate (not shown). The layer 101 comprises stripe-shaped red pixel formation sections 101R and connection sections 101L, as shown in FIG. 1A.

The stripe-shaped red pixel formation sections 101R are extended along the Y direction (vertical direction in FIG. 1A) and arranged along the X direction (horizontal direction in FIG. 1A) at predetermined intervals. The sections 101R are used for forming rectangular red pixels arranged in the Y direction at predetermined intervals. Thus, it may be said that each of the sections 101R is formed by red pixels and red inter-pixel parts that interconnect the adjoining red pixels.

The connection sections 101L interconnect the adjoining red pixel formation sections 101R. Moreover, the connection sections 101L define rectangular blue pixel windows 101B arranged along the Y direction at predetermined intervals and rectangular green pixel windows 101G arranged along the Y direction at predetermined intervals. Each of the blue pixel windows 101B is located at a position where a blue pixel is to be formed. Each of the green pixel windows 101G is located at a position where a green pixel is to be formed.

Accordingly, the red pixels are aligned along the Y direction at predetermined intervals. The green pixels are aligned along the Y direction at the same intervals as the red pixels in such a way as to be adjacent to the red pixels. The blue pixels are aligned along the Y direction at the same intervals as the red pixels in such a way as to be adjacent to the green pixels. This layout or arrangement of the red, green and blue pixels thus aligned is repeatedly aligned along the X direction.

The blue color layer 102 used for the prior-art color filter of FIGS. 1A to 1C is formed on the surface of the glass plate to be overlapped with the red color layer 101. The layer 102 comprises stripe-shaped blue pixel formation sections 102B and connection sections 102L, as shown in FIG. 1B.

The stripe-shaped blue pixel formation sections 102B are extended along the Y direction and arranged along the X direction at predetermined intervals. The sections 102B, which are located on such positions as to be superposed on the corresponding blue pixel windows 101B of the red color layer 101, are used for forming rectangular blue pixels arranged in the Y direction at predetermined intervals. Thus, it may be said that each of the sections 102B is formed by blue pixels and blue inter-pixel parts that interconnect the adjoining blue pixels.

The connection sections 102L interconnect the adjoining blue pixel formation sections 102B. Moreover, the connection sections 102L define rectangular red pixel windows 102R arranged along the Y direction at predetermined intervals and rectangular green pixel windows 102G arranged along the Y direction at predetermined intervals. Each of the red pixel windows 102R is located at a position where a red pixel is to be formed. Each of the green pixel windows 102G is located at a position where a green pixel is to be formed.

Accordingly, the red pixel windows 102R are located at such positions as to be superposed on the corresponding red pixel formation sections 101R of the red color layer 101. The green pixel windows 102G are located at such positions as to be superposed on the corresponding green pixel windows 101G of the red color layer 101.

The green color layer 103 used for the prior-art color filter of FIGS. 1A to 1C is formed on the surface of the glass plate to be overlapped with the red and blue color layers 101 and 102. The layer 103 comprises stripe-shaped green pixel formation sections 103G, as shown in FIG. 1C. Unlike the red and blue color layers 101 and 102, the green color layer 103 does not have connection sections like the connection sections 101L and 102L.

The stripe-shaped green pixel formation sections 103G are extended along the Y direction and arranged along the X direction at predetermined intervals. The sections 103G, which are located on such positions as to be superposed on the corresponding green pixel windows 101G of the red color layer 101 and the corresponding green pixel windows 102G of the blue color layer 102, are used for forming rectangular green pixels arranged in the Y direction at predetermined intervals. Thus, it may be said that each of the sections 103G is made of green pixels and green inter-pixel parts that interconnect the adjoining green pixels.

The above-described prior-art color filter of FIGS. 1A to 1C, which is fabricated by overlapping the red, blue, and green color layers 101, 102, and 103 with the above-described patterns in this order, has the structure as shown in FIG. 2.

As seen from FIG. 2, the stripe-shaped red pixel formation sections 101R of the red color layer 101 are overlapped with the corresponding red pixel windows 102R of the blue color layer 102, thereby defining the red pixels. This means that the exposed parts of the red pixel formation sections 101R from the corresponding red pixel windows 102R form the red pixels.

Similarly, the stripe-shaped blue pixel formation sections 102B of the blue color layer 102 are overlapped with the corresponding blue pixel windows 102B of the red color layer 101, thereby defining the blue pixels. This means that the parts of the blue pixel formation sections 102B located inside the corresponding blue pixel windows 102B form the blue pixels.

The stripe-shaped green pixel formation sections 103G of the green color layer 103 are overlapped with the corresponding green pixel windows 101G of the red color layer 101 and the corresponding green pixel windows 102G of the blue color layer 102, thereby defining the green pixels. This means that the parts of the green pixel formation sections 103G located inside the overlapped, corresponding green pixel windows 101G and 102G form the blue pixels.

The red inter-pixel parts of the stripe-shaped red pixel formation sections 101R of the red color layer 101 are overlapped with the corresponding connection sections 102L of the blue layer 102 or the corresponding blue inter-pixel parts of the stripe-shaped blue pixel formation sections 102B thereof, thereby forming two-layer-structured light-shielding sections. These light-shielding sections, which have the two-layer structure formed by overlapping the red and blue color layers 101 and 102, have the same pattern as the black matrix. However, the green inter-pixel parts of the green color layer 103 are overlapped with both the corresponding connection sections 101L of the red color layer 101 and the corresponding connection sections 102L of the blue color layer 102. Therefore, the light-shielding sections located at these positions have the three-layer structure of the red, blue and green color layers 101, 102 and 103.

The cross-sectional structure along the IIIA-IIIA line of FIG. 2 (i.e., the cross-sectional structure of the part including the green pixel formation section 103G) is shown in FIG. 3A. As shown in FIG. 3A, the red, blue and green color layers 101, 102 and 103 are overlapped in this order on the surface of the glass plate 109. An overcoat layer 123 is formed on the green color layer 103. At the positions located over the three-layered light-shielding sections 133 (which are disposed right over the corresponding green inter-pixel parts of the green color layer 103), photo spacers 120 are formed on the overcoat layer 123. These photo spacers 120 are formed by patterning a known photoresist (photosensitive resin) film.

As clearly seen from FIG. 3A, the light-shielding section 133 has the three-layer structure formed by overlapping the red, blue, and green color layers 101, 102 and 103. The photo spacers 120 are formed on the overcoat layer 123 that covers the color layers 101, 102 and 103. Thus, there is a level difference "h" between the green pixel formed by the green color layer 103 (i.e., the green pixel formation section 103G) and the adjoining light-shielding section 133 thereto, where the level difference "h" is approximately equal to the sum of the thicknesses of the red and blue color layers 101 and 102.

The widths of the blue inter-pixel parts of the blue color layer 102 and the connection sections 102L thereof are slightly larger than the widths of the red inter-pixel parts of the red color layer 101 and the connection sections 101L thereof. Therefore, as shown in FIG. 3A, the both edges of the blue inter-pixel parts of the blue color layer 102 and the connection sections 102L thereof, which are placed on the red inter-pixel parts of the red color layer 101 or the connection sections 101L thereof, are contacted with the surface of the glass plate 109.

The state where a TFT substrate 126 is coupled with the color filter with the structure of FIG. 3A is shown in FIG. 3B. In this state, as clearly seen from FIG. 3A, the cell gap "c" is equal to the sum of the level difference "h" and the height of the photo spacers 120.

FIG. 4A shows the state where the positions of the photo spacers 120 are changed to those located over the blue color layer 102 in the above-described prior-art color filter of FIG. 2. The cross-sectional structure along the VA-VA line in FIG. 4A (i.e., the cross-sectional structure of the part including the blue pixel formation section 102B of the layer 102) is shown in FIG. 5A.

At the positions shown in FIG. 5A, the light-shielding sections 133a have the two-layer structure comprising the red and blue color layers 101 and 102. Thus, the level difference "i" between the blue pixels and the light-shielding sections 133a adjoining thereto is approximately equal to the thickness of the red color layer 101. The level difference "i" is smaller than the level difference "h" (see FIGS. 3A and 3B) between the green pixels and the light-shielding sections 133 adjoining thereto by the thickness of the green color layer 103.

The state where the TFT substrate 126 is coupled with the color filter of FIG. 4A is shown in FIG. 5B. In this state, as clearly seen from FIG. 5B, the cell gap "c" is equal to the sum of the level difference "i" and the height of the photo spacers 120. However, the level difference "i" is smaller than the level difference "h". Therefore, the height of the photo spacers 120 can be increased by the gap between the differences "h" and "i".

The cross-sectional structure along the VIA-VIA line of FIG. 4A (i.e., the cross-sectional structure of the part including the green pixel formation section 103G) is shown in FIG. 6A. This structure is the same as that of FIG. 3A except that the photo spacers 120 do not exist. Therefore, the level difference "j" of FIG. 6A is the same as much as the level difference "h" of FIG. 3A. The state where the TFT substrate 126 is coupled with the structure of FIG. 6A is shown in FIG. 6B. In this case, if the cell gap "c" is set to be equal to that of FIG. 5B, the gap "e" over the light-shielding sections 133 is equal to the subtraction result of the level difference "j" from the cell gap "c". Accordingly, the gap "e" is considerably smaller than the gap over the light-shielding sections 133a (which is equal to the height of the photo spacers 120).

In this way, when the photo spacers 120 are placed on the green pixel formation sections 103G (see FIG. 2), the level difference "h" will be large. Thus, to obtain a desired value of the cell gap "c", the height of the photo spacers 120 needs to be decreased. Since the gap "e" over the light-shielding sections 133 is equal to the height of the photo spacers 120, the gap "e" is decreased by the decreased height of the photo spacers 120. On the other hand, when the photo spacers 120 are placed on the blue pixel formation sections 102B (see FIG. 4A), the level difference "i" between the blue pixels and the light-shielding sections 133a is smaller than the level difference "h" between the green pixels and the light-shielding sections 133 (i.e., i<h). Accordingly, the gap "e" over the light-shielding sections 133 can be increased by increasing the height of the photo spacers 120.

In addition, the photo spacers 120 may be formed at the positions over the red pixel formation sections 101R, as shown in FIG. 4B. In this case, the cross-sectional structure is the same as that of the case where the photo spacers 120 are located over the blue pixel formation sections 120B (see FIG. 5A). Therefore, the explanation about it is omitted here.

As the TFT substrate 126, for example, a TFT substrate of the IPS (In-Plane Switching) type having the structure of FIG. 7 may be used. This structure is approximately the same as that illustrated in FIG. 6 of the Japanese Non-Examined Patent Publication No. 2005-241923. FIG. 7 shows the structure in one of the pixel regions.

As shown in FIG. 7, the TFT substrate 126 comprises a common electrode line 143 made of metal, a contact hole 145 for a common electrode, a transparent common electrode 146, a transparent pixel electrode 147, a contact hole 148 for the pixel electrode 147, a scanning line 149, a data line 150, a TFT 151, a source electrode 152 of the TFT 151, a drain electrode 153 of the TFT 151, an island-shaped amorphous silicon (a-Si) film 154 for forming an active layer of the TFT 151, and a pixel auxiliary electrode 156.

The pixel electrode 147 has three zigzag-shaped comb teeth. The common electrode 146 has four zigzag-shaped comb teeth. The pixel electrode 147 and the common electrode 146 are arranged in such a way as to be alternately engaged with each other in the region surrounded by the adjoining scanning lines 149 and the adjoining data lines 150. The two teeth of the common electrode 146 at its each side are overlapped with the corresponding data lines 150, respectively. The pixel auxiliary electrode 156 has one comb tooth superposed on the central tooth of the pixel electrode 147.

Each of the data lines 150 is electrically connected to the drain electrode 153 of a corresponding one of the TFTs 151. Each of the scanning lines 149 is electrically connected to the gate electrode (not shown) of a corresponding one of the TFTs 151. Each of the pixel electrodes 147 is electrically connected to the source electrode 152 of a corresponding one of the TFTs 151 by way of a corresponding one of the contact holes 148. Each of the common electrodes 146 is electrically connected to a corresponding one of the common electrode lines 143 by way of a corresponding one of the contact holes 145.

The above-described prior-art color filter shown in FIGS. 1 to 6 has the three problems explained below.

The first problem is that the level difference "h" (see FIGS. 3A and 3B) between the green pixels and the adjoining three-layered light-shielding sections 133 thereto is so large that the freedom of designing the cell gap "c" may be damaged.

Specifically, the level difference "h" between the green pixels and the light-shielding sections 133, which varies dependent on the width of the said sections 133, is likely to be excessively large. In the case of the thickness of the overlapped parts of the red and green color layers 101 and 103 being set at 70 to 90% (these values are determined in consideration of the thickness averaging due to flow during the coating process of the resist for each color) of the thickness of the red pixel formation sections 101R and that of the green pixel formation sections 103G, supposing that the red pixel formation sections 101R are 2.0 μm in thickness, the blue pixel formation sections 102B are 2.0 μm in thickness, the green pixel formation sections 103G are 2.0 μm in thickness, and the overcoat layer 123 is 1.0 μm in thickness, the overall thickness of the light-shielding sections 133 will be approximately 5 μm to approximately 6 μm while the overall thickness of the respective pixel formation sections will be 3.0 μm. (At this time, the overcoat layer 123 will be considerably thin, although it depends on the viscosity.) This means that the level difference "h" will be approximately 2.0 μm to approximately 3.0 μm, which is extremely large. For example, if the height difference "h" is 3.0 μm, the cell gap "c" over the green pixel is difficult to be set at 3.0 μm or less, which means that that the freedom of designing the cell gap "c" is damaged vastly.

To reduce the level difference "h", the parts of the green color layer 103 (i.e., the green inter-pixel parts of the green pixel formation sections 103G) that form the three-layered light-shielding sections 133 may be selectively removed by polishing. However, the green pixel formation sections 103G of the green color layer 103 are arranged on the almost entire surfaces of the corresponding light-shielding sections 133, and the total area of the green color layer 103 to be polished and removed is very wide. Therefore, even if a polishing machine is used to polish the entire surface of the said color filter, the said parts are difficult to be removed. Moreover, since such the polishing operation necessitates a long time, the tact time increases extensively and the mass productivity is damaged.

The second problem is that local gap defects are likely to occur due to plastic deformation or breakdown of the photo spacers 120 and that the color layers are difficult to be thickened to raise the color reproductivity.

Specifically, when the cell gap "c" is constant, the height of the photo spacers 120 is determined by the level difference "h" between the green pixels and the three-layered light-shielding sections 133. The level difference "h" is approximately equal to the sum of the thicknesses of the red and blue color layers 101 and 102. Therefore, thickening the red and blue color layers 101 and 102 to raise the color reproductivity leads to the increase of the level difference "h" and the height decrease of the photo spacers 120. Accordingly, it is difficult to raise the color reproductivity by thickening the red and blue color layers 101 and 102 (and the green color layer 103).

Moreover, the amount of possible elastic deformation of the photo spacers 120 decreases as their height decreases. Thus, the more the height of the spacers 120 is reduced due to the increase of the difference "h", the less the deformation margin of the spacers 120 against the local pressure stress applied to the display surface from the outside of the LCD panel. As a result, local gap defects are likely to occur due to plastic deformation or breakdown of the photo spacers 120.

The third problem is that the two-layered light-shielding sections 133a in the effective display region do not utilize effectively the operation characteristics in the normally black mode of the IPS or VA (Vertically Aligned) type LCD device and the light-shielding effect for the backlight with the metal lines on the TFT substrate 126.

Specifically, with the above-described prior-art color filter of FIGS. 1A to 6B, the two-layered light-shielding sections 133a comprising the red and blue color layers 101 and 102 (where the OD value is maximized) are placed in not only the region where a high OD value is necessary but also the region where an OD value may be low. Therefore, the three-layered light-shielding sections 133 comprising the red, blue and green color layers 101, 102 and 103 are formed at the positions adjacent to the green pixels. As a result, the cell gap "c" has to be determined in conformity with the large level difference "h" between the green pixels and the light-shielding sections 133. For this reason, the gap "e" (see FIG. 6B) between the three-layered light-shielding sections 133 and the TFT substrate 126 may be very narrow if the cell gap "c" is set at particular values. This means that a problem that foreign objects are likely to be caught in the narrowed gap "e" occurs. This is because if foreign objects are caught in the narrowed gap "e", gap defect will be generated in the light-shielding sections 133, which gives bad effects to the display quality.

SUMMARY OF THE INVENTION

The present invention was created in consideration of the above-described first to third problems in the prior-art color filter shown in FIGS. 1A to 6B.

An object of the present invention is to provide a color filter that reduces the level difference between the two-layered light-shielding sections comprising two different color layers and the colored materials that form the pixels of the respective colors by an easy method, a method of fabricating the color filter, and a LCD device using the color filter.

Another object of the present invention is to provide a color filter that can remove easily the parts existing on the two-layered light-shielding sections comprising two different color layers by polishing, where the parts are formed by the other color layer, a method of fabricating the color filter, and a LCD device using the color filter.

Still another object of the present invention is to provide a color filter whose respective color layers can be patterned easily to obtain a desired light-shielding performance using the two-layered light-shielding sections comprising two different color layers, a method of fabricating the color filter, and a LCD device using the color filter.

A further object of the present invention is to provide a LCD device that has high contrast, good color reproductivity and high-speed response characteristics without a black matrix.

The above objects together with others not specifically mentioned will become clear to those skilled in the art from the following description.

According to a first aspect of the present invention, a color filter is provided, which comprises:

a transparent support;

a first color layer formed on the support;

the first color layer having stripe-shaped first pixel formation sections, second color pixel windows, and third color pixel windows, which are arranged at predetermined intervals, respectively;

a second color layer formed to overlap with the first color layer;

the second color layer having stripe-shaped second color pixel formation sections, first color pixel windows, and third color pixel windows, which are arranged at predetermined intervals, respectively; and a third color layer having island-shaped third color pixel formation sections apart from each other;

wherein the first color pixel formation sections of the first color layer are overlapped with the first color pixel windows of the second color layer, thereby defining first color pixels; and the second color pixel formation sections of the second color layer are overlapped with the second color pixel windows of the first color layer, thereby defining second color pixels;

wherein the third color pixel formation sections of the third color layer are arranged in the third color pixel windows of the first color layer and the third color pixel windows of the second color layer, the third color pixel windows of the first color layer being overlapped with the third color pixel windows of the second color layer, thereby defining third color pixels; and wherein overlapped parts of the first color layer and the second color layer function as light-shielding sections.

With the color filter according to the first aspect of the present invention, the first color layer and the second color layer each having the above-described structure are formed on the support. The overlapped parts of the first color layer and the second color layer function as the light-shielding sections. Therefore, a black matrix for forming the light-shielding sections is unnecessary.

The third color pixel formation sections of the third color layer are island-shaped and arranged in the third color pixel windows of the first color layer and the third color pixel windows of the second color layer overlapped with each other. Therefore, by appropriately adjusting the size of the third color pixel formation sections, the third color pixel formation sections can be scarcely placed on the overlapped parts of the first and second color layers having the function of the light-shielding sections. This means that the level difference between the light-shielding sections and the first, second or third color layer (i.e., the colored materials that form the pixels of the respective colors) can be reduced. In addition, such the reduction of the level difference can be realized by an easy method. This is because the reduction of the level difference between the light-shielding sections and the first, second or third color layer can be obtained by making the third color pixel formation sections of the third color layer island-shaped to be apart from each other.

Moreover, the third color pixel formation sections can be arranged on the support in such a way that the peripheries of the third color pixel formation sections are scarcely placed on the overlapped parts of the first and second color layers that provide the light-shielding function. Therefore, the amount of the third color layer (i.e., the third color pixel formation sections) placed on the light-shielding sections is limited to a small value. As a result, the third color pixel formation sections placed on the light-shielding sections can be easily removed by polishing.

Furthermore, it is sufficient for the invention that the first color layer is formed to have the stripe-shaped first color pixel formation sections, the second color windows, and the third color windows, that the second color layer is formed to have the stripe-shaped second color pixel formation sections, the first color windows, and the third color windows, and that the third color layer is formed to have the island-shaped pixel formation sections. Therefore, the patterning process of the respective color layers (i.e., the first, second, and third color layers) to obtain a desired light-shielding performance can be conducted easily.

In a preferred embodiment of the color filter according to the first aspect of the present invention, the first color pixel formation sections of the first color layer are arranged along a first direction at predetermined intervals and are extended along a second direction perpendicular to the first direction, and the second and third color pixel windows of the first color layer are defined by connection sections that connect the first color pixel formation sections adjacent to each other. Moreover, the second color pixel formation sections of the second color layer are arranged along the first direction at predetermined intervals and are extended along the second direction, and the first and third color pixel windows of the second color layer are defined by connection sections that connect the second color pixel formation sections adjacent to each other.

In another preferred embodiment of the color filter according to the first aspect of the present invention, peripheries of the third color pixel formation sections are overlapped with the light-shielding sections to have overlapped widths of 5.0 µm or less (preferably, 3.0 µm or less). In this embodiment, the peripheries of the third color pixel formation sections are placed on the light-shielding sections; however, the effect of the overlapped peripheries is small and thus, it can be suppressed to the extent that no problem arises. Accordingly, there is an additional advantage that the process step of removing the overlapped peripheries of the third color pixel formation sections is unnecessary.

In the embodiment where the peripheries of the third color pixel formation sections are overlapped with the light-shielding sections, it is preferred that spacers are additionally arranged to bury or fill the overlapped peripheries of the third color pixel formation sections with the light-shielding sections. This is because, if so, the effect of the overlapped peripheries can be reduced.

In a further preferred embodiment of the color filter according to the first aspect of the present invention, the peripheries of the third color pixel formation sections are not overlapped with the light-shielding sections. In this embodiment, since the third color pixel formation sections do not exist on the light-shielding sections, the light-shielding sections have a two-layered structure completely. Thus, there is an additional advantage that the level difference between the light-shielding sections and the first, second or third color pixels can be reduced furthermore.

In the embodiment of the color filter where the peripheries of the third color pixel formation sections are not overlapped with the light-shielding sections, it is preferred to have spacers arranged on the light-shielding sections. In this embodiment, there is an additional advantage that the spacers can be placed at any positions on the light-shielding sections, because the third color pixel formation sections are not placed on the light-shielding sections.

In a still further preferred embodiment of the color filter according to the first aspect of the present invention, the first color layer is one of a red color layer and a blue color layer, and the second color layer is the other. In this embodiment, there is an additional advantage that the light-shielding rate is maximized among the two-layered structures comprising two of a red color layer, a blue color layer, and a green color layer.

In a still further preferred embodiment of the color filter according to the first aspect of the present invention, the first color layer or the second color layer is a red color layer. In this embodiment, there is an additional advantage that the light with a wavelength that affects significantly the current leakage of the TFTs can be shielded effectively.

According to a second aspect of the present invention, a method of fabricating the color filter according to the first aspect of the invention is provided. This method comprises the steps of:

forming a first color layer on a transparent support; the first color layer having stripe-shaped first color pixel formation sections, second color pixel windows, and third color pixel windows, which are arranged at predetermined intervals, respectively;

forming a second color layer to overlap with the first color layer; the second color layer having stripe-shaped second color pixel formation sections, first color pixel windows, and third color pixel windows, which are arranged at predetermined intervals, respectively; and forming a third color layer having island-shaped third color pixel formation sections apart from each other;

wherein in the step of forming the second color layer, the first color pixel formation sections of the first color layer are overlapped with the first color pixel windows of the second color layer, thereby defining first color pixels; and the second color pixel formation sections of the second color layer are overlapped with the second color pixel windows of the first color layer, thereby defining second color pixels;

wherein in the step of forming the third color layer, the third color pixel formation sections of the third color layer are arranged in the third color pixel windows of the first color layer and the third color pixel windows of the second color layer, the third color pixel windows of the first color layer being overlapped with the third color pixel windows of the second color layer, thereby defining third color pixels; and wherein overlapped parts of the first color layer and the second color layer function as light-shielding sections.

With the method of fabricating the color filter according to the second aspect of the present invention, as explained above, the first color layer, the second color layer, and the third color layer, each having the above-described structure, are formed on the support successively, thereby forming the overlapped parts of the first color layer and the second color layer that function as the light-shielding sections. Therefore, a black matrix for forming the light-shielding sections is unnecessary.

The third color pixel formation sections of the third color layer are island-shaped and arranged in the third color pixel windows of the first color layer and the third color pixel windows of the second color layer overlapped with each other. Therefore, by appropriately adjusting the size of the third color pixel formation sections, the third color pixel formation sections can be scarcely placed on the overlapped parts of the first and second color layers having the function of the light-shielding sections. This means that the level difference between the light-shielding sections and the first, second or third color layer (i.e., the colored materials that form the pixels of the respective colors) can be reduced. In addition, such the reduction of the level difference can be realized by an easy method. This is because the reduction of the level difference between the light-shielding sections and the first, second or third color layer can be obtained by making the third color pixel formation sections of the third color layer island-shaped to be apart from each other.

Moreover, the third color pixel formation sections can be arranged on the support in such a way that the peripheries of the third color pixel formation sections are scarcely placed on the overlapped parts of the first and second color layers that provide the light-shielding function. Therefore, the amount of the third color layer (i.e., the third color pixel formation sections) placed on the light-shielding sections is limited to a small value. As a result, the third color pixel formation sections placed on the light-shielding sections can be easily removed by polishing.

Furthermore, it is sufficient for the invention that the first color layer is formed to have the stripe-shaped first color pixel formation sections, the second color windows, and the third color windows, that the second color layer is formed to have the stripe-shaped second color pixel formation sections, the first color windows, and the third color windows, and that the third color layer is formed to have the island-shaped pixel formation sections. Therefore, the patterning process of the respective color layers (i.e., the first, second, and third color layers) to obtain a desired light-shielding performance can be conducted easily.

In a preferred embodiment of the method according to the second aspect of the present invention, in the step of forming the first color layer, the first color pixel formation sections of the first color layer are arranged along a first direction at predetermined intervals and are extended along a second direction perpendicular to the first direction;

the second color pixel windows and the third color pixel windows of the first color layer are defined by connection sections that connect the first color pixel formation sections thereof adjacent to each other;

and wherein in the step of forming the second color layer, the second color pixel formation sections of the second color layer are arranged along the first direction at predetermined intervals and are extended along the second direction; and the first color pixel windows and the third color pixel windows of the second color layer are defined by connection sections that connect the second color pixel formation sections thereof adjacent to each other.

In another preferred embodiment of the method according to the second aspect of the present invention, in the step of forming the third color layer, peripheries of the third color pixel formation sections are overlapped with the light-shielding sections to have overlapped widths of 5.0 µm or less (preferably, 3.0 µm or less). In this embodiment, the peripheries of the third color pixel formation sections are placed on the light-shielding sections; however, the effect of the overlapped peripheries is small and thus, it can be suppressed to the extent that no problem arises. Accordingly, there is an additional advantage that the process step of removing the overlapped peripheries of the third color pixel formation sections is unnecessary.

In the embodiment where peripheries of the third color pixel formation sections are overlapped with the light-shielding sections in the step of forming the third color layer, it is preferred that a step of forming spacers in such a way as to bury or fill the overlapped peripheries of the third color pixel formation sections with the light-shielding sections is additionally performed. This is because, if so, the effect of the overlapped peripheries can be reduced.

In a further preferred embodiment of the method according to the second aspect of the present invention, after the step of forming the third color layer is completed, a step of polishing the third color layer is carried out to remove peripheries of the third color pixel formation sections placed on the light-shielding sections. In this embodiment, (the peripheries of) the third color pixel formation sections existing on the light-shielding sections can be surely removed. Thus, there is an additional advantage that the level difference between the light-shielding sections and the first, second or third color pixels can be reduced furthermore.

In a still another preferred embodiment of the method according to the second aspect of the present invention, the first color layer is one of a red color layer and a blue color layer, and the second color layer is the other. In this embodiment, there is an additional advantage that the light-shielding rate is maximized among the two-layered structures comprising two of a red color layer, a blue color layer, and a green color.

In a still further preferred embodiment of the method according to the second aspect of the present invention, the first color layer or the second color layer is a red color layer. In this embodiment, there is an additional advantage that the light with a wavelength that affects significantly the current leakage of the TFTs can be shielded effectively.

According to a third aspect of the present invention, another color filter is provided, which comprises:

a transparent support;

a first color layer formed on the support;

the first color layer having stripe-shaped first color pixel formation sections and second-and-third color pixel windows, which are arranged at predetermined intervals along a first direction, respectively;

a second color layer formed to overlap with the first color layer;

the second color layer having stripe-shaped second color pixel formation sections and first-and-third color pixel windows, which are arranged at predetermined intervals along the first direction, respectively; and a third color layer having island-shaped third color pixel formation sections apart from each other;

wherein the second color pixel formation sections of the second color layer are overlapped with second color pixel subwindows of the second-and-third color pixel windows of the first color layer; and the first-and-third color pixel windows of the second color layer are respectively overlapped with the first color pixel formation sections of the first color layer and third color pixel subwindows of the second-and-third color pixel windows thereof;

wherein the third color pixel formation sections of the third color layer are respectively arranged in the third color pixel subwindows of the second-and-third color pixel windows of the first color layer and the third color pixel subwindows of the first-and-third color pixel windows of the second color layer, the third color pixel subwindows of the second-and-third color pixel windows of the first color layer being overlapped with the third color pixel subwindows of the first-and-third color pixel windows of the second color layer;

wherein the first color pixel formation sections of the first color layer, which are overlapped with the first-and-third color pixel windows of the second color layer and the third color pixel formation sections of the third color layer, define first color pixels;

the second color pixel formation sections of the second color layer, which are overlapped with the second-and-third color pixel windows of the first color layer and the third color pixel formation sections of the third color layer, define second color pixels;

the third color pixel formation sections of the third color layer, which are overlapped with the second-and-third color pixel windows of the first color layer and the first-and-third color pixel windows of the second color layer, define third color pixels; and wherein first light-shielding sections extending along the first direction are formed by overlapped parts of the first color layer and the second color layer; and second light-shielding sections extending along a second direction perpendicular to the first direction are formed by overlapped parts of the first color layer and the second color layer, overlapped parts of the second color layer and the third color layer, and overlapped parts of the third color layer and the first color layer.

Here, it may be said that each of the second-and-third color pixel windows of the first color layer comprises the second color pixel subwindow covered with the second color layer and the third color pixel subwindow not covered with the second color layer. Similarly, it may be said that each of the first-and-third color pixel windows of the second color layer comprises the third color pixel subwindow covered with the third color layer and the first color pixel subwindow not covered with the third color layer.

With the color filter according to the third aspect of the present invention, the first color layer and the second color layer each having the above-described structure are formed on the support. The first light-shielding sections extending along the first direction are formed by the overlapped parts of the first color layer and the second color layer. The second light-shielding sections extending along the second direction are formed by the overlapped parts of the first and second color layers, the overlapped parts of the second and third color layers, and the overlapped parts of the third and first color layers (i.e., the two color layers adjoining to each other). Therefore, a black matrix for forming the light-shielding sections is unnecessary.

The third color pixel formation sections of the third color layer, which define the third color pixels by the overlapping with the second-and-third color pixel windows of the first color layer and the first-and-third color pixel windows of the second color layer, are island-shaped apart from each other. Therefore, by appropriately adjusting the size of the third color pixel formation sections, the third color pixel formation sections can be scarcely placed on the overlapped parts of the first and second color layers having the function of the first light-shielding sections extending along the first direction. This means that the level difference between the first light-shielding sections and the first, second or third color layer (i.e., the colored materials that form the pixels of the respective colors) can be reduced. In addition, such the reduction of the level difference can be realized by an easy method. This is because the reduction of the level difference between the first light-shielding sections and the first, second or third color layer can be obtained by making the third color pixel formation sections of the third color layer island-shaped to be apart from each other.

Moreover, by appropriately adjusting the size of the third color pixel formation sections of the third color layer, the third color pixel formation sections can be arranged on the support in such a way that the peripheries of the third color pixel formation sections are scarcely placed on the overlapped parts of the first and second color layers that provide the first light-shielding function. Therefore, the amount of the third color layer (i.e., the third color pixel formation sections) placed on the first light-shielding sections is limited to a small value. As a result, the third color pixel formation sections placed on the first light-shielding sections can be easily removed by polishing.

Furthermore, it is sufficient for the invention that the first color layer is formed to have the stripe-shaped first color pixel formation sections and the second-and-third color pixel windows, that the second color layer is formed to have the stripe-shaped second color pixel formation sections and the first-and-third color pixel windows, and that the third color layer is formed to have the island-shaped pixel formation sections. Therefore, the patterning process of the respective color layers (i.e., the first, second, and third color layers) to obtain a desired light-shielding performance can be conducted easily.

In a preferred embodiment of the color filter according to the third aspect of the present invention, the second-and-third color pixel windows of the first color layer are defined by connection sections that connect the first color pixel formation sections adjoining to each other, and the first-and-third color pixel windows of the second color layer are defined by connection sections that connect the second color pixel formation sections adjoining to each other.

In another preferred embodiment of the color filter according to the third aspect of the present invention, peripheries of the third color pixel formation sections are overlapped with the first light-shielding sections to have overlapped widths of 5.0 μm or less (preferably, 3.0 μm or less). In this embodiment, the peripheries of the third color pixel formation sections are placed on the first light-shielding sections; however, the effect of the overlapped peripheries is small and thus, it can be suppressed to the extent that no problem arises. Accordingly, there is an additional advantage that the process step of removing the overlapped peripheries of the third color pixel formation sections is unnecessary.

In the embodiment where the peripheries of the third color pixel formation sections are overlapped with the first light-shielding sections, it is preferred that spacers are additionally arranged to bury or fill the overlapped peripheries of the third color pixel formation sections with the first light-shielding sections. This is because, if so, the effect of the overlapped peripheries can be reduced.

In a further preferred embodiment of the color filter according to the third aspect of the present invention, peripheries of the third color pixel formation sections are not overlapped with first the light-shielding sections. In this embodiment, since the third color pixel formation sections do not exist on the first light-shielding sections, the first light-shielding sections have a two-layered structure completely. Thus, there is an additional advantage that the level difference between the first light-shielding sections and the first, second or third color pixels can be reduced furthermore.

In the embodiment of the color filter where the peripheries of the third color pixel formation sections are not overlapped with the first light-shielding sections, it is preferred to have spacers arranged on the first light-shielding sections. In this embodiment, there is an additional advantage that the spacers can be placed at any positions on the first light-shielding sections, because the third color pixel formation sections are not placed on the first light-shielding sections.

In a still further preferred embodiment of the color filter according to the third aspect of the present invention, the first color layer is one of a red color layer and a blue color layer, and the second color layer is the other. In this embodiment, there is an additional advantage that the light-shielding rate is maximized among the two-layered structures comprising two of a red color layer, a blue color layer, and a green color.

In a still further preferred embodiment of the color filter according to the third aspect of the present invention, the first color layer or the second color layer is a red color layer. In this embodiment, there is an additional advantage that the light with a wavelength that affects significantly the current leakage of the TFTs can be shielded effectively.

According to a fourth aspect of the present invention, a method of fabricating the color filter according to the third aspect of the invention is provided. This method comprises the steps of:

forming a first color layer on a transparent support; the first color layer having stripe-shaped first color pixel formation sections and second-and-third color pixel windows, which are arranged at predetermined intervals along a first direction, respectively;

forming a second color layer to overlap with the first color layer; the second color layer having stripe-shaped second color pixel formation sections and first-and-third color pixel windows, which are arranged at predetermined intervals along the first direction, respectively; and forming a third color layer having island-shaped third color pixel formation sections apart from each other;

wherein in the step of forming the second color layer, the second color pixel formation sections of the second color layer are overlapped with second color pixel subwindows of the second-and-third color pixel windows of the first color layer; and the first-and-third color pixel windows of the second color layer are respectively overlapped with the first color pixel formation sections of the first color layer and third color pixel subwindows of the second-and-third color pixel windows thereof;

wherein in the step of forming the third color layer, the third color pixel formation sections of the third color layer are arranged in the third color pixel subwindows of the second-and-third color pixel windows of the first color layer and the third color pixel subwindows of the first-and-third color pixel windows of the second color layer, the third color pixel subwindows of the second-and-third color pixel windows being overlapped with the third color pixel subwindows of the first-and-third color pixel windows being overlapped;

wherein the first color pixel formation sections of the first color layer, which are overlapped with the first-and-third color pixel windows of the second color layer and the third color pixel formation sections of the third color layer, define first color pixels;

the second color pixel formation sections of the second color layer, which are overlapped with the second-and-third color pixel windows of the first color layer and the third color pixel formation sections of the third color layer, define second color pixels;

the third color pixel formation sections of the third color layer, which are overlapped with the second-and-third color pixel windows of the first color layer and the first-and-third color pixel windows of the second color layer, define third color pixels; and wherein first light-shielding sections extending along the first direction are formed by overlapped parts of the first color layer and the second color layer; and second light-shielding sections extending along a second direction perpendicular to the first direction are formed by overlapped parts of the first color layer and the second color layer, overlapped parts of the second color layer and the third color layer, and overlapped parts of the third color layer and the first color layer.

With the method of fabricating a color filter according to the fourth aspect of the present invention, as explained above, the first color layer, the second color layer, and the third color layer, each having the above-described structure, are formed on the support successively. Thus, the first light-shielding sections extending along the first direction are formed by the overlapped parts of the first color layer and the second color layer. At the same time, the second light-shielding sections extending along the second direction are formed by the overlapped parts of the first color layer and the second color layer, the overlapped parts of the second color layer and the third color layer, and the overlapped parts of the third color layer and the first color layer. Therefore, a black matrix for forming the first and second light-shielding sections is unnecessary.

The third color pixel formation sections of the third color layer, which define the third color pixels by overlapping them with the third color pixel subwindows of the second-and-third color pixel windows of the first color layer and the third color pixel subwindows of the first-and-third color pixel windows of the second color layer, are island-shaped apart from each other. Therefore, by appropriately adjusting the size of the third color pixel formation sections, the third color pixel formation sections can be scarcely placed on the overlapped parts of the first and second color layers having the function of the first light-shielding sections. This means that the level difference between the first light-shielding sections and the first, second or third color layer (i.e., the colored materials that form the pixels of the respective colors) can be reduced. In addition, such the reduction of the level difference can be realized by an easy method. This is because the reduction of the level difference between the first light-shielding sections and the first, second or third color layer can be obtained by making the third color pixel formation sections of the third color layer island-shaped to be apart from each other.

Moreover, the third color pixel formation sections can be arranged on the support in such a way that the peripheries of the third color pixel formation sections are scarcely placed on the overlapped parts of the first and second color layers that provide the first light-shielding function. Therefore, the amount of the third color layer (i.e., the third color pixel formation sections) placed on the first light-shielding sections is limited to a small value. As a result, the third color pixel formation sections placed on the first light-shielding sections can be easily removed by polishing.

Furthermore, it is sufficient for the invention that the first and second color layers are respectively formed to have the stripe-shaped pixel formation sections and the connection sections that connecting them, and that the third color layer is formed to have the island-shaped pixel formation sections. Therefore, the patterning process of the respective color layers (i.e., the first, second, and third color layers) to obtain a desired light-shielding performance can be conducted easily.

In a preferred embodiment of the method according to the fourth aspect of the present invention, the second-and-third color pixel windows of the first color layer are defined by connection sections that connect the first color pixel formation sections adjoining to each other. The first-and-third color pixel windows of the second color layer are defined by connection sections that connect the second color pixel formation sections adjoining to each other.

In another preferred embodiment of the method according to the fourth aspect of the present invention, in the step of forming the third color layer, peripheries of the third color pixel formation sections are overlapped with the first light-shielding sections to have overlapped widths of 5.0 µm or less (preferably, 3.0 µm or less). In this embodiment, the peripheries of the third color pixel formation sections are placed on the first light-shielding sections; however, the effect of the overlapped peripheries is small and thus, it can be suppressed to the extent that no problem arises. Accordingly, there is an additional advantage that the process step of removing the overlapped peripheries of the third color pixel formation sections is unnecessary.

In the embodiment where peripheries of the third color pixel formation sections are overlapped with the light-shielding sections in the step of forming the third color layer, it is preferred that a step of forming spacers in such a way as to bury or fill the overlapped peripheries of the third color pixel formation sections with the first light-shielding sections is additionally performed. This is because, if so, the effect of the overlapped peripheries can be reduced.

In a further preferred embodiment of the method according to the fourth aspect of the present invention, after the step of forming the third color layer is completed, a step of polishing the third color layer is carried out to remove peripheries of the third color pixel formation sections placed on the first light-shielding sections. In this embodiment, since (the peripheries of) the third color pixel formation sections do not exist on the first light-shielding sections, the first light-shielding sections have a two-layered structure completely. Thus, there is an additional advantage that the level difference between the first light-shielding sections and the first, second or third color pixels can be reduced furthermore.

In a still another preferred embodiment of the method according to the fourth aspect of the present invention, the first color layer is one of a red color layer and a blue color layer, and the second color layer is the other. In this embodiment, there is an additional advantage that the light-shielding rate is maximized among the two-layered structures comprising two of a red color layer, a blue color layer, and a green color.

In a still further preferred embodiment of the method according to the fourth aspect of the present invention, the first color layer or the second color layer is a red color layer. In this embodiment, there is an additional advantage that the light with a wavelength that affects significantly the current leakage of the TFTs can be shielded effectively.

According to a fifth aspect of the present invention, a LCD device is provided, which comprises:

a first substrate having the color filter according to the first or third aspect of the invention described above; and a second substrate having active elements for switching.

With the LCD device according to the fifth aspect of the present invention, since the first substrate having the above-described color filter according to the first or third aspect of the invention and the second substrate having active elements for switching are provided, high contrast, good color reproductivity and high-speed response characteristics are obtained without a black matrix.

In a preferred embodiment of the LCD device according to the fifth aspect of the present invention, the device is designed to operate in a normally black mode. A common electrode formed on the second substrate comprises shielding sections for shielding electric field leaked from the second substrate. The shielding sections conduct their light-shielding operation in vicinities of scanning lines formed on the second substrate.

In another preferred embodiment of the LCD device according to the fifth aspect of the present invention, the first light-shielding sections of the color filter are used for shielding light at corresponding locations to scanning lines formed on the second substrate, and the second light-shielding sections of the color filter are used for shielding light at corresponding locations to data lines formed on the second substrate.

In still another preferred embodiment of the LCD device according to the fifth aspect of the present invention, the second light-shielding sections of the color filter are assigned to locations where backlight is shielded by wiring lines formed on the second substrate, and the first light-shielding sections of the color filter are assigned to locations where backlight is not shielded by wiring lines formed on the second substrate.

In short, the color filters according to the first and third aspects of the invention have the following advantages (a), (b) and (c):

(a) The level difference between the two-layered light-shielding sections comprising two different color layers and the colored materials that form the pixels of the respective colors can be reduced by an easy method.

(b) The parts existing on the two-layered light-shielding sections comprising two different color layers, where the parts are formed by the other color layer, can be removed easily by polishing.

(c) The respective color layers can be patterned easily to obtain a desired light-shielding performance using the two-layered light-shielding sections comprising two different color layers.

The methods of fabricating a color filter according to the second and fourth aspects of the invention have an advantage that the color filters according to the first and third aspects of the invention can be easily fabricated, respectively.

The LCD device according to the fifth aspect of the invention has an advantage that high contrast and good color reproductivity can be obtained without a black matrix, and that high-speed response characteristics can be obtained because a narrower gap than that of the prior-art LCD devices is realized.

BRIEF DESCRIPTION OF THE DRAWINGS

In order that the present invention may be readily carried into effect, it will now be described with reference to the accompanying drawings.

FIG. 1A is an explanatory partial plan view of the red color layer, FIG. 1B is an explanatory partial plan view of the blue color layer, and FIG. 1C is an explanatory partial plan view of the green color layer.

FIG. 7 is a partial plan view showing the structure of the TFT substrate coupled with the prior-art color filter of FIG. 2.

FIG. 8A is an explanatory partial plan view of the red color layer, FIG. 8B is an explanatory partial plan view of the blue color layer, and FIG. 8C is an explanatory partial plan view of the green color layer.

FIG. 9A is an explanatory partial plan view of the filter showing the state where the red and blue color layers of FIGS. 8A and 8B are formed on the transparent glass plate. FIG. 9B is an explanatory partial plan view of the filter showing the state where the green color layer of FIG. 8C is formed on the structure of FIG. 9A. FIG. 9C is an explanatory partial plan view of the filter showing the state where the overlapped parts of the island-shaped green pixel formation sections with the light-shielding sections are removed by polishing from the state of FIG. 9B.

FIG. 19A is an explanatory partial plan view of the red color layer, FIG. 19B is an explanatory partial plan view of the blue color layer, and FIG. 19C is an explanatory partial plan view of the green color layer.

FIG. 20A is an explanatory partial plan view showing the state where the red and blue color layers of FIGS. 19A and 19B are formed on the transparent glass plate. FIG. 20B is an explanatory partial plan view showing the state where the green color layer of FIG. 19C is formed on the structure of FIG. 20A. FIG. 20C is an explanatory partial plan view showing the state where the overlapped parts of the island-shaped green pixel formation sections with the light-shielding sections are removed by polishing from the state of FIG. 20B.

DETAILED DESCRIPTION OF THE PREFERRED EMBODIMENTS

Figure 1:
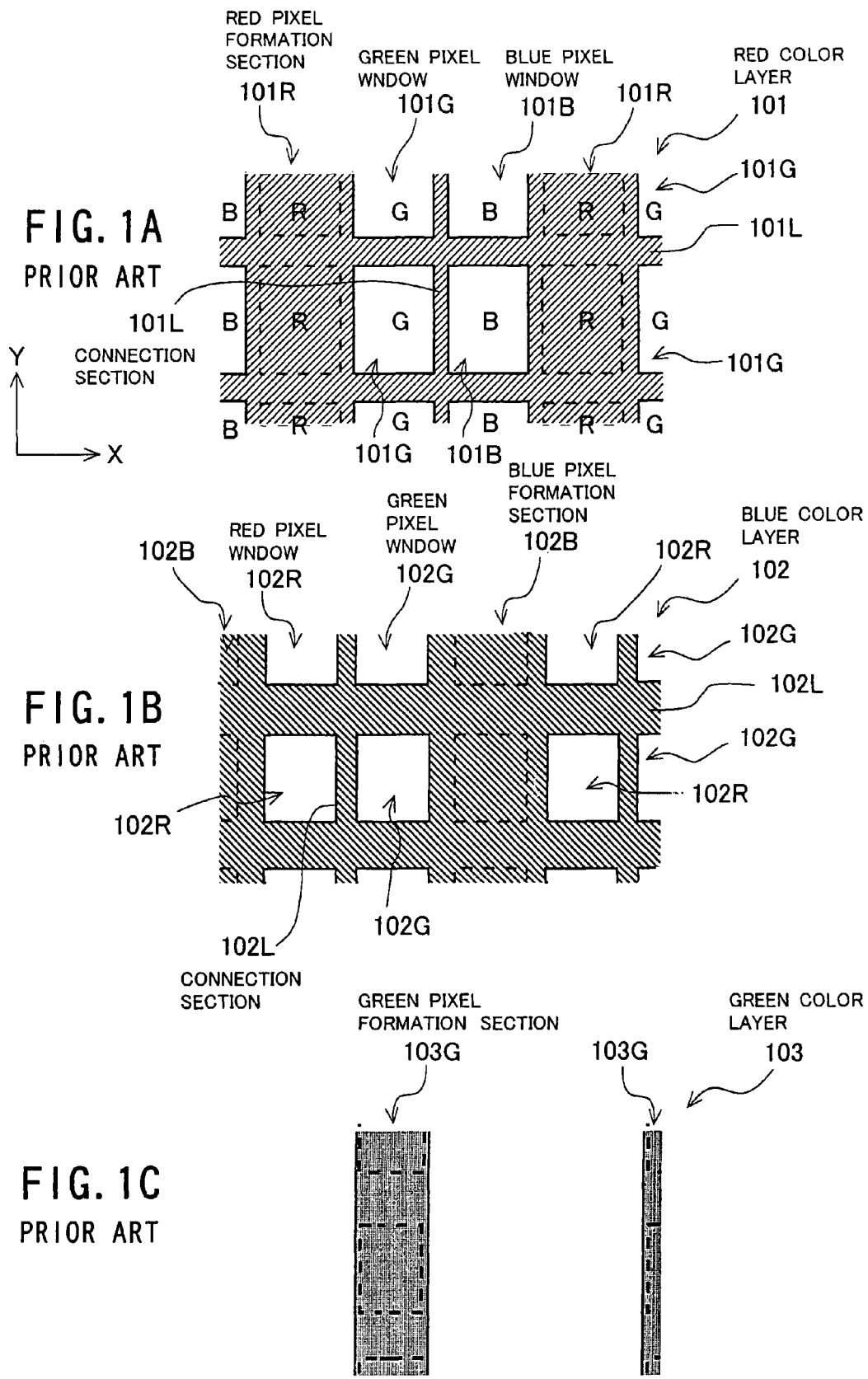
FIGS. 1A to 1C show the patterns of the color layers used in a prior-art color filter.

Preferred embodiments of the present invention will be described in detail below while referring to the drawings attached.

Color Filter of First Embodiment

Figure 9A:
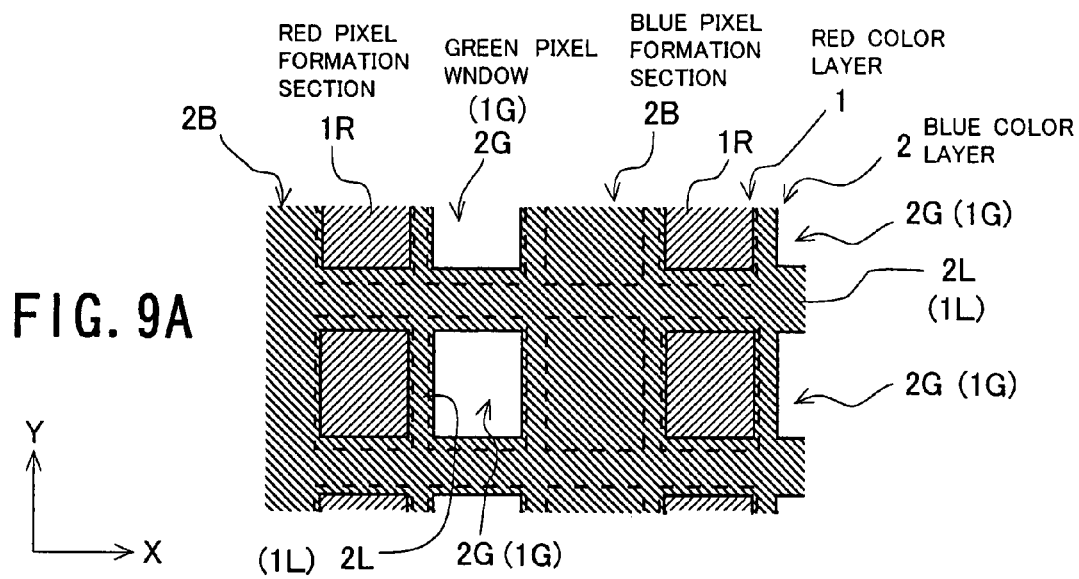
FIGS. 9A to 9C show the process steps of a method of fabricating the color filter according to the first embodiment of FIG. 2.
Figure 9B:
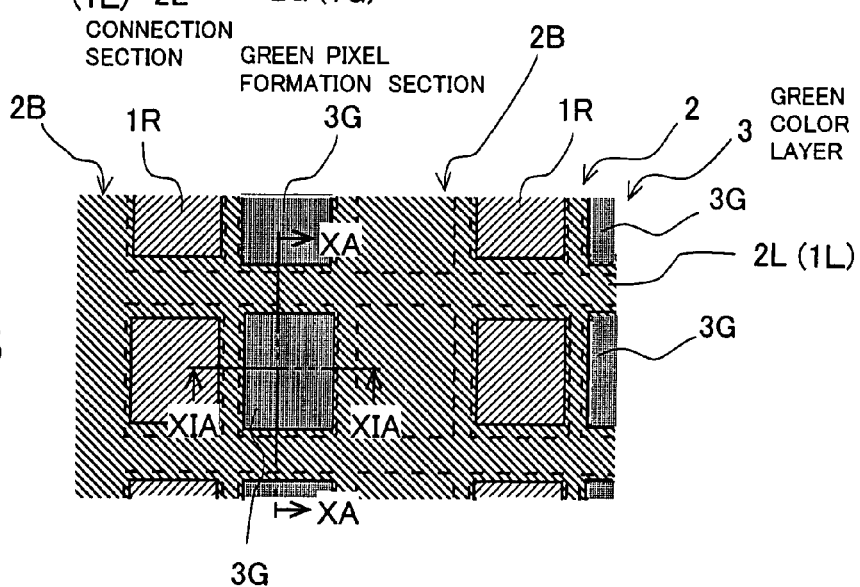
Figure 10A:
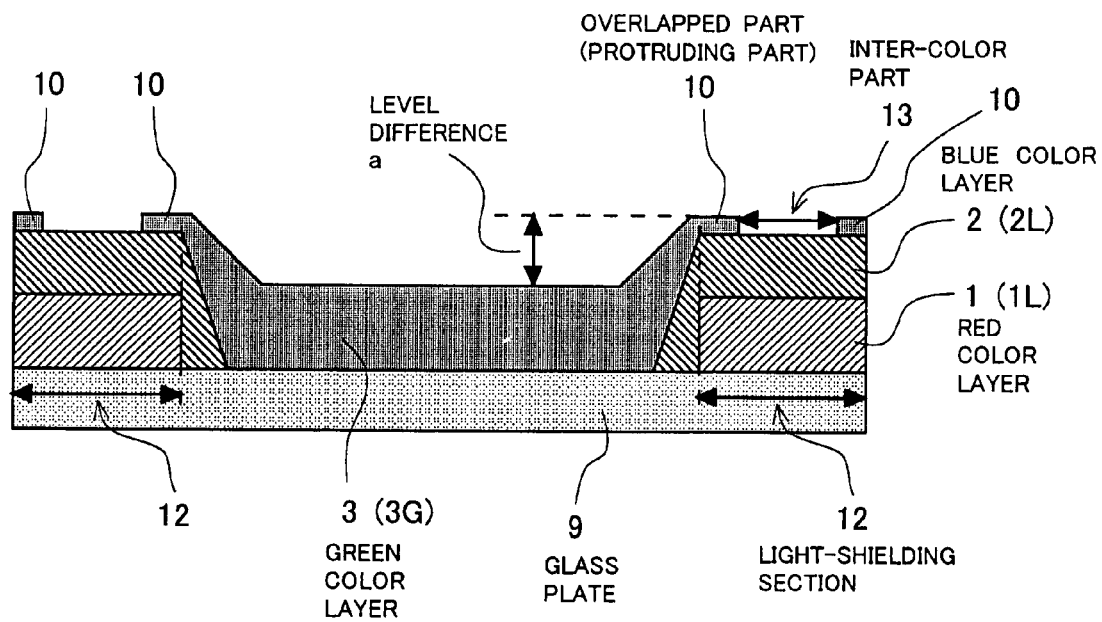
FIG. 10A is an explanatory partial cross-sectional view along the line XA-XA in FIG. 9B.
Figure 11A:
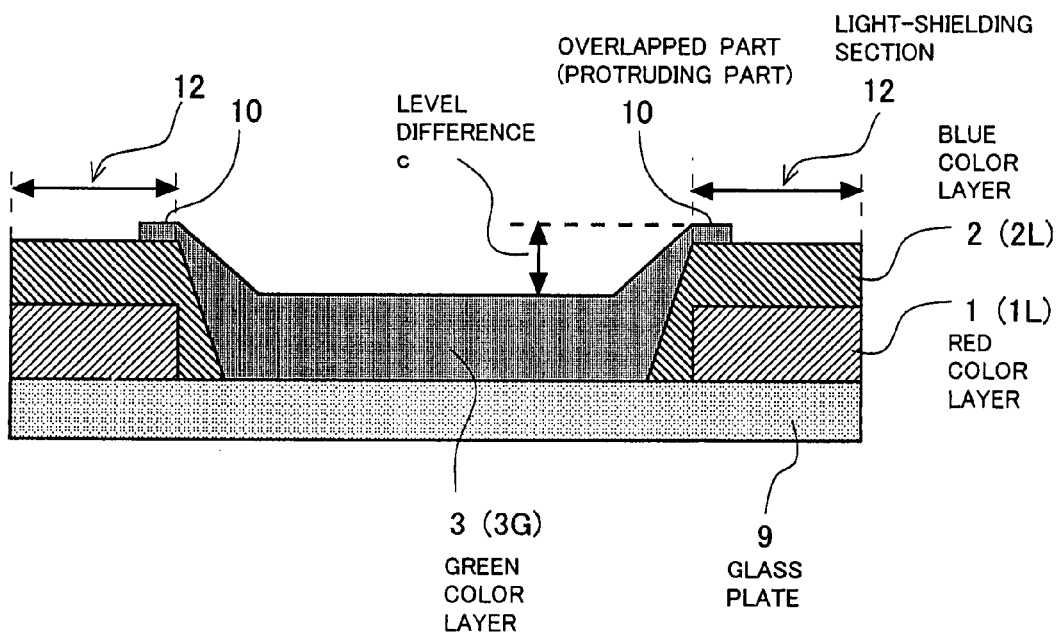
FIG. 11A is an explanatory partial cross-sectional view along the line XIA-XIA in FIG. 9B.

The structure of a color filter for a LCD device according to a first embodiment of the present invention is shown in FIGS. 9B, 10A and 11A.

Figure 8A:
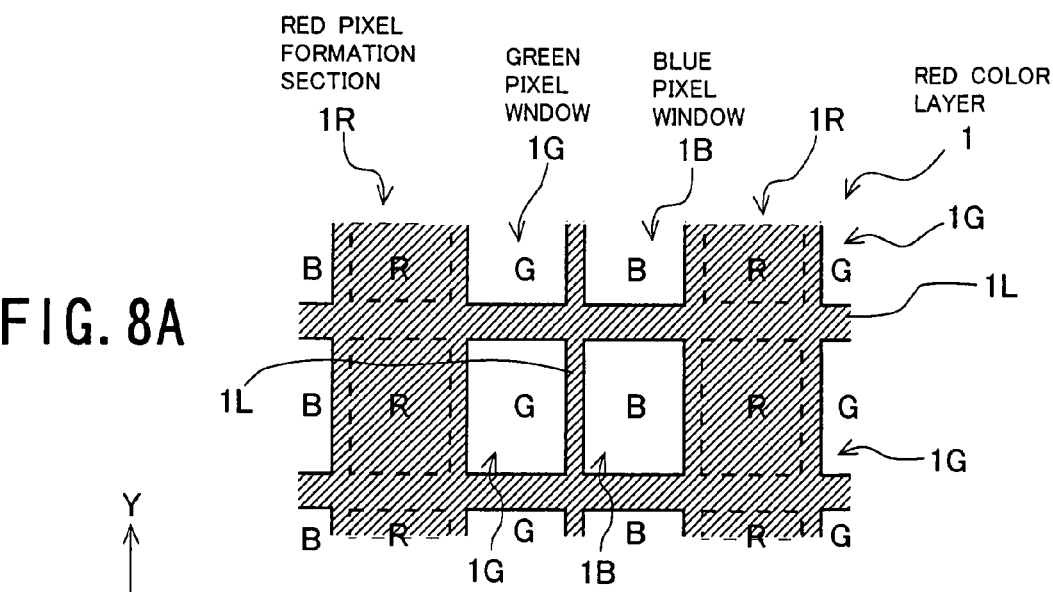
FIGS. 8A to 8C show the patterns of the color layers of a color filter according to a first embodiment of the invention.
Figure 8B:
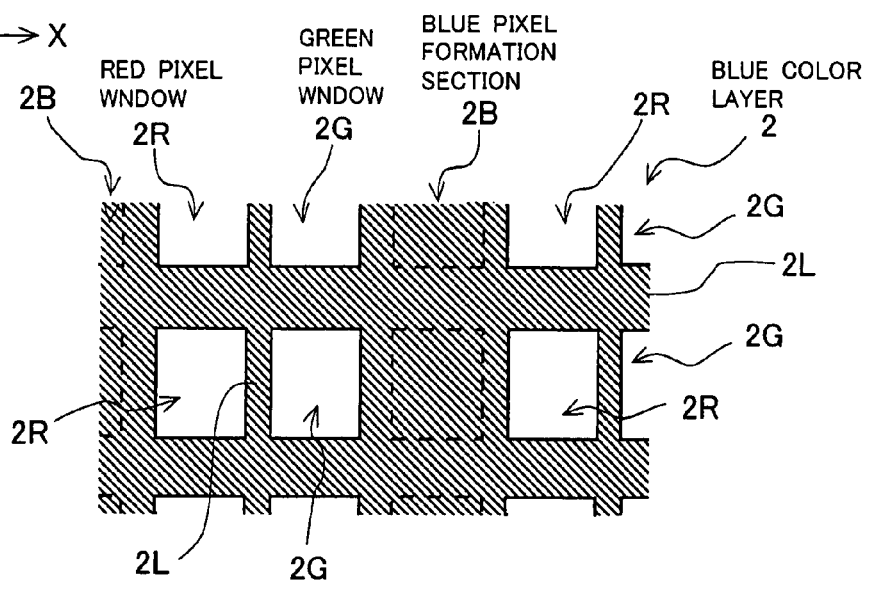
Figure 8C:
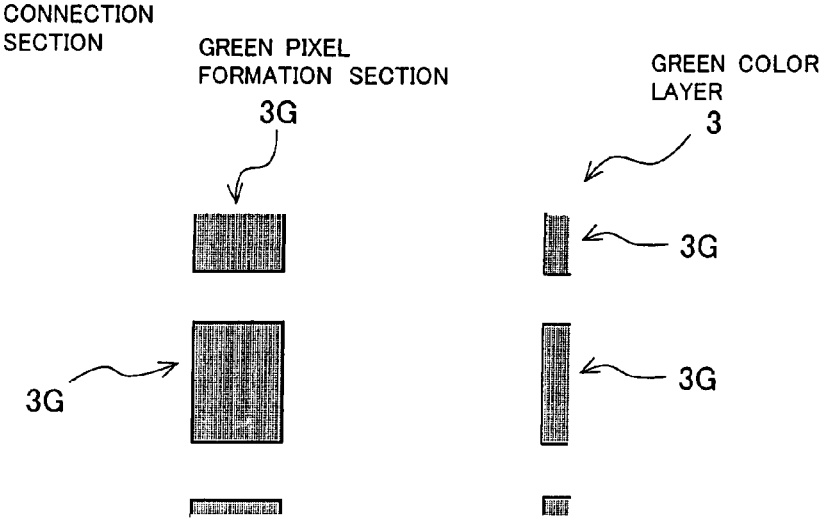

The color filter according to the first embodiment comprises a red color layer 1 having the pattern of FIG. 8A, a blue color layer 2 having the pattern of FIG. 8B, and a green color layer 3 having the pattern of FIG. 8C. The red, blue, and green color layers 1, 2, and 3 are overlapped with each other on the surface (i.e., the X-Y plane) of a transparent glass plate (i.e., a transparent support) 9. This color filter does not include a black matrix. The light-shielding function of a black matrix is realized by overlapping the red and blue color layers 1 and 2.

The red color layer 1 is formed on the surface of the glass plate 9. The layer 1 has stripe-shaped red pixel formation sections 1R and connection sections 1L, as shown in FIG. 8A.

The stripe-shaped red pixel formation sections 1R are extended along the Y direction (vertical direction in FIG. 8A) and arranged along the X direction (horizontal direction in FIG. 8A) at predetermined intervals. The sections 1R are used for forming rectangular red pixels arranged in the Y direction at predetermined intervals. Thus, it may be said that each of the sections 1R is formed by red pixels and red inter-pixel parts that interconnect the adjoining red pixels.

The connection sections 1L interconnect the adjoining red pixel formation sections 1R. Moreover, the connection sections 1L define rectangular blue pixel windows 1B arranged along the Y direction at predetermined intervals and rectangular green pixel windows 1G arranged along the Y direction at predetermined intervals. Each of the blue pixel windows 1B is located at a position where a blue pixel is to be formed. Each of the green pixel windows 1G is located at a position where a green pixel is to be formed.

Accordingly, the red pixels are aligned along the Y direction at predetermined intervals. The green pixels are aligned along the Y direction at the same intervals as the red pixels in such a way as to be adjacent to the red pixels. The blue pixels are aligned along the Y direction at the same intervals as the red pixels in such a way as to be adjacent to the green pixels. This layout or arrangement of the red, green and blue pixels thus aligned is repeatedly aligned along the X direction.

The blue color layer 2 is formed on the surface of the glass plate 9 to be overlapped with the red color layer 1. The layer 2 comprises stripe-shaped blue pixel formation section 2B and connection sections 2L, as shown in FIG. 8B.

The stripe-shaped red pixel formation sections 2B are extended along the Y direction and arranged along the X direction at predetermined intervals. The sections 2B, which are located on such positions as to be superposed on the corresponding blue pixel windows 1B, are used for forming rectangular blue pixels arranged in the Y direction at predetermined intervals. Thus, it may be said that each of the sections 2B is formed by blue pixels and blue inter-pixel parts that interconnect the adjoining blue pixels.

The connection sections 2L interconnect the adjoining blue pixel formation sections 2B. Moreover, the connection sections 2L define rectangular red pixel windows 2R arranged along the Y direction at predetermined intervals and rectangular green pixel windows 2G arranged along the Y direction at predetermined intervals. Each of the red pixel windows 2R is located at a position where a red pixel is to be formed. Each of the green pixel windows 2G is located at a position where a green pixel is to be formed.

Accordingly, the red pixel windows 2R are located at such positions as to be superposed on the corresponding red pixel formation sections 1R. The green pixel windows 2G are located at such positions as to be superposed on the corresponding green pixel windows 1G.

A green color layer 3 is formed on the surface of the glass plate 9 to be overlapped with the red and blue color layers 1 and 2. The layer 3 comprises rectangular island-shaped green pixel formation section 3G, as shown in FIG. 8C. These green pixel formation section 3G are formed to be apart from each other, which are different from the stripe-shaped sections of the color layer 103 of the prior-art color filter. Unlike the red and blue color layers 1 and 2, the green color layer 3 does not have connection sections like the connection sections 1L and 2L.

The rectangular island-shaped green pixel formation sections 3G are arranged along the Y direction at predetermined intervals and along the X direction at predetermined intervals. The sections 3G, which are located on such positions as to be superposed on the corresponding green pixel windows 1G of the red color layer 1 and the corresponding green pixel windows 2G of the blue color layer 2, are used for forming rectangular green pixels arranged in the Y direction at predetermined intervals. Thus, it may be said that each of the sections 3G is formed by green pixels alone and does not include green inter-pixel parts that interconnect the adjoining green pixels.

The color filter of the first embodiment is fabricated by overlapping the red, blue, and green color layers 1, 2, and 3 with the above-described patterns in this order. As the fabrication method of the said filter, the printing method, photoresist method, etching method, or the like are known. If the red, blue, and green color layers 1, 2, and 3 have the patterns of FIGS. 8A to 8C, respectively, any one of these methods may be used. Since the photoresist method is preferred in consideration of high resolution, good controllability of spectral characteristics, and good reproductivity, a fabrication method using the photoresist method is explained here as an example.

With the photoresist method, a pigment is dispersed in a transparent resin along with an optical initiator, a polymeric monomer and a solvent to generate a colored composite. The colored composite thus generated is used as the raw material for the respective color layers. This raw material (i.e., colored material) is coated on the glass plate to form a colored material film. The colored material film thus formed is selectively exposed with a mask and developed, resulting in a color layer with a desired pattern. These processes are repeatedly carried out for the respective colors to fabricate a color filter.

In the case of fabricating the color filter according to the first embodiment, first, a film of an appropriate red composite (i.e., a red colored material) is formed on the surface of the glass plate 9 to have a predetermined thickness. The red colored material film is selectively exposed with a patterned mask and developed. Thus, the red color layer 1 with the pattern of FIG. 8A is formed.

Next, a film of an appropriate blue composite (i.e., a blue colored material) is formed on the surface of the glass plate 9 to have a predetermined thickness in such a way as to be overlapped with the red color layer 1. The blue colored material film is selectively exposed with a patterned mask and developed. Thus, the blue color layer 2 with the pattern of FIG. 8B is formed. At this time, as shown in FIG. 9A, the blue pixel formation sections 2B of the blue color layer 2 are overlapped with the corresponding blue pixel windows 1B of the red color layer 1. Moreover, the green pixel windows 2G of the blue color layer 2 are overlapped with the corresponding green pixel windows 1G of the red color layer 1. The red pixel formation sections 1R of the red color layer 1 overlapped with the red pixel windows 2R of the blue color layer 2 define red pixels.

Subsequently, a film of an appropriate green composite (i.e., a green colored material) is formed on the surface of the glass plate 9 to have a predetermined thickness in such a way as to be overlapped with the red and blue color layers 1 and 2. The green colored material film is selectively exposed with a patterned mask and developed. Thus, the green color layer 3 with the pattern of FIG. 8C is formed. As a result, the color filter of the first embodiment is obtained. The state at this stage is shown in FIG. 9B. At this time, as shown in FIG. 9B, the green pixel formation sections 3G of the green color layer 3 are arranged in the corresponding green pixel windows 1G of the red color layer 1 and the corresponding green pixel windows 2G of the blue color layer 2 overlapped with each other.

As seen from FIG. 9B, the blue pixel formation sections 2B of the blue color layer 2 overlapped with the blue pixel windows 1B of the red color layer 1 define blue pixels. The green pixel formation sections 3G of the green color layer 3 overlapped with the green pixel windows 1G of the red color layer 1 and the green pixel windows 2G of the blue color layer 2 define green pixels. Moreover, the connection sections 2L and the blue inter-pixel parts of the blue color layer 2 are overlapped with the corresponding connection sections 1L or the corresponding red inter-pixel parts of the red color layer 1. The overlapped parts of the red color layer 1 and the blue color layer 2 form light-shielding sections.

With the color filter according to the first embodiment, as explained above, the red pixel formation sections 1R of the red color layer 1 are overlapped with the red pixel windows 2R of the blue color layer 2, defining the red pixels. The blue pixel formation sections 2B of the blue color layer 2 are overlapped with the blue pixel windows 1B of the red color layer 1, defining the blue pixels. These points are the same as those of the prior-art color filter of FIGS. 1A to 1C as explained above. However, the pattern of the green color layer 3 is different. Specifically, the green color layer 3 has the island-shaped green pixel formation sections 3G alone. Moreover, the green pixel formation sections 3G of the green color layer 3 are overlapped with the green pixel windows 1G of the red color layer 1 and the green pixel windows 2G of the blue color layer 2, where the green pixel windows 1G and 2G are overlapped with each other, defining the green pixels.

Furthermore, the corresponding red inter-pixel parts of the stripe-shaped red pixel formation sections 1R of the red color layer 1 and the connection sections 1L thereof are overlapped with the corresponding connection sections 2L of the blue color layer 2 or the blue inter-pixel parts of the stripe-shaped blue pixel formation sections 2B thereof, forming the light-shielding sections 12. The light-shielding sections 12, which have a two-layer structure comprising the red color layer 1 and the blue color layer 2 overlapped, have the same pattern as a black matrix. The green color layer 3, which is not used for the light-shielding sections 12, is patterned to form the island-shaped green pixel formation sections 3G. The green pixel formation sections 3G are arranged in the overlapped green pixel windows 1G and 2G.

The widths of the blue inter-pixel parts of the blue color layer 2 and the connection sections 2L thereof are slightly larger than the widths of the red inter-pixel parts of the red color layer 1 and the connection sections 1L thereof. Therefore, as shown in FIGS. 10A and 11A, the both edges of the blue inter-pixel parts of the blue color layer 2 and the connection sections 2L thereof, which are placed on the red inter-pixel parts of the red color layer 1 or the connection sections 1L thereof, are contacted with the surface of the glass plate 9.

The green color layer 3 comprises the rectangular island-shaped green pixel formation sections 3G alone and does not have green inter-pixel parts like the green color layer 103 (see FIG. 1C) used in the prior-art color filter. Thus, as shown in FIGS. 10A and 11A, the green pixel formation sections 3G are approximately fitted in the corresponding green pixel windows 1G and 2G and are scarcely overlapped with the light-shielding sections 12. Therefore, it may be said that the light-shielding sections 12 even at the positions on which the sections 3G are placed have a two-layer structure comprising the red and blue color layers 1 and 2. However, in consideration of the possible alignment errors during the process of forming the red, blue, and green color layers 1, 2, and 3, appropriate margins are given to the patterns for the layers 1, 2, and 3. As a result, the peripheries of the green pixel formation sections 3G are slightly overlaid on the light-shielding sections 12 due to the margins. The overlapped parts 10 of the sections 3G and 12 caused by the said overlaying may be termed "protruding parts" below. This is because the overlapped parts 10 protrude above the light-shielding sections 12 and at the same time, the parts 10 are rectangular ring-shaped in such a way as to extend along the peripheries of the respective green pixels.

The overlapping amount of the overlapped parts 10 between the green pixel formation sections 3G and the light-shielding sections 12 should be minimized to an extent that optical leakage does not occur due to the alignment errors among the color layers 1, 2, and 3. Concretely speaking, it is preferred that the overlapping amount of the overlapped parts 10 is 5.0 μm or less. 3.0 μm or less is more preferred.

Since the green pixel formation sections 3G are aligned along the Y direction to be adjacent to each other, the adjoining overlapped parts (the protruding parts) 10 are aligned on the light-shielding sections 12 in such a way that corresponding inter-color parts 13 intervene between the overlapped parts 10, as shown in FIG. 10A. On the other hand, what is adjacent to the green pixel formation section 3G along the X direction is the red pixel formation section 1R or the blue pixel formation section 2B and therefore, the inter-color parts 13 do not exist along the X direction, as shown in FIG. 11A.

Figure 3A:
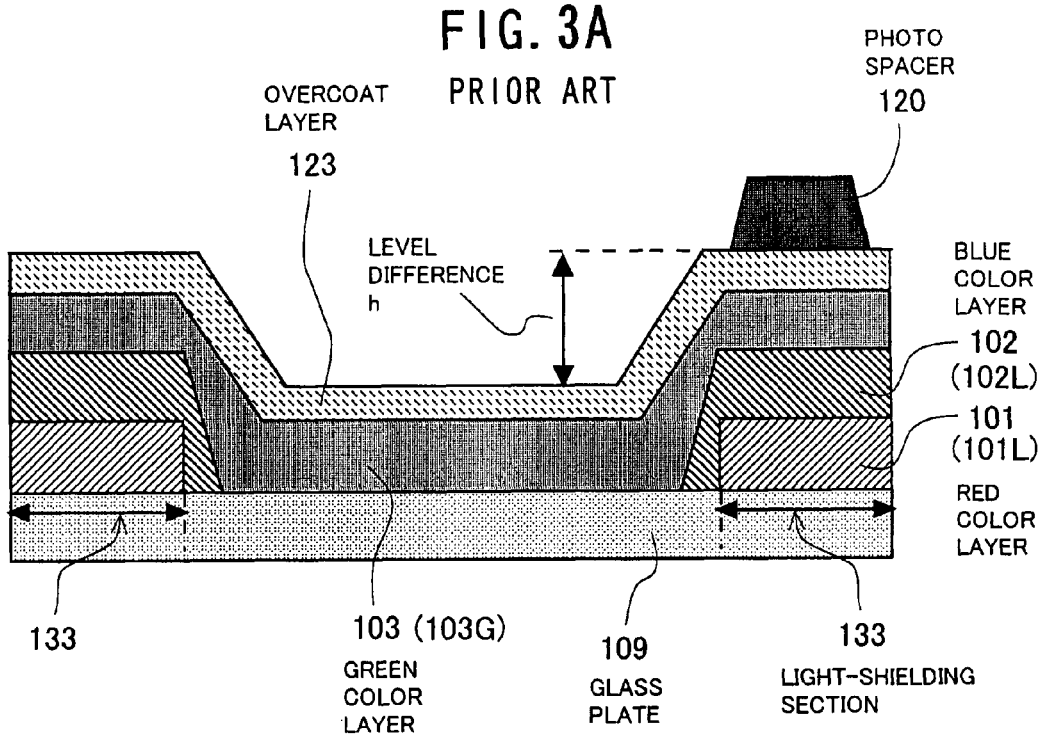
FIG. 3A is an explanatory partial cross-sectional view along the line IIIA-IIIA in FIG. 2.

The cross-sectional view of the part including the green pixel along the Y direction is shown in FIG. 10A. As seen from FIG. 10A, there is a level difference "a" between the green pixel (the green pixel formation section 3G) and the light-shielding section 12 adjoining thereto. The difference "a" is approximately equal to the result of subtracting the thickness of the green color layer 3 from the sum of the height of the two-layered light-shielding section 12 (which is equal to the sum of the thicknesses of the red and blue color layers 1 and 2) and the height (thickness) of the overlapped part (protruding part) 10. Moreover, the difference "a" is smaller than the level difference "h" (see FIG. 3A) between the green pixel and the three-layered light-shielding section 133 adjoining thereto of the prior-art color filter (i.e., a <h). This is because the following reason. Specifically, the light-shielding section 133 of the prior-art filter has the three-layer structure. On the other hand, with the filter of the first embodiment of the invention, the overlapped part 10 is simply placed on the light-shielding section 12 having the two-layer structure, where the thickness of the overlapped part 10 is sufficiently smaller than that of the green color layer 3.

The cross-sectional view of the part including the green pixel (the green pixel formation section 3G) along the X direction is shown in FIG. 11A. As seen from FIG. 11A, there is a level difference "c" between the green pixel and the light-shielding section 12 adjoining thereto. The difference "c" is equal to the difference "a". This is because the plan shape of the overlapped part 10 is like a rectangular ring.

In this way, with the color filter according to the first embodiment of the invention, the level difference "a" (i.e., the level difference "c") can be made smaller than the level difference h of the prior-art color filter over the whole effective display region.

Figure 12A:
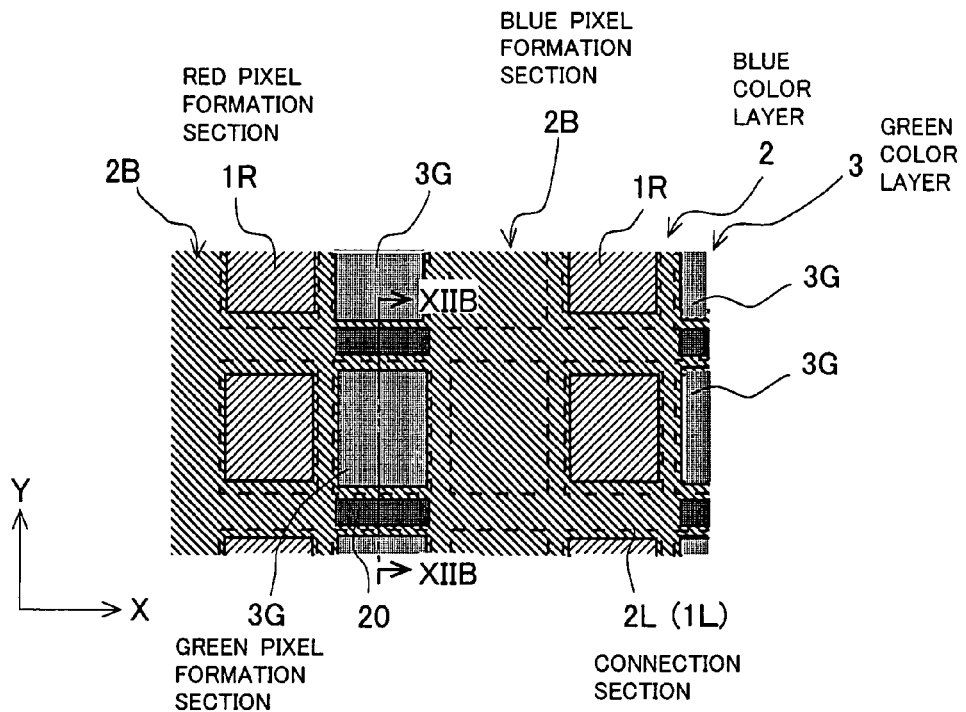
FIG. 12A is an explanatory partial plan view of the color filter according to the first embodiment, which shows an example of the layout of the photo spacers.
Figure 12B:
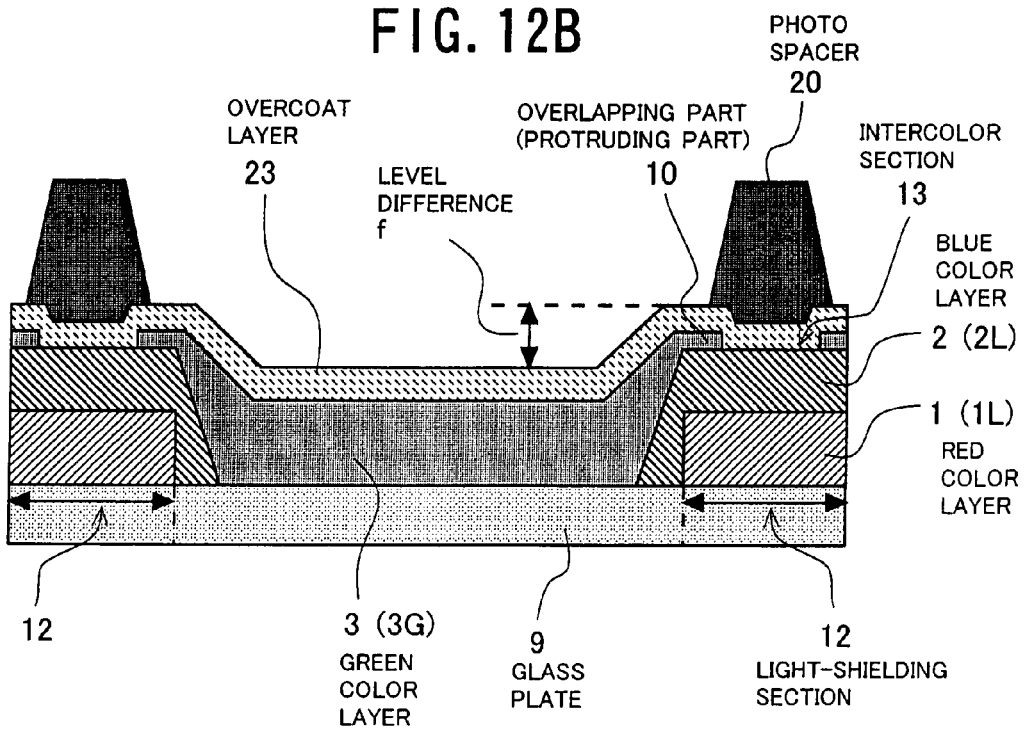
FIG. 12B is an explanatory partial cross-sectional view along the line XIIB-XIIB in FIG. 12A.

With the color filter according to the first embodiment of the invention, for example, photo spacers 20 are arranged as shown in FIGS. 12A and 12B. Specifically, as shown in FIGS. 12A and 12B, the red, blue and green color layers 1, 2 and 3 are overlapped in this order on the surface of the glass plate 9. An overcoat layer 23 is formed on the green color layer 3. The overcoat layer 23 covers the color layers 1, 2 and 3 over the whole effective display region. At the positions located over the light-shielding sections 12 right over the corresponding inter-color parts 13 of the green pixel formation sections 3G, the spacers 20 are formed to have a rectangular (belt-like) plan shape. This means that the spacers 20 are formed in such a way as to bury or fill the whole corresponding inter-color parts 13. The width (the length along the Y direction) of the spacers 20 is slightly smaller than that of the light-shielding section 12. The length (the length along the X direction) of the spacers 20 is approximately equal to that of the green pixel formation section 3G. These spacers 20 are formed by patterning a known photoresist (photosensitive resin) film.

By forming the photo spacers 20 in the above-described way, the overlapped parts (protruding parts) 10 of the green pixel formation sections 3G on the light-shielding sections 12 are embedded or absorbed in the corresponding spacers 20. Therefore, almost all the bad effects induced by the overlapped parts 10 can be eliminated. In other words, the light-shielding sections 12 have a structure like a three-layered one due to existence of the overlapped parts 10; however, the height (thickness) of the overlapped parts 10 is included or absorbed in the height of the spacers 20. Therefore, the resultant structure will be approximately the same structure as that the overlapped parts 10 are omitted.

Figure 14:
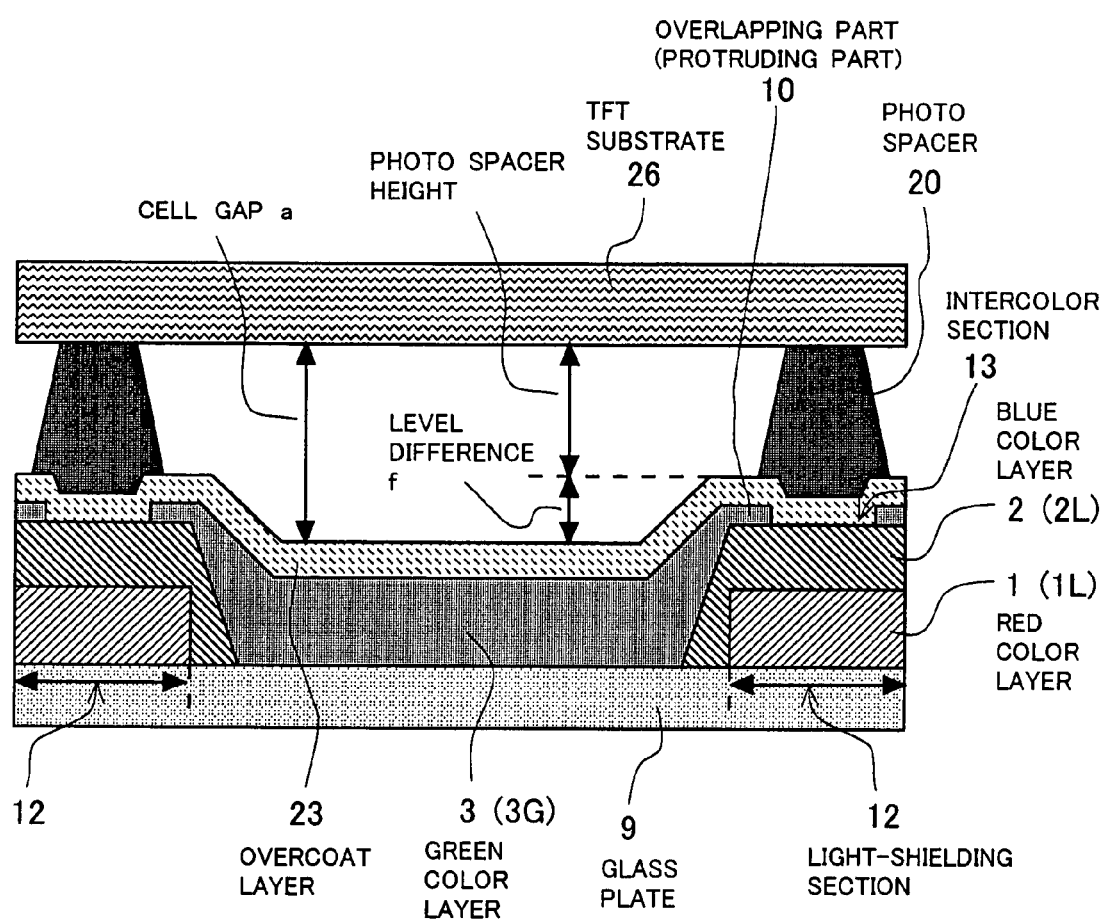
FIG. 14 is an explanatory partial cross-sectional view showing the state where the TFT substrate is coupled with the color filter according to the first embodiment shown in FIGS. 12A and 12B.

FIG. 14 shows the state where the TFT substrate 26 is coupled with the color filter of the first embodiment having the structure of FIGS. 12A and 12B. As clearly seen from FIG. 14, the cell gap "a" is equal to the sum of the height of the photo spacers 20 and the level difference "f". However, the difference "f" is smaller than the difference "h" of the prior-art filter (i.e., f<h). Thus, there is an advantage that the height of the spacers 20 can be increased by the difference between "h" and "f".

By the way, with the color filter of the first embodiment, the overlapped parts 10 can be removed by polishing to avoid the effects of the parts 10. It is more preferred that the overlapped parts 10 are removed. This is easily realized by polishing the whole surface of the glass plate 9 with a known polishing apparatus, because the parts 10 are rectangular ring-shaped and the gross area of the parts 10 is by far smaller than that of the prior-art color filter.

Figure 9C:
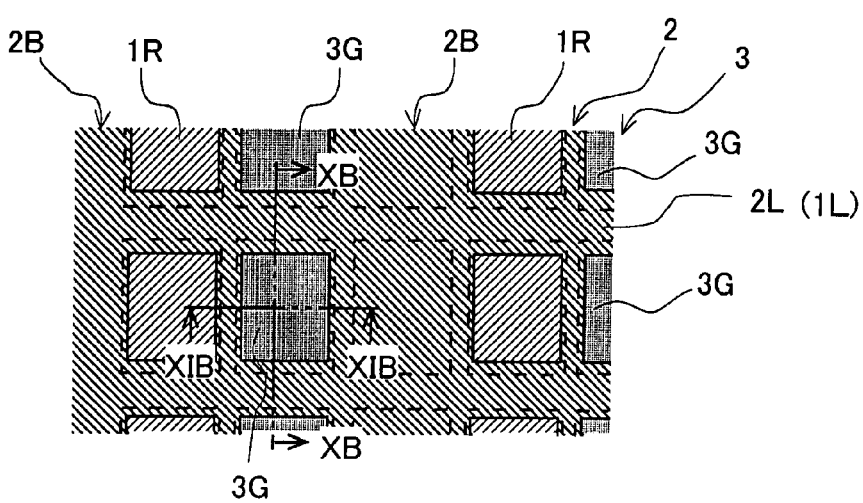
Figure 10B:
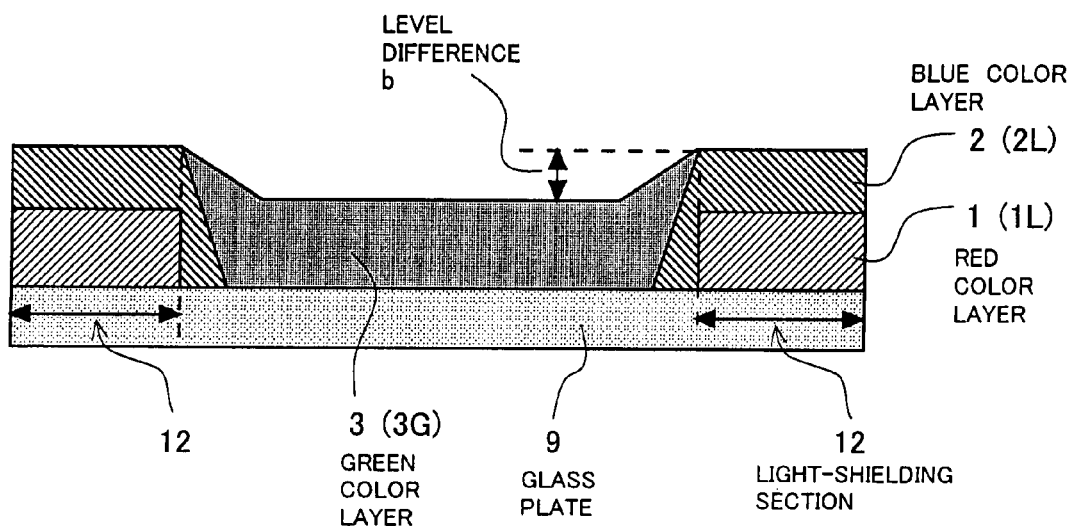
FIG. 10B is an explanatory partial cross-sectional view along the line XB-XB in FIG. 9C.
Figure 11B:
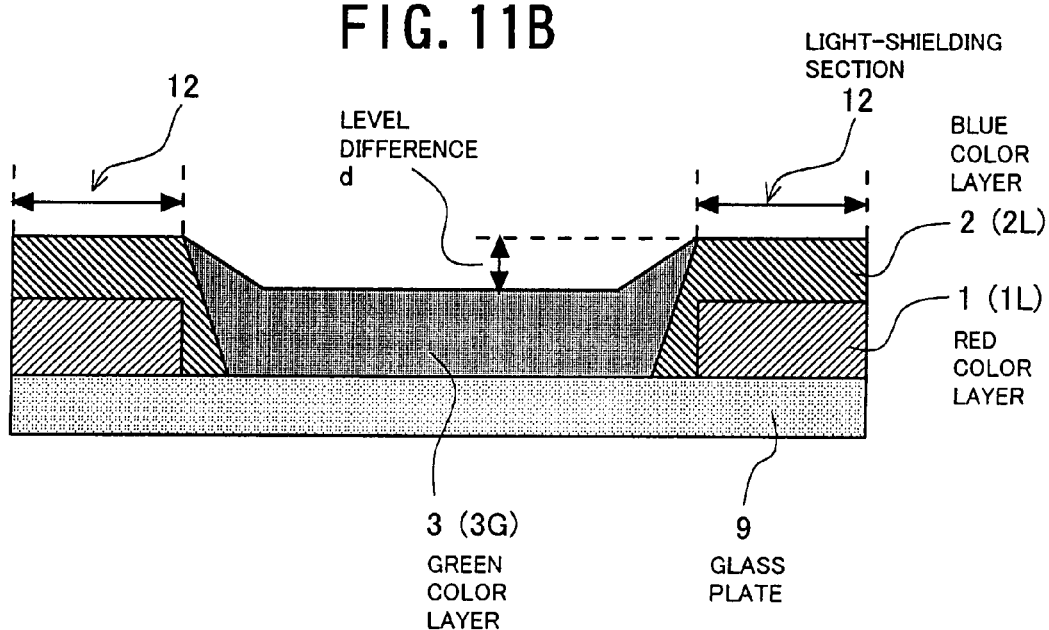
FIG. 11B is an explanatory partial cross-sectional view along the line XIB-XIB in FIG. 9C.

The cross-sectional structure of the color filter after the overlapped parts 10 are removed is shown in FIGS. 9C, 10B, and 11B. In this case, since the parts 10 do not exist, the level differences "b" and "d" are smaller than the level differences "a" and "c", respectively. Thus, this is more preferred than the case including the parts 10. However, there is a disadvantage that the polishing process for removing the parts 10 is added. Accordingly, when the small level difference is important, it is preferred to remove the parts 10 by polishing. On the other hand, when the fabrication cost is important, it is preferred not to remove the parts 10. In addition, the difference "d" is equal to the difference "b".

Figure 13A:
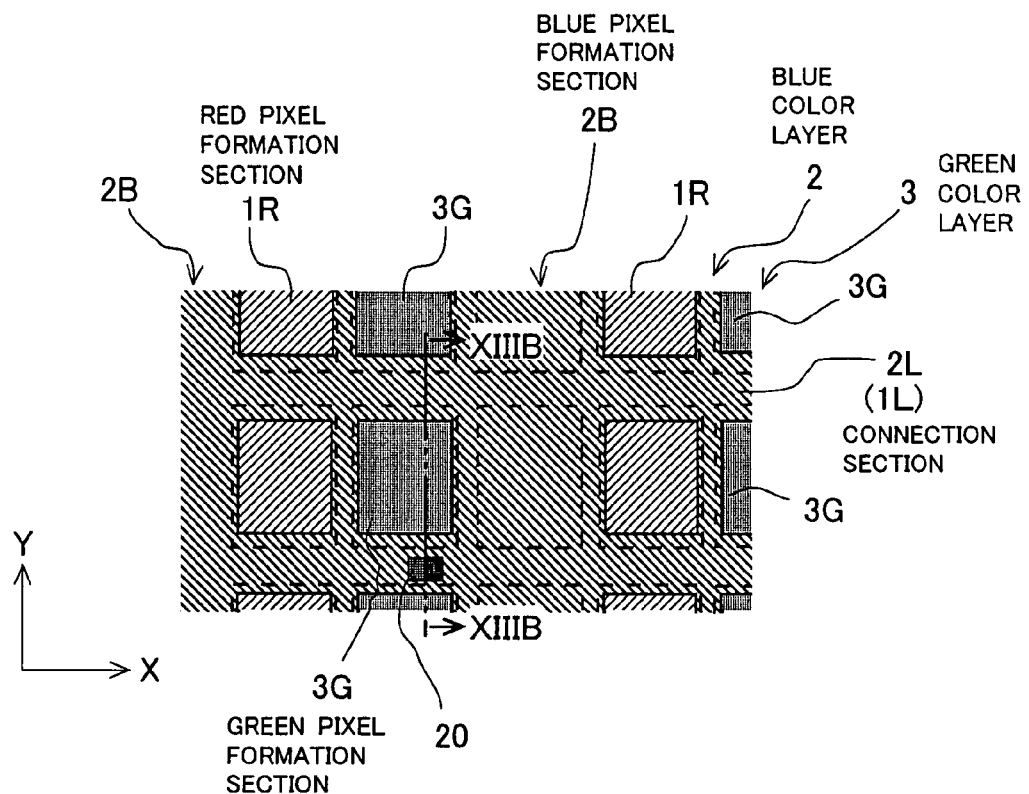
FIG. 13A is an explanatory partial plan view of the color filter according to the first embodiment, which shows another example of the layout of the photo spacers.
Figure 13B:
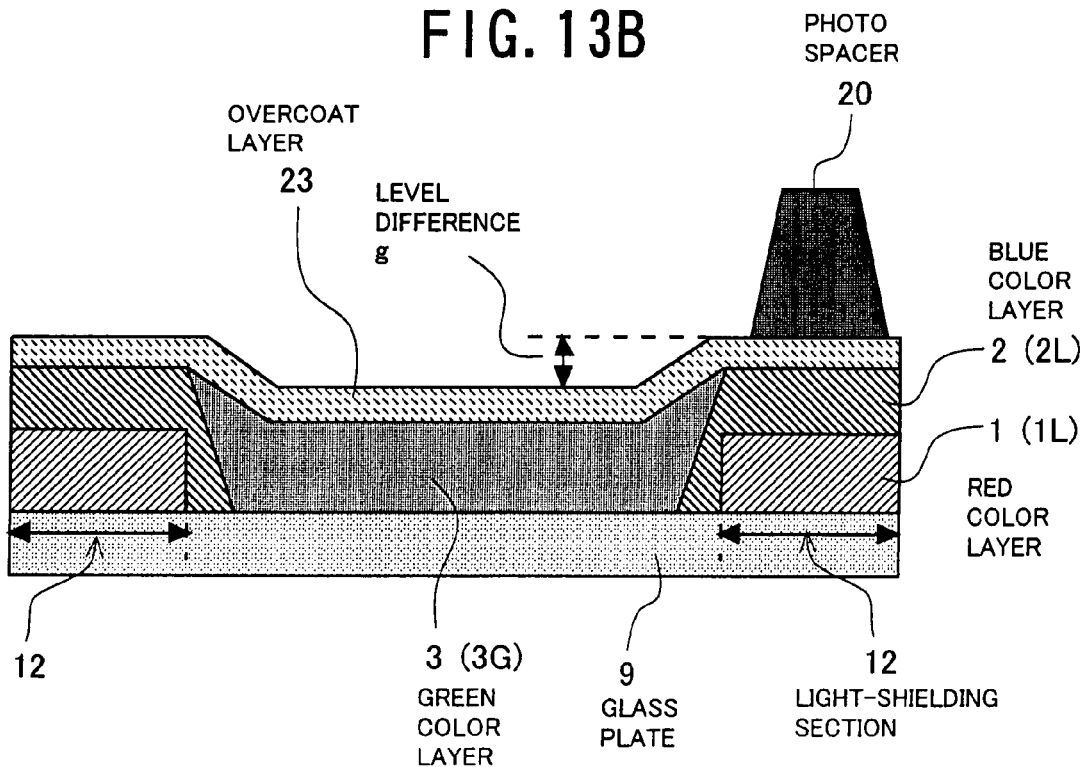
FIG. 13B is an explanatory partial cross-sectional view along the line XIIIB-XIIIB in FIG. 13A.

FIG. 13A shows an example of the arrangement of the photo spacers 20, where the overlapped parts 10 of the sections 3G on the light-shielding sections 12 are removed by polishing. In this case, since the parts 10 do not exist on the light-shielding sections 12, and the green pixel formation sections 3G are fitted in the green pixel windows 1G and 2G, the vicinity of the spacer 20 has the cross-sectional structure shown in FIG. 13B. As seen from FIG. 13B, the level difference "g" between the green pixels (the green pixel formation sections 3G) and the light-shielding sections 12 is equal to the subtraction result of the height of the sections 12 from the thickness of the overlapped parts 10.

In the example of FIG. 13A, since the overlapped parts 10 and the inter-color parts 13 do not exist on the light-shielding sections 12, it is unnecessary that the photo spacers 20 are formed belt-shaped to cover the whole overlapped parts 10 (i.e., the inter-color parts 13), as shown in FIG. 12A. This means that the freedom of arrangement of the spacers 20 is very high. Accordingly, for example, the spacers 20 may be formed bar- or columnar-shaped to cover only the very narrow areas near the sections 12, as shown in FIG. 13A.

Figure 15:
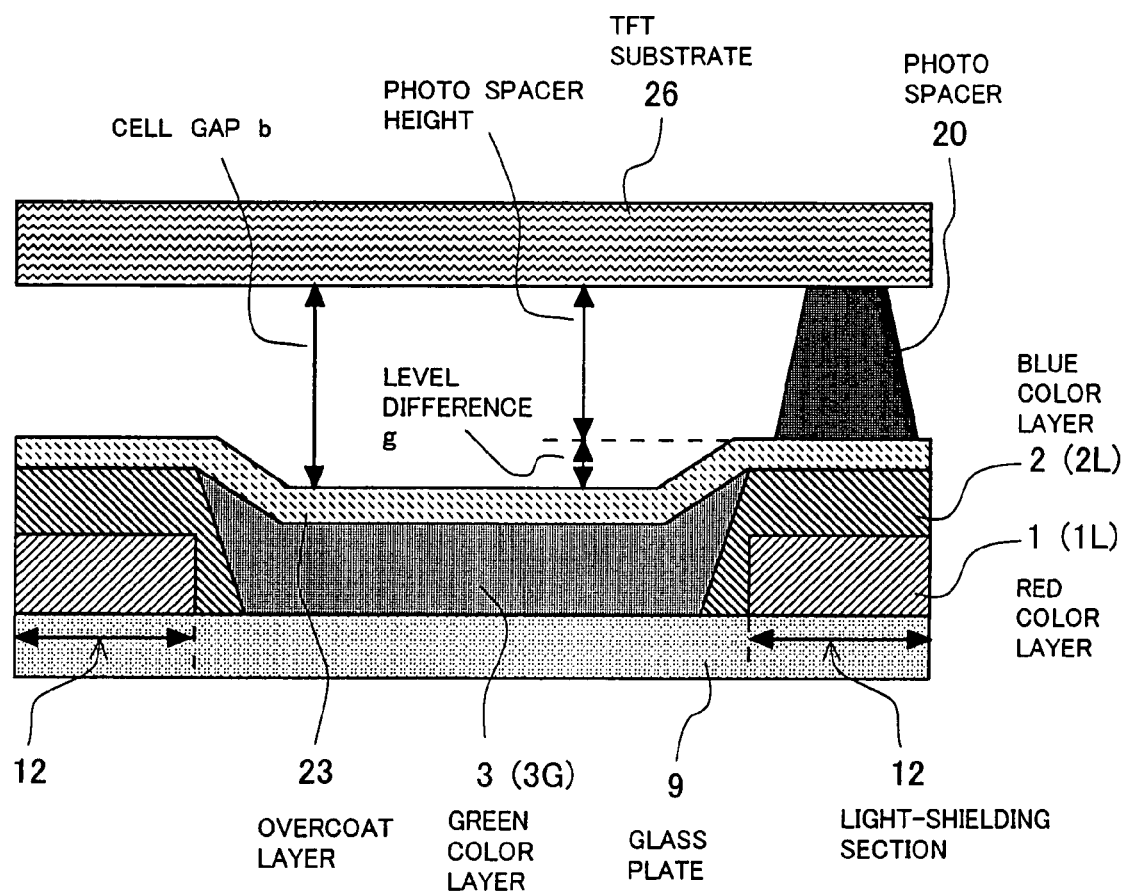
FIG. 15 is an explanatory partial cross-sectional view showing the state where the TFT substrate is coupled with the color filter according to the first embodiment shown in FIGS. 13A and 13B.

FIG. 15 shows the state where the TFT substrate 26 is coupled with the color filter of the first embodiment without the overlapped parts 10. As clearly seen from FIG. 15, the cell gap "b" is equal to the sum of the height of the photo spacers 20 and the level difference "g". However, the difference "g" is smaller than the difference "f" of the case including the parts 10 (i.e., g<f). Thus, there is an advantage that the height of the spacers 20 can be increased by the difference between "f" and "g".

The level difference "f" or "g" needs to be a value that does not give any bad effects. The level difference "f" or "g" needs to be 3.0 μm or less. Preferably, the level difference "f" or "g" is 1.5 μm or less by planarizing by way of, for example, adjusting the thickness of the overcoat layer 23.

With the color filter according to the first embodiment of the invention, as explained above in detail, the red color layer 1 having the shape or pattern of FIG. 8A, the blue color layer 2 having the shape or pattern of FIG. 8B, and the green color layer 3 having the shape or pattern of FIG. 8C are formed to be overlapped with each other on the glass plate 9. The overlapped parts 10 of the red color layer 1 and the blue color layer 2 function as the light-shielding sections 12. Therefore, a black matrix for forming the light-shielding sections 12 is unnecessary.

The green pixel formation sections 3G of the green color layer 3 are island-shaped apart from each other. Moreover, the sections 3G are arranged in the green pixel windows 1G of the red color layer 1 and the green pixel windows 2G of the blue color layer 2 overlapped with each other, defining the green pixels. Therefore, by appropriately adjusting the size of the green pixel formation sections 3G, the sections 3G can be scarcely placed on the overlapped parts 10 of the red and blue color layers 1 and 2 having the function of the light-shielding sections 12. This means that the level difference between the light-shielding sections 12 and the red, blue or green color layer 1, 2, or 3 or pixels (i.e., the colored materials that form the pixels of the respective colors) can be reduced. In addition, such the reduction of the level difference can be realized by an easy method. This is because the reduction of the level difference between the light-shielding sections 12 and the red, blue or green color layer 1, 2, or 3 or pixels can be obtained by making the green pixel formation sections 3G of the green color layer 3 island-shaped to be apart from each other.

Moreover, by appropriately adjusting the size of the green pixel formation sections 3G (which are not used for forming the light-shielding sections 12), the sections 3G can be arranged on the glass plate 9 in such a way that the peripheries of the sections 3G are scarcely placed on the overlapped parts 10 of the red and green color layers 1 and 2 that provide the light-shielding function. Therefore, the amount of the green layer 3 (i.e., the sections 3G) placed on the light-shielding sections 12 is limited to a small value. As a result, the sections 3G placed on the light-shielding sections 12 can be easily removed by polishing.

Furthermore, it is sufficient that the red and blue color layers 1 and 2 are respectively formed to have the stripe-shaped red and blue pixel formation sections 1R and 2B and the connection sections 1L and 2L, and that the green color layer 3 is formed to have the island-shaped pixel formation sections 3G. Therefore, the patterning process of the respective color layers (i.e., the red, blue, and green color layers 1, 2 and 3) to obtain a desired light-shielding performance can be conducted easily.

In addition, with the above-described color filter according to the first embodiment, the light-shielding sections 12 have the two-layer structure comprising the red and blue color layers 1 and 2. This is because this combination minimizes the optical transmittance (in other words, it maximizes the OD value). Since the sections 12 may include the red and blue color layers 1 and 2, the blue color layer 2 may be overlaid on the red color layer 1 as explained above or the red color layer 1 may be overlaid on the blue color layer 2.

Here, the above-described first embodiment of the invention refers to the case that the light-shielding sections 12 are "inter-pixel light-shielding sections". However, the light-shielding sections 12 are applicable to the "TFT light-shielding sections" located to be opposite to the TFTs, and the "frame area" that is placed outside the effective display area and that surrounds the effective display area.

LCD Device of First Embodiment

An LCD device according to the first embodiment of the invention comprises the TFT substrate 26 having any structure. Here, the structure of the IPS type shown in FIGS. 16, 17, 18A and 18B is used. This structure is approximately the same as that illustrated in FIGS. 1 to 3 of the Japanese Non-Examined Patent Publication No. 2005-241923. This LCD device is designed to operate in the normally black mode.

Figure 16:
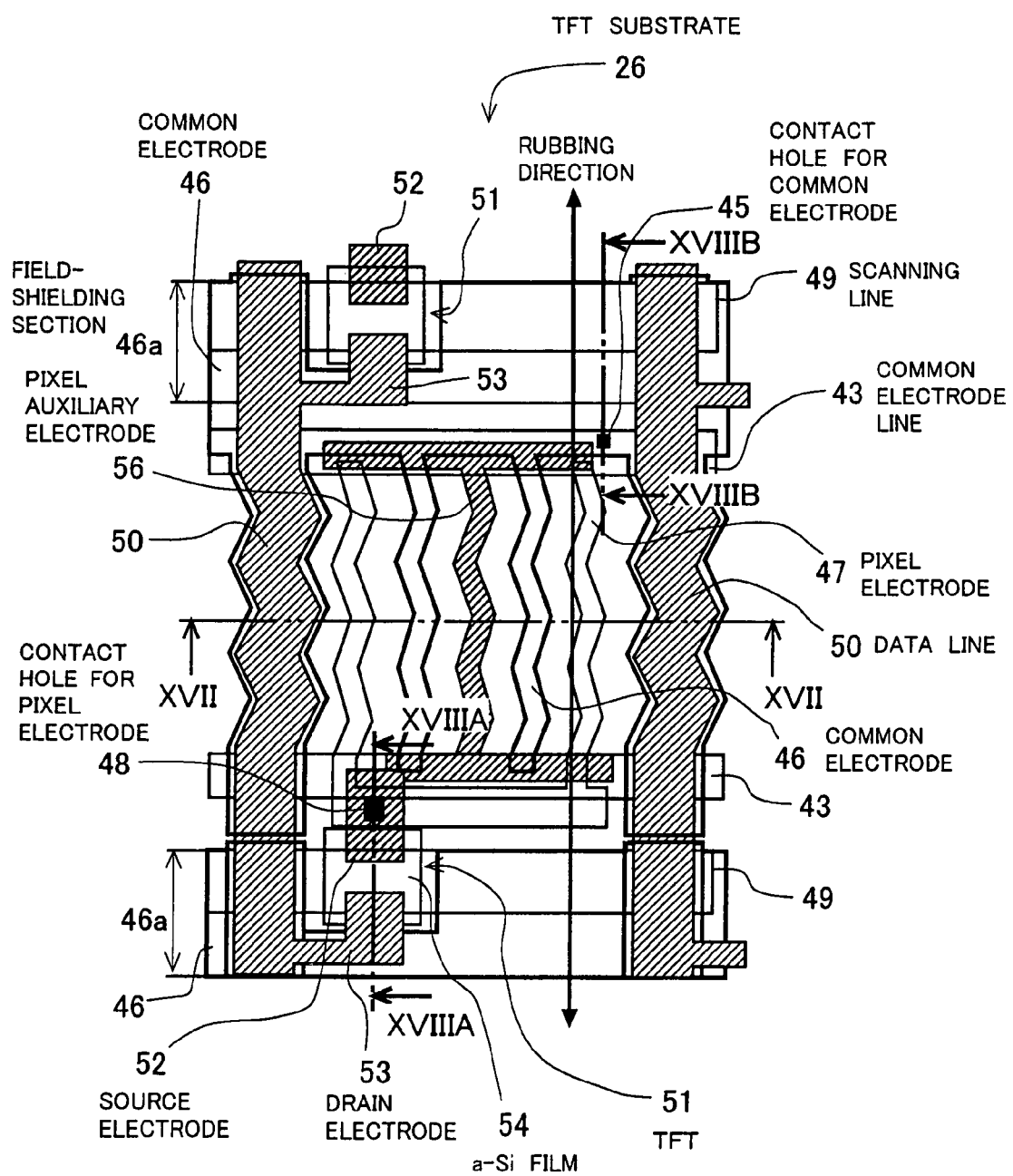
FIG. 16 is a partial plan view showing the structure of the TFT substrate coupled with the color filter according to the first embodiment of the invention.
Figure 17:
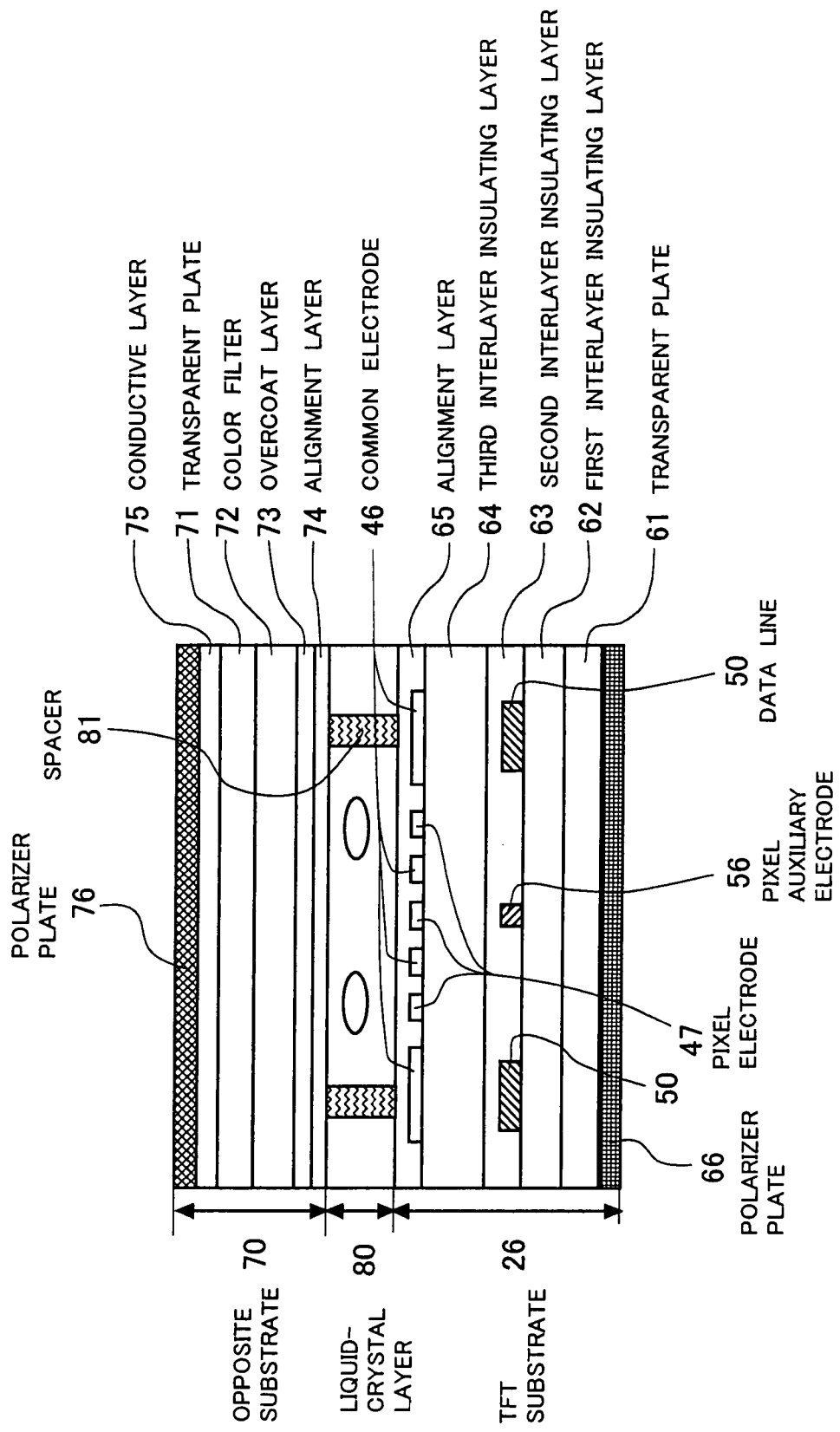
FIG. 17 is an explanatory partial cross-sectional view of a LCD device comprising an opposite substrate using the color filter according to the first embodiment of the invention and the TFT substrate of FIG. 16 coupled with the opposite substrate, which shows the cross-sectional structure of the device along the line XVII-XVII in FIG. 16.
Figure 18A:
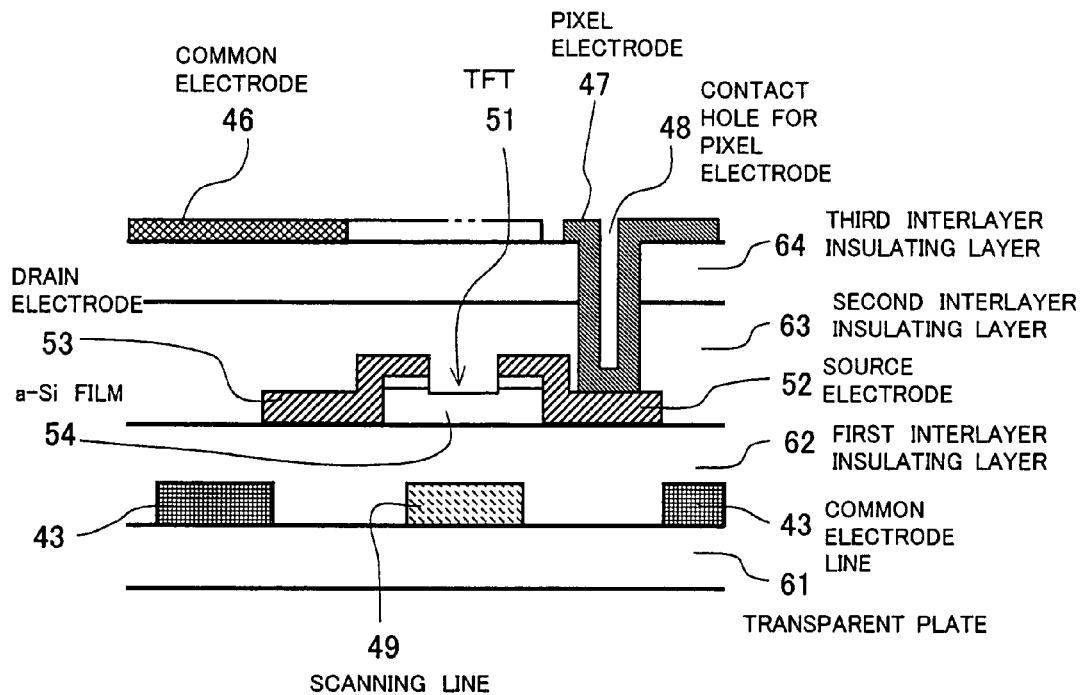
FIG. 18A is an explanatory partial cross-sectional view along the line XVIIIA-XVIIIA in FIG. 16, which shows the cross-sectional structure of the TFT substrate of FIG. 16.
Figure 18B:
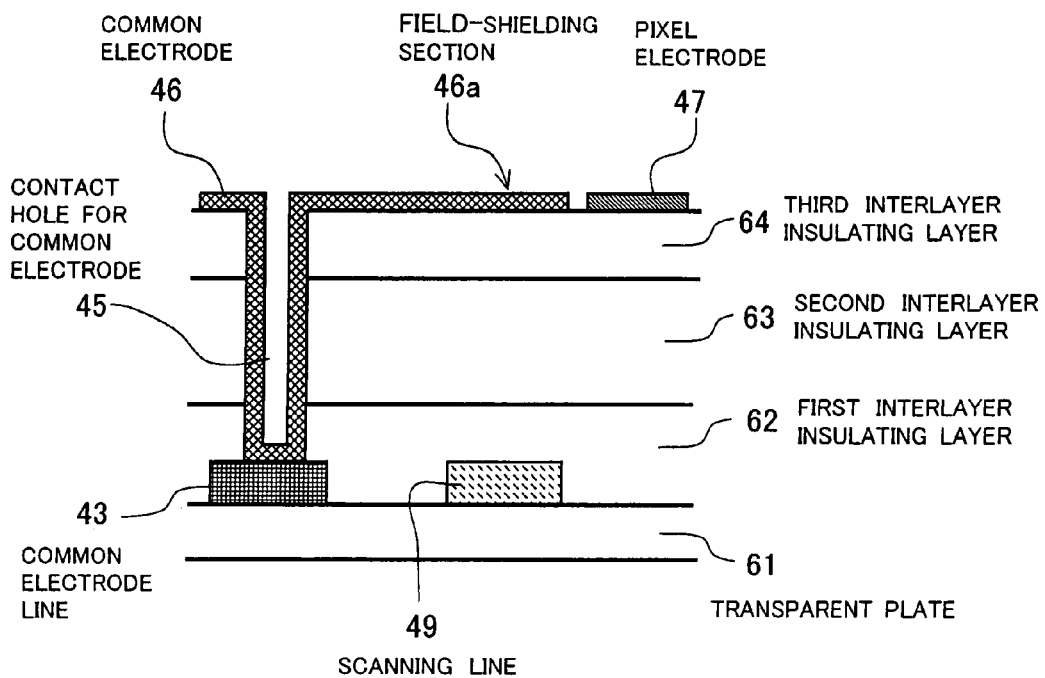
FIG. 18B is an explanatory partial cross-sectional view along the line XVIIIB-XVIIIB in FIG. 16, which shows the cross-sectional structure of the TFT substrate of FIG. 16.

FIG. 16 is a partial plan view showing the structure of the TFT substrate 26 coupled with the color filter according to the first embodiment. FIG. 17 shows the cross-sectional structure of the device along the line XVII-XVII in FIG. 16. FIG. 18A shows the cross-sectional structure of the TFT substrate along the line XVIIIA-XVIIIA in FIG. 16. FIG. 18B shows the cross-sectional structure of the TFT substrate along the line XVIIIB-XVIIIB in FIG. 16.

As shown in FIG. 16, the TFT substrate 26 comprises a common electrode line 43 made of metal, a contact hole 45 for a common electrode, a comb-teeth-shaped transparent common electrode 46, a field-shielding section 46a of the common electrode 46 which shields the leaked electric field from the TFT 51, a comb-teeth-shaped transparent pixel electrode 47, a contact hole 48 for the pixel electrode 47, a scanning line 49, a data line 50, a TFT 51, a source electrode 52 of the TFT 51, a drain electrode 53 of the TFT 51, an island-shaped a-Si film 54 for forming an active layer of the TFT 51, and a pixel auxiliary electrode 56.

The pixel electrode 47 has three zigzag-shaped comb teeth. The common electrode 46 has four zigzag-shaped comb teeth. The pixel electrode 47 and the common electrode 46 are arranged in such a way as to be alternately engaged with each other in the region surrounded by the adjoining scanning lines 49 and the adjoining data lines 50. The two teeth of the common electrode 46 at its each side are overlapped with the corresponding data lines 50, respectively. The pixel auxiliary electrode 56 has one comb tooth superposed on the central tooth of the pixel electrode 47.

Each of the data lines 50 is electrically connected to the drain electrode 53 of a corresponding one of the TFTs 51. Each of the scanning lines 49 is electrically connected to the gate electrode (not shown) of a corresponding one of the TFTs 51. Each of the pixel electrodes 47 is electrically connected to the source electrode of a corresponding one of the TFTs 51 by way of a corresponding one of the contact holes 48, as shown in FIG. 18A. Each of the common electrodes 46 is electrically connected to a corresponding one of the common electrode lines 43 by way of a corresponding one of the contact holes 45, as shown in FIG. 18B.

As shown in FIGS. 17, 18A and 18B, the scanning lines 49 and the common electrode lines 43 are formed by patterning a first metal film (e.g., Cr film or Al alloy film) formed on a transparent plate 61. The first metal film is covered with a first interlayer insulating flayer 62 that serves as the gate insulating films of the TFTs 51.

The island-shaped a-Si films 54 are formed on the first interlayer insulating flayer 62. The pixel auxiliary electrodes 56, the data lines 50, and the source and drain electrodes 52 and 53 are formed by patterning a second metal film (e.g., Cr film or Al alloy film) formed on the first interlayer insulating flayer 62. The source and drain electrodes 52 and 53 are contacted with each end of a corresponding one of the a-Si films 54. The a-Si films 54, the pixel auxiliary electrodes 56, the data lines 50, and the source and drain electrodes 52 and 53 are covered with a second interlayer insulating layer (e.g., an organic film or silicon nitride film) 63.

The pixel electrodes 47 and the common electrodes 46 are formed by patterning a transparent conductive film (e.g., ITO film) formed on a third interlayer insulating layer 64. The third interlayer insulating layer 64 is formed on the second interlayer insulating layer 63. The pixel electrodes 47 and the common electrodes 46, each of which has zigzag-shaped comb teeth, are arranged in such a way as to be alternately engaged with each other and to be apart from each other on the third interlayer insulating layer 64. Responsive to this, the parts of the data lines 50 adjoining to the corresponding pixel electrodes 47 are bent in zigzag.

The field-shielding sections 46a of the common electrodes 46 are provided to prevent the leaked electric field from the scanning lines 49 and the data lines 50 from applying to the liquid-crystal layer 80 (in other words, shielding the leaked electric field). The sections 46a are patterned in such a way as to protrude or partially cover the scanning and data lines 49 and 50 on the third interlayer insulating layer 64. By shielding the leaked electric field from the TFT substrate 26 with the field-shielding sections 46a, the amount of electrification of the red, blue and green color layers 1, 2, and 3 can be decreased. Therefore, the defective orientation of the liquid-crystal molecules (e.g., disclination) is suppressed or avoided and as a result, display defects such as color irregularity can be prevented.

In addition, a polarizer 66 is attached to the outer surface of the transparent plate 61 of the TFT substrate 26.

The LCD device according to the first embodiment of the invention comprises the above-described TFT substrate 26, the opposite substrate 70, and the liquid-crystal layer 80 sandwiched by the substrates 26 and 70, as shown in FIG. 17.

The opposite substrate 70 comprises a color filter 72 formed on a transparent plate 71 (i.e., the glass plate 9), an overcoat layer 73 formed on the color filter 72, an alignment layer 74 formed on the overcoat layer 73, a conductive layer 75 formed on the outer surface of the plate 71, and a polarizer 76 formed on the conductive layer 75. The color filter of the first embodiment corresponds to the color filter 72. The glass plate 9 and the overcoat layer 23 of the color filter of the first embodiment correspond to the glass plate 71 and the overcoat layer 73, respectively.

Since the data lines 50 of the TFT substrate 26 are formed by patterning the second metal film, as described above, the backlight irradiated toward the data lines 50 is shielded by the data lines 50. However, the external light and the reflected light of the external light by the metal wiring lines on the TFT substrate 26 needs to be shielded by the light-shielding sections on the color filter. With the color filter of the first embodiment, to meet this need, the light-shielding function is accomplished by the two-layered light-shielding sections 12 comprising the red and blue color layers 1 and 2.

Moreover, with the TFT substrate 26, as shown in FIG. 16, slits are present between the common electrode lines 43 and the corresponding scanning lines 49 in the vicinities of the scanning lines 49, where these lines 43 and 49 made of opaque metal. Thus, the backlight irradiated toward these regions is unable to be shielded completely by the common electrode lines 43 and the scanning lines 49 alone. To shield the light penetrating through the slits, the field-shielding sections 46a of the transparent common electrodes 46 are formed to cover these slits. As a result, the field-shielding sections 46a are overlapped with the slits and therefore, the light penetrating through the slits can be surely shielded. This is because in the regions of the liquid-crystal layer 80 corresponding to the field-shielding sections 46a, the leaked electric field is shielded by the sections 46a and thus, the liquid crystal molecules in the liquid-crystal layer 80 are not driven. Consequently, the light penetrating through the slits from the backlight unit can be shielded by the polarizers 66 and 67 in the normally black mode.

However, with the TFT substrate 26, to decrease the effect of the sections 46a to the TFTs 51, the field-shielding sections 46a of the common electrodes 46 are formed not to overlap with the TFTs 51. This is due to the following reason: If the sections 46a are overlapped with the TFTs 51, the electric-field shielding effect of the sections 46a increases. In this case, however, there is a high possibility that the sections 46a gives a bad effect to the operation characteristics of the TFTs 51 if the thickness of the second and third interlayer insulating layers 63 and 64 fluctuates to the smaller side due to errors occurring during the fabrication processes. Accordingly, the sections 46a for shielding the electric field leaked from the scanning lines 49 are patterned to avoid the TFTs 51, thereby widening the safety margin.

In this way, by the field-shielding sections 46a of the common electrodes 46, application of the electric field to the liquid crystal molecules in the vicinities of the scanning lines 49 is prevented and at the same time, the light passing through these regions is shielded. Moreover, the external light and the reflected light of the external light by the metal wiring lines on the TFT substrate 26 are shielded by the two-layered light-shielding sections 12 on the color filter.

As explained above, the LCD device according to the first embodiment of the invention comprises the above-described color filter of the first embodiment and the TFT substrate 26 shown in FIGS. 16, 17, and 18A and 18B and therefore, a desired light-shielding function can be realized without a black matrix. As a result, high contrast and good color reproductivity can be obtained and at the same time, high-speed response characteristics can be obtained because a narrower gap than that of the prior-art LCD devices is realized.

Color Filter of Second Embodiment

Figure 20A:
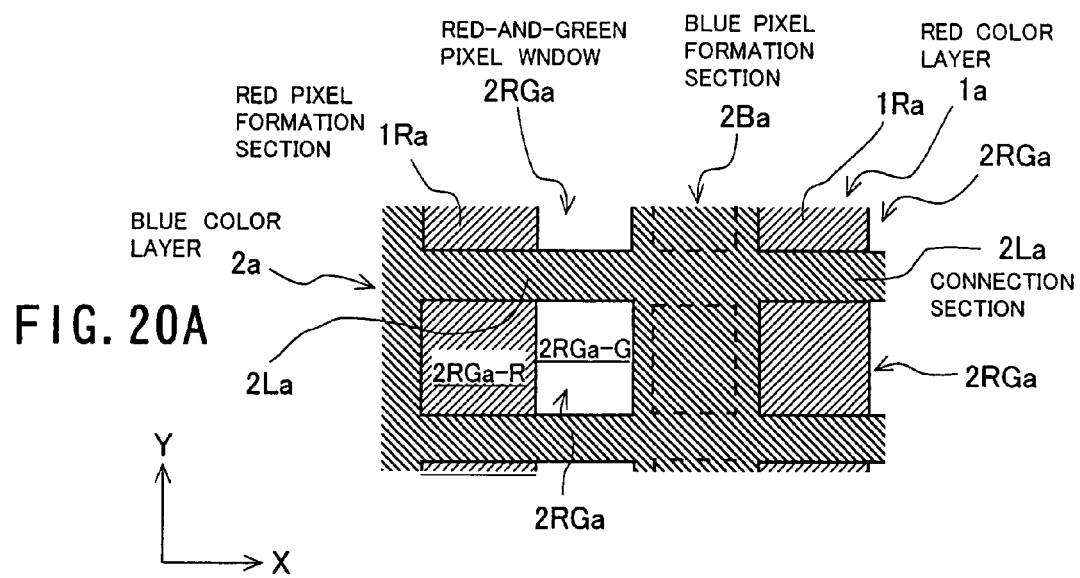
FIGS. 20A to 20C show the process steps of a method of fabricating the color filter according to the second embodiment of FIGS. 19A to 19C.
Figure 20B:
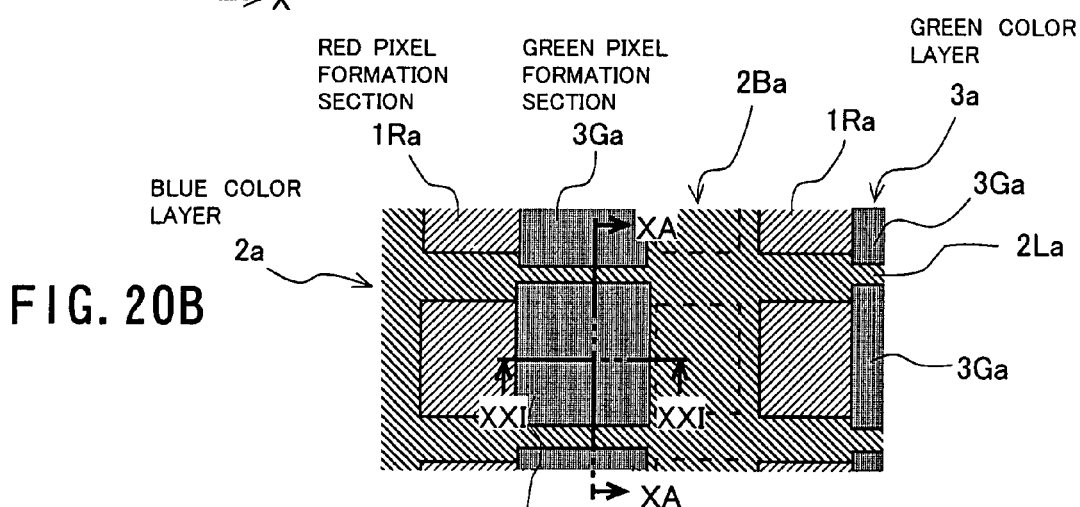

The structure of a color filter for a LCD device according to a second embodiment of the present invention is shown in FIG. 20B. FIG. 20B is a partial plan view of the said color filter.

Figure 19A:
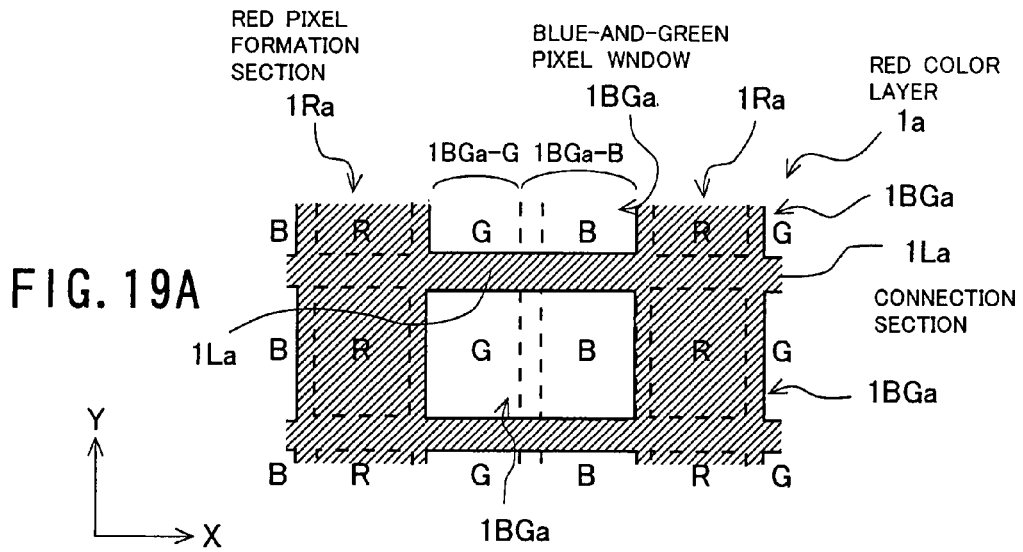
FIGS. 19A to 19C show the patterns of the color layers of a color filter according to a second embodiment of the invention.
Figure 19B:
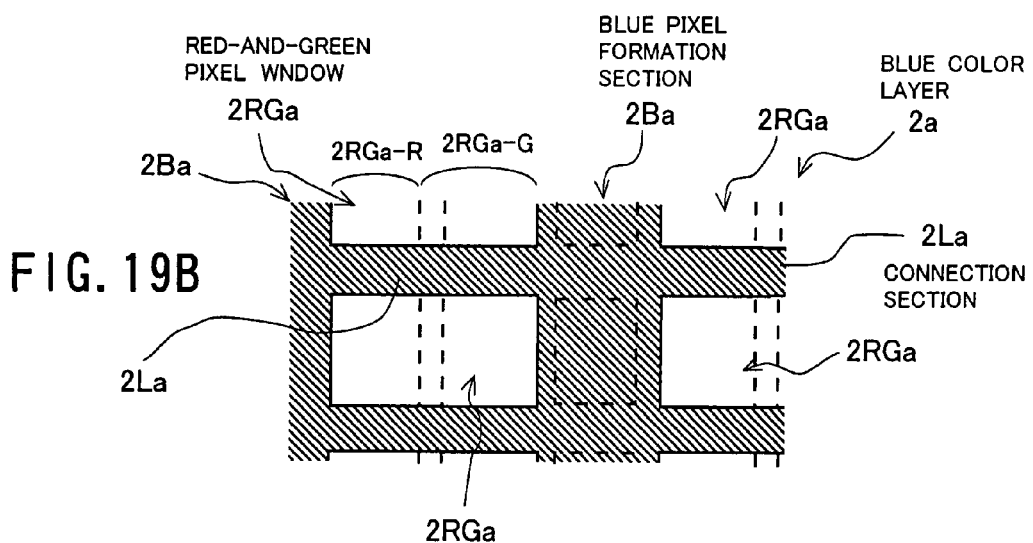
Figure 19C:
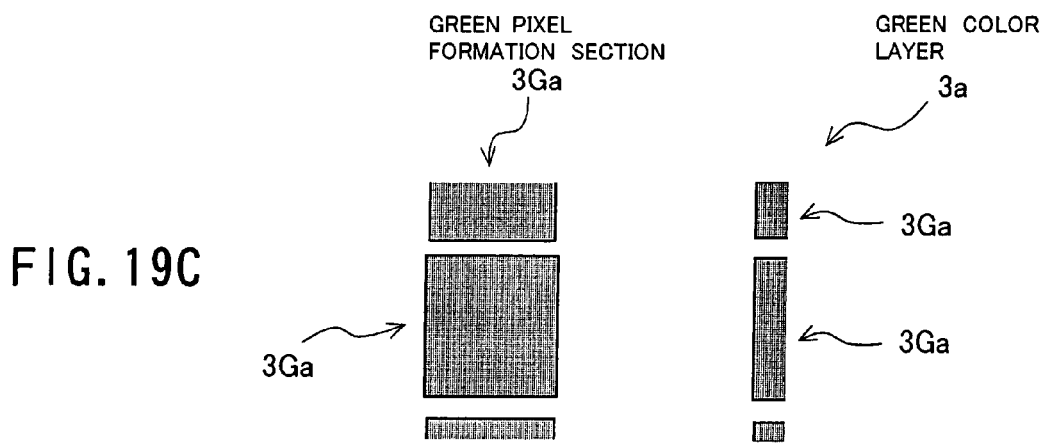

The color filter according to the second embodiment comprises a red color layer 1a having the pattern of FIG. 19A, a blue color layer 2a having the pattern of FIG. 19B, and a green color layer 3a having the pattern of FIG. 19C. The red, blue, and green color layers 1a, 2a, and 3a are overlapped on the surface (i.e., the X-Y plane) of a transparent glass plate (i.e., a transparent support) 9. This color filter does not include a black matrix. This point is the same as the above-described color filter according to the first embodiment. However, the color filter according to the second embodiment is different from that of the first embodiment in that (i) the light-shielding function in the vicinities of the scanning lines on the TFT substrate is realized by overlapping the red and blue color layers 1a and 2a, and that (ii) the light-shielding function in the vicinities of the data lines on the TFT substrate is realized by overlapping the two color layers adjacent to each other (i.e., by overlapping the red and blue color layers 1a and 2a, the blue and green color layers 2a and 3a, and the green and red color layers 3a and 1a).

The red color layer 1a is formed on the surface of the glass plate 9. The layer 1a has stripe-shaped red pixel formation sections 1Ra and connection sections 1La, as shown in FIG. 19A.

The stripe-shaped red pixel formation sections 1Ra are extended along the Y direction and arranged along the X direction at predetermined intervals. The sections 1Ra are used for forming rectangular red pixels arranged in the Y direction at predetermined intervals. Thus, it may be said that each of the sections 1Ra is formed by red pixels and red inter-pixel parts that interconnect the adjoining red pixels.

The connection sections 1La interconnect the adjoining red pixel formation sections 1Ra. Moreover, the connection sections 1La define rectangular blue-and-green pixel windows 1BGa arranged along the Y direction at predetermined intervals. Each of the blue-and-green pixel windows 1BGa is located at a position where a blue pixel and a green pixel adjacent thereto are to be formed. Each of the blue-and-green pixel windows 1BGa is formed by a rectangular blue pixel subwindow 1BGa-B covered with the blue color layer 2a when the blue color layer 2a is overlapped, and a rectangular green pixel subwindow 1BGa-G not covered with the blue color layer 2a even when the blue color layer 2a is overlapped.

Accordingly, the red pixels are aligned along the Y direction at predetermined intervals. The green pixels are aligned along the Y direction at the same intervals as the red pixels in such a way as to be adjacent to the red pixels. The blue pixels are aligned along the Y direction at the same intervals as the red pixels in such a way as to be adjacent to the green pixels. The layout of the red, green and blue pixels thus aligned is repeatedly aligned along the X direction. This point is the same as the first embodiment.

The blue color layer 2a is formed on the surface of the glass plate 9 to be overlapped with the red color layer 1a. The layer 2a has stripe-shaped blue pixel formation sections 2Ba and connection sections 2La, as shown in FIG. 19B.

The stripe-shaped blue pixel formation sections 2Ba are extended along the Y direction and arranged along the X direction at predetermined intervals. The sections 2Ba are used for forming rectangular blue pixels arranged in the Y direction at predetermined intervals. Each of the sections 2Ba is located at a position to be overlapped with the blue pixel subwindow 1BGa-B of the corresponding blue-and-green pixel window 1BGa to the red color layer 1a. Thus, it may be said that each of the sections 2Ba is formed by blue pixels and blue inter-pixel parts that interconnect the adjoining blue pixels.

The connection sections 2La interconnect the adjoining blue pixel formation sections 2Ba. Moreover, the connection sections 2La define rectangular red-and-green pixel windows 2RGa arranged along the Y direction at predetermined intervals. Each of the red-and-green pixel windows 2RGa is located at a position where a set of a red pixel and a green pixel adjoining to each other is to be formed. Each of the red-and-green pixel windows 2RGa is formed by a rectangular green pixel subwindow 2RGa-G covered with the green color layer 3a when the green color layer 3a is overlapped, and a rectangular red pixel subwindow 2RGa-R not covered with the green color layer 3a even when the green color layer 3a is overlapped.

The green color layer 3a is formed on the surface of the glass plate 9 to be overlapped with the red and blue color layers 1a and 2a. The layer 3a has rectangular island-shaped green pixel formation sections 3Ga, as shown in FIG. 19C. The green pixel formation sections 3Ga are formed to be apart from each other, which are not stripe-shaped like the prior-art color filter. Moreover, unlike the red and blue color layers 1a and 2a, the layer 3a does not comprise any connection sections like the connection sections 1La and 2La.

The rectangular island-shaped green pixel formation sections 3Ga are arranged not only along the Y direction at predetermined intervals but also along the X direction at predetermined intervals. The sections 3Ga are used for forming rectangular green pixels arranged in the X and Y directions at predetermined intervals. Each of the sections 3Ga is located at a position to be overlapped with the green pixel subwindow 1BGa-G of the corresponding blue-and-green pixel window 1BGa to the red color layer 1a, and the green pixel subwindow 2RGa-G of the corresponding red-and-green pixel window 2RGa to the blue color layer 2a. Thus, it may be said that each of the sections 3Ga is formed by the green pixels alone and that it comprises no green inter-pixel parts that interconnect the adjoining green pixels.

The color filter of the second embodiment is fabricated by overlapping the red, blue, and green color layers 1a, 2a, and 3a with the above-described patterns in this order. If the red, blue, and green color layers 1a, 2a, and 3a have the patterns of FIGS. 19A to 19C, respectively, any one of the printing, photoresist and etching methods may be used. Here, a fabrication method using the photoresist method is explained below.

First, a film of an appropriate red composite (i.e., a red colored material) is formed on the surface of the glass plate 9 to have a predetermined thickness. The red colored material film thus formed is selectively exposed with a patterned mask and developed. Thus, the red color layer la with the pattern of FIG. 19A is formed.

Next, a film of an appropriate blue composite (i.e., a blue colored material) is formed on the surface of the glass plate 9 to have a predetermined thickness in such a way as to be overlapped with the red colored layer 1a. The blue colored material film thus formed is selectively exposed with a patterned mask and developed. Thus, the blue color layer 2a with the pattern of FIG. 19B is formed. At this time, as shown in FIG. 20A, the blue pixel formation sections 2Ba of the blue color layer 2a are overlapped with the corresponding blue pixel subwindows 1BGa-B of the blue-and-green pixel window 1BGa of the red color layer 1a. The red pixel subwindows 2RGa-R of the red-and-green pixel windows 2RGa of the blue color layer 2a are overlapped with the red pixel formation sections 1Ra of the red color layer 1a. The green pixel subwindows 2RGa-G of the red-and-green pixel windows 2RGa of the blue color layer 2a are overlapped with the green pixel subwindows 1BGa-G of the blue-and-green pixel windows 1BGa of the red color layer 1a.

Subsequently, a film of an appropriate green composite (i.e., a green colored material) is formed on the surface of the glass plate 9 to have a predetermined thickness in such a way as to be overlapped with the red and blue color layers 1a and 2a. The green colored material film thus formed is selectively exposed with a patterned mask and developed. Thus, the green color layer 3a with the pattern of FIG. 19C is formed. As a result, the color filter of the second embodiment is obtained. The state at this stage is shown in FIG. 20B. At this time, the island-shaped green pixel formation sections 3Ga of the green color layer 3a are arranged in the corresponding green pixel subwindows 1BGa-G of the blue-and-green pixel windows 1BGa of the red color layer 1a and the corresponding green pixel subwindows 2RGa-G of the red-and-green pixel windows 2RGa of the blue color layer 2a overlapped with each other. The green pixel subwindows 1BGa-G and 2RGa-G are overlapped with each other.

As seen from FIG. 20B, the red pixels are defined by the red pixel formation sections 1Ra of the red color layer 1a, the red-and-green pixel windows 2RGa of the blue color layer 2a overlapped with the red pixel formation sections 1Ra, and the green pixel formation sections 3Ga of the green color layer 3a overlapped with the red and blue color layers 1a and 2a. The blue pixels are defined by the blue pixel formation sections 2Ba of the blue color layer 2a, the blue-and-green pixel windows 1BGa of the red color layer 1a overlapped with the blue pixel formation sections 2Ba, and the green pixel formation sections 3Ga of the green color layer 3a overlapped with the red and blue color layers 1a and 2a. The green pixels are defined by the green pixel formation sections 3Ga of the green color layer 3a, the blue-and-green pixel windows 1BGa of the red color layer 1a overlapped with the blue color layer 2a, and the red-and-green pixel windows 2RGa of the blue color layer 2a overlapped with the red and blue color layers 1a and 2a.

The connection sections 2La and the blue inter-pixel parts of the blue color layer 2a, both of which are extended along the X direction, are overlapped with the connection sections 1La or the red inter-pixel parts of the red color layer 1a extending along the X direction. The overlapped parts of the red color layer 1a and the blue color layer 2a form the light-shielding sections similar to those in the first embodiment. This means that the overlapped parts of the red and blue color layers 1a and 2a that extend along the X direction form the light-shielding sections extending along the X direction (i.e., the X-direction light-shielding sections). Since these X-direction light-shielding sections have the two-layer structure comprising the red and blue color layers 1a and 2a, which is the same as that of the light-shielding sections 12 in the color filter of the first embodiment, the same reference symbol 12 is attached to the said light-shielding sections below. The X-direction light-shielding sections 12 are used to light-shield the regions corresponding to the scanning lines 49 (which are extended along the X direction) of the TFT substrate 26a (see FIG. 22) explained later.

Figure 21:
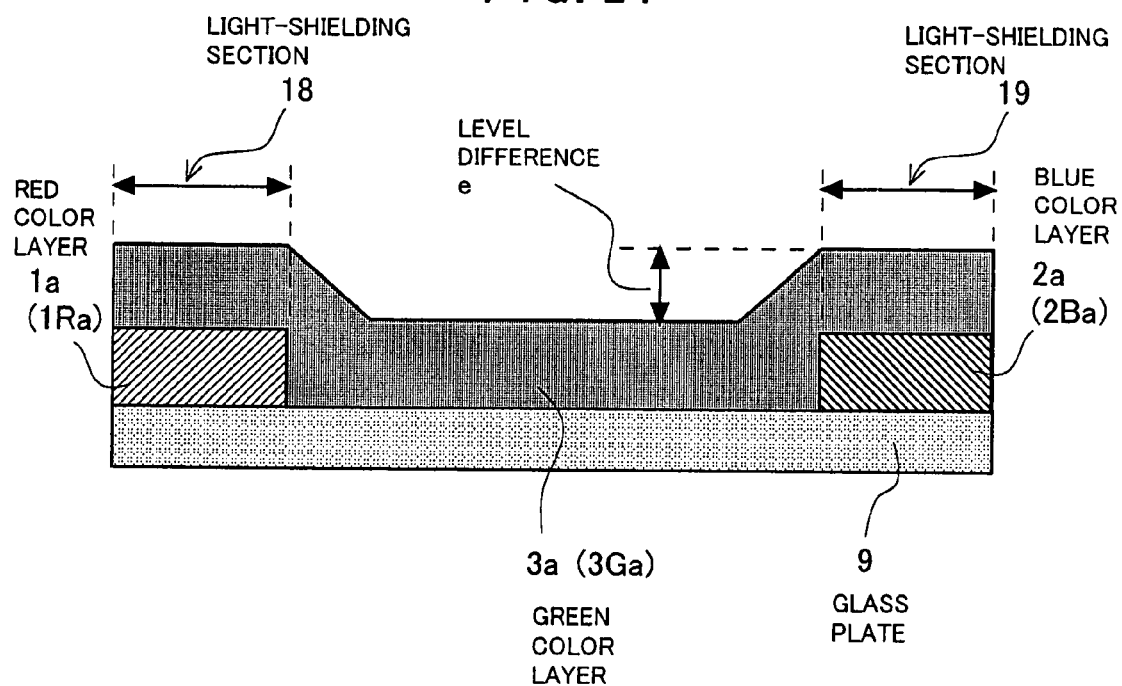
FIG. 21 is an explanatory partial cross-sectional view along the line XXI-XXI in FIG. 20B.

The red pixel formation sections 1Ra of the red color layer 1a and the green pixel formation sections 3Ga of the green color layer 3a adjacent thereto are overlapped with each other at their both sides along the Y direction, thereby forming the light-shielding sections 18 along the Y direction (i.e., the red-and-green Y-direction light-shielding sections), as shown in FIG. 21. In other words, the light-shielding operation in the regions intervening between the adjoining red and green pixels along the X direction is carried out by the red-and-green Y-direction light-shielding sections 18 having the two-layer structure of the red and green color layers 1a and 3a.

Similarly, the green pixel formation sections 3Ga of the green color layer 3a and the blue pixel formation sections 2Ba of the blue color layer 2a adjacent thereto are overlapped with each other at their both sides along the Y direction, thereby forming the light-shielding sections 19 along the Y direction (i.e., the green-and-blue Y-direction light-shielding sections), as shown in FIG. 21. In other words, the light-shielding operation in the regions intervening between the adjoining green and blue pixels along the X direction is carried out by the green-and-blue Y-direction light-shielding sections 19 having the two-layer structure of the green and blue color layers 3a and 2a.

The blue pixel formation sections 2Ba of the blue color layer 2a and the red pixel formation sections 1Ra of the red color layer 1a adjacent thereto are overlapped with each other at their both sides along the Y direction, thereby forming the light-shielding sections along the Y direction (i.e., the blue-and-red Y-direction light-shielding sections). (Since this structure is the same as that of light-shielding sections 19, illustration is omitted.) In other words, the light-shielding operation in the regions intervening between the adjoining blue and red pixels along the X direction is carried out by the blue-and-red Y-direction light-shielding sections having the two-layer structure of the bleu and red color layers 2a and 1a.

The red-and-green Y-direction light-shielding sections 18, the green-and-blue Y-direction light-shielding sections 19, and the blue-and-red Y-direction light-shielding sections are used to light-shield the regions corresponding to the data lines 50 (which extend along Y direction) of the TFT substrate 26 (see FIGS. 16, 17, 18A and 18B).

With the color filter according to the second embodiment, as explained above, the X-direction light-shielding sections 12 for light-shielding the regions corresponding to the scanning lines 49 of the TFT substrate 26 have the two-layer structure comprising the red and blue color layers 1a and 2a, which is the same as the light-shielding sections 12 in the first embodiment. On the other hand, the red-and-green Y-direction light-shielding sections 18, the green-and-blue Y-direction light-shielding sections 19, and the blue-and-red Y-direction light-shielding sections for light-shielding the regions corresponding to the data lines 50 of the TFT substrate 26 have the two-layer structures comprising the red and green color layers 1a and 3a, the green and blue color layers 3a and 2a, and the blue and red color layers 2a and 1a, respectively. These Y-direction light-shielding sections may be termed the "adjoining-color overlapped light-shielding sections". This is because each of these three types of the light-shielding sections is formed by overlapping the colored materials for two adjoining pixels with each other. The combination of the X-direction light-shielding sections 12, the red-and-green Y-direction light-shielding sections 18, the green-and-blue Y-direction light-shielding sections 19, and the blue-and-red Y-direction light-shielding sections defines the same pattern as the black matrix. Therefore, they realize the same light-shielding function as the black matrix.

The widths of the blue inter-pixel parts of the blue color layer 2a and the connection sections 2La thereof are slightly larger than the widths of the red inter-pixel parts of the red color layer 1a and the connection sections 1La thereof. Therefore, similar to the first embodiment shown in FIGS. 11A and 12A, the both edges of the blue inter-pixel parts of the blue color layer 2a and the connection sections 2La thereof, which are placed on the red inter-pixel parts of the red color layer 1a or the connection sections 1La thereof, are contacted with the surface of the glass plate 9.

The green color layer 3a comprises the rectangular island-shaped green pixel formation sections 3Ga alone. Thus, like the first embodiment shown in FIGS. 11A, the green pixel formation sections 3Ga are approximately fitted in the green pixel subwindows 1BGa-G of the corresponding blue-and-green pixel windows 1BGa and the green pixel subwindows 2RGa-G of the corresponding red-and-green pixel windows 2RGa. In other words, the sections 3Ga are scarcely overlapped with the X-direction light-shielding sections (which correspond to the light-shielding sections 12 shown in 11A) in the Y direction. Therefore, it may be said that the X-direction light-shielding sections 12 even at the positions on which the sections 3Ga are placed have a two-layer structure comprising the red and blue color layers 1a and 2a.

However, in consideration of the possible alignment errors during the process of forming the red, blue, and green color layers 1a, 2a, and 3a, appropriate margins are given to the patterns for the layers 1a, 2a, and 3a. As a result, the peripheries of the green pixel formation sections 3Ga are slightly overlaid on the X-direction light-shielding sections 12 due to the margins. The overlapped parts of the sections 3Ga and 12 caused by the said overlying protrude above the X-direction light-shielding sections 12.

In addition, the said overlapped parts are linear (belt-shaped) in such a way as to extend along the edges of the respective green pixels along the X direction, which are not rectangular ring-shaped. This is because the edges of the respective green pixels along the Y direction are placed on the red or blue color layer 1a or 2a and never placed on the two-layer structure comprising the layers 1a and 2a.

The cross-sectional view of the part including the green pixel (the green pixel formation section 3Ga) along the Y direction is the same as the first embodiment shown in FIG. 10A. There is a level difference "a" between the green pixel and the X-direction light-shielding section 12 adjoining thereto. The level difference "a" is smaller than the level difference "h" (see FIG. 3A) between the green pixel and the three-layered light-shielding section 133 adjoining thereto of the prior-art color filter (i.e., a<h).

The cross-sectional view of the part including the green pixel (the green pixel formation section 3Ga) along the X direction is shown in FIG. 21A, which is different from the first embodiment. The reason is apparent from FIG. 21A. Specifically, the left-side light-shielding section (i.e., the Y-direction light-shielding section) 18 has a two-layer structure of the red and green color layers 1a and 3a, because the red pixel is adjacent to the said green pixel on its left side. The right-side light-shielding section (i.e., the Y-direction light-shielding section) 19 has a two-layer structure of the blue and green color layers 2a and 3a, because the blue pixel is adjacent to the said green pixel on its right side. In addition, there is a level difference "e" between the said green pixel and the Y-direction light-shielding section 18 or 19 adjoining thereto. The difference "e" is smaller than the level difference "a" (e<a). This is because the Y-direction light-shielding section 18 or 19 has a two-layer structure on which no protruding part exists.

In this way, with the color filter according to the second embodiment, the level difference "a" in the Y-direction cross section can be made smaller than the level difference "h" of the prior-art color filter over the whole effective display region. Moreover, the level difference "e" in the X-direction cross section can be made smaller than the level difference "e".

With the color filter according to the second embodiment of the invention also, the photo spacers 20 are formed. Since the arrangement of the spacers 20 is the same as the first embodiment, the explanation about it is omitted here.

To eliminate the effect of the overlapped parts (protruding parts) on the green pixel formation sections 3Ga, the overlapped parts may be removed by polishing. It is preferred that the overlapped parts are removed by polishing. With the color filter of the second embodiment, the overlapped parts are linear (belt-shaped) along the edges of the sections 3Ga in the X direction, and the gross area of the overlapped parts is less than that of the color filter of the first embodiment. Therefore, by polishing the whole surface of the glass plate 9 with a known polishing apparatus, removal of the overlapped parts can be realized more easily.

Figure 20C:
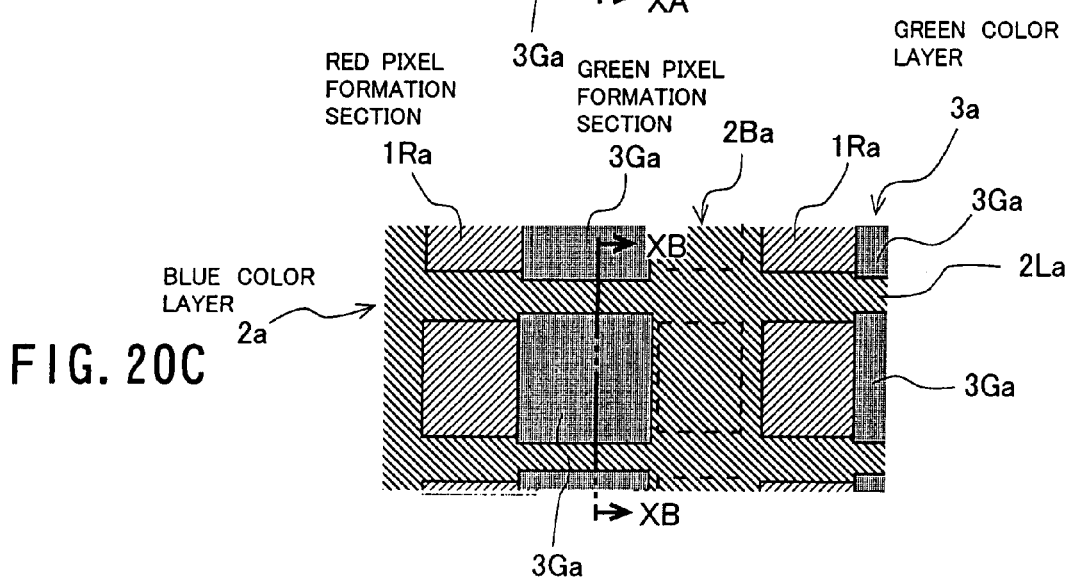

The state after the overlapped parts are removed by polishing is shown in FIG. 20C. The cross-sectional structure along the Y direction is the same as that shown in FIG. 10B for the first embodiment. The cross-sectional structure along the X direction is the same as that shown in FIG. 21.

The arrangement of the photo spacers 20 in the case where the overlapped parts of the sections 3G are removed is the same as that of the first embodiment.

With the color filter according to the second embodiment of the invention, as explained in detail, the red color layer 1a having the shape or pattern of FIG. 19A, the blue color layer 2a having the shape or pattern of FIG. 19B, and the green color layer 3a having the shape or pattern of FIG. 19C are formed on the glass plate 9 to be overlapped. Moreover, the X-direction light-shielding sections 12 for light-shielding the regions corresponding to the scanning lines 49 of the TFT substrate 26 have the two-layer structure comprising the red and blue color layers 1a and 2a. The red-and-green Y-direction light-shielding sections 18, the green-and-blue Y-direction light-shielding sections 19, and the blue-and-red Y-direction light-shielding sections for light-shielding the regions corresponding to the data lines 50 of the TFT substrate 26 have the two-layer structures comprising the red and green color layers 1a and 3a, the green and blue color layers 3a and 2a, and the blue and red color layers 2a and 1a, respectively. The combination of the X-direction light-shielding sections 12, the red-and-green Y-direction light-shielding sections 18, the green-and-blue Y-direction light-shielding sections 19, and the blue-and-red Y-direction light-shielding sections functions as the black matrix. Therefore, a black matrix is unnecessary.

The green pixel formation sections 3Ga of the green color layer 3a, which define the green color pixels by the overlapping with the blue-and-green pixel windows 1BGa of the red color layer 1a and the red-and-green pixel windows 2RGa of the blue color layer 2a, are island-shaped apart from each other. Therefore, by appropriately adjusting the size of the green pixel formation sections 3Ga, the sections 3Ga can be scarcely placed on the overlapped parts of the red and blue color layers 1a and 2a having the function of the X-direction light-shielding sections 12. This means that the level difference between the X-direction light-shielding sections 12 and the red, blue or green pixels can be reduced. In addition, such the reduction of the level difference can be realized by an easy method. This is because the reduction of the level difference between the X-direction light-shielding sections 12 and the red, blue or green pixels can be obtained by making the sections 3Ga of the green color layer 3a island-shaped to be apart from each other.

Moreover, by appropriately adjusting the size of the green pixel formation sections 3Ga of the green color layer 3a, the sections 3Ga can be arranged on the glass plate 9 in such a way that the peripheries of the sections 3Ga are scarcely placed on the overlapped parts of the red and blue color layers 1a and 2a that provide the function of the X-direction light-shielding sections 12. Therefore, the amount of the green color layer 3a (i.e., the green pixel formation sections 3Ga) placed on the X-direction light-shielding sections 12 is limited to a small value. As a result, the sections 3Ga placed on the X-direction light-shielding sections 12 can be easily removed by polishing.

Furthermore, it is sufficient for the invention that the red and blue color layers 1a and 2a are respectively formed to have the stripe-shaped pixel formation sections 1R and 2B and the blue-and-green pixel windows 1BGa or the red-and-green pixel windows 2RGa, and that the green color layer 3a is formed to have the island-shaped pixel formation sections 3Ga. Therefore, the patterning process of the respective color layers 1a, 2a, and 3a to obtain a desired light-shielding performance can be conducted easily.

In addition, with the color filter according to the second embodiment, the X-direction light-shielding sections 12 have the two-layer structure comprising the red and blue color layers 1a and 2a. This is because this combination minimizes the optical transmittance (in other words, it maximizes the OD value). Since the sections 12 may include the red and blue color layers 1a and 2a, the blue color layer 2a may be overlaid on the red color layer 1a as explained above or the red color layer 1a may be overlaid on the blue color layer 2a.

Here, the above-described second embodiment refers to the case that the combination of the X-direction light-shielding sections 12 and the Y-direction light-shielding sections 18 and 19 function correspond to the "inter-pixel light-shielding sections". However, the X-direction light-shielding sections 12 need to be used for the "frame area" that is placed outside the effective display area and that surrounds the effective display area.

LCD Device of Second Embodiment

A LCD device according to the second embodiment of the invention comprises the above-described color filter of the second embodiment and the TFT substrate 26 (see FIGS. 16, 17, 18A, and 18B) used in the first embodiment. This LCD device is designed to operate in the normally black mode. In this device, desired light-shielding sections can be realized using the red and blue color layers 1a and 2a having simpler patterns than the first embodiment, and necessary and sufficient light-shielding performance can be realized.

Since the TFT substrate 26 comprises the field-shielding sections 46a of the common electrodes 46 that shield the leaked electric field, the amount of the leaked electric field is decreased and as a result, backlight leakage due to defective orientation of liquid-crystal molecules is suppressed or avoided. Moreover, the TFT substrate 26 has a structure that makes it possible to shield the backlight with the data lines 50, the common electrode lines 43 and the scanning lines 49 by making these lines 50, 43 and 49 of opaque metal films. Thus, even if the Y-direction light-shielding sections of the color filter are formed by the overlapped parts of any two adjacent color layers, sufficient light-shielding performance for the external light is obtainable.

For example, with the Y-direction light-shielding sections comprising the red and green color layers 1a and 3a, the OD value lowers. However, the reflected light of the external light by the wiring lines (e.g., the data lines 50) on the TFT substrate 26 penetrates through the said Y-direction light-shielding sections twice. Therefore, even if the light-shielding sections comprise the red and green color layers 1a and 3a, sufficient light-shielding effect is obtained and no display quality degradation is seen. However, the TFTs 51 are provided near the scanning lines 49. Thus, to suppress the leakage current of the TFTs 51 induced by light irradiation, it is necessary for the Y-direction light-shielding sections to include the color layer (here, the red color layer 1a) that shields the light of particular wavelength giving large effect to the leakage current.

On the other hand, since unshielded regions that are not shielded by metal wiring lines exist near the scanning lines 49, high OD values are necessary. Therefore, with the X-direction light-shielding sections 12 for shielding the vicinities of the scanning lines 49 that necessitate high OD values, the combination of the red and blue color layers 1a and 2a that minimizes the transmittance is required.

With the LCD device according to the second embodiment using the above-described color filter of the second embodiment, the combination of the red and blue color layers 1a and 2a that minimizes the transmittance of light is used for the X-direction light-shielding sections 12. At the same time, the combination of two adjoining ones of the red, blue, and green color layers 1a, 2a and 3a is used for the Y-direction light-shielding sections 18 and 19 that require not so high OD values. Therefore, compared with the first embodiment where the combination of the red and blue color layers 1 and 2 is used for the entire effective display region, the patterns of the red and blue color layers 1a and 2a can be made simpler while keeping necessary and sufficient light-shielding performance for the LCD device.

Moreover, since the color filter of the second embodiment is used, there is an advantage that high contrast and good color reproductivity can be obtained without a black matrix and that the response characteristics are fast.

LCD Device of Third Embodiment

Figure 22:
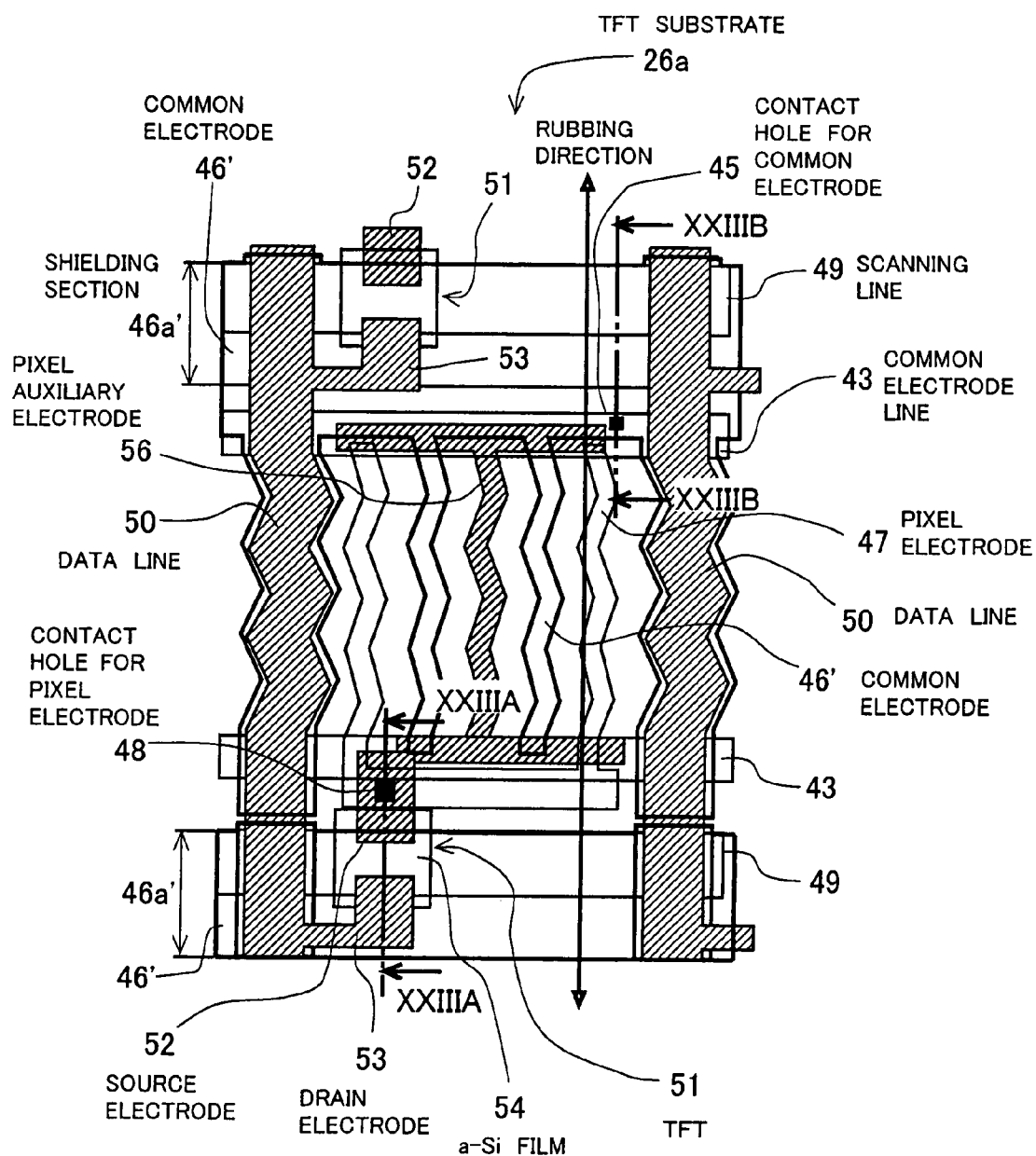
FIG. 22 is a partial plan view showing the structure of the TFT substrate coupled with one of color filters according to third and fourth embodiments of the invention.
Figure 23A:
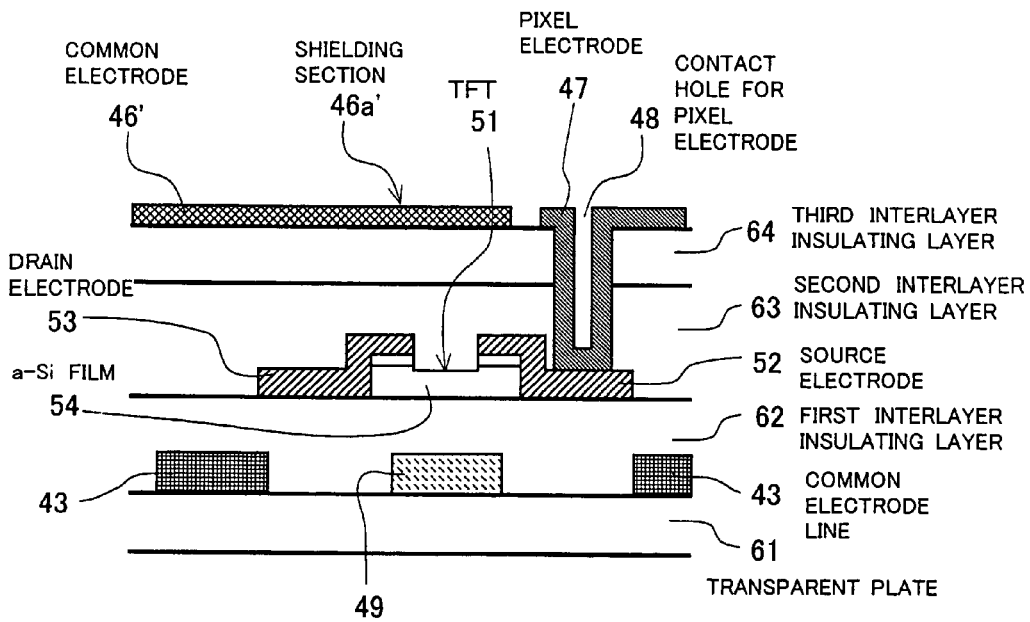
FIG. 23A is an explanatory partial cross-sectional view of the TFT substrate along the line XXIIIA-XXIIIA in FIG. 22.
Figure 23B:
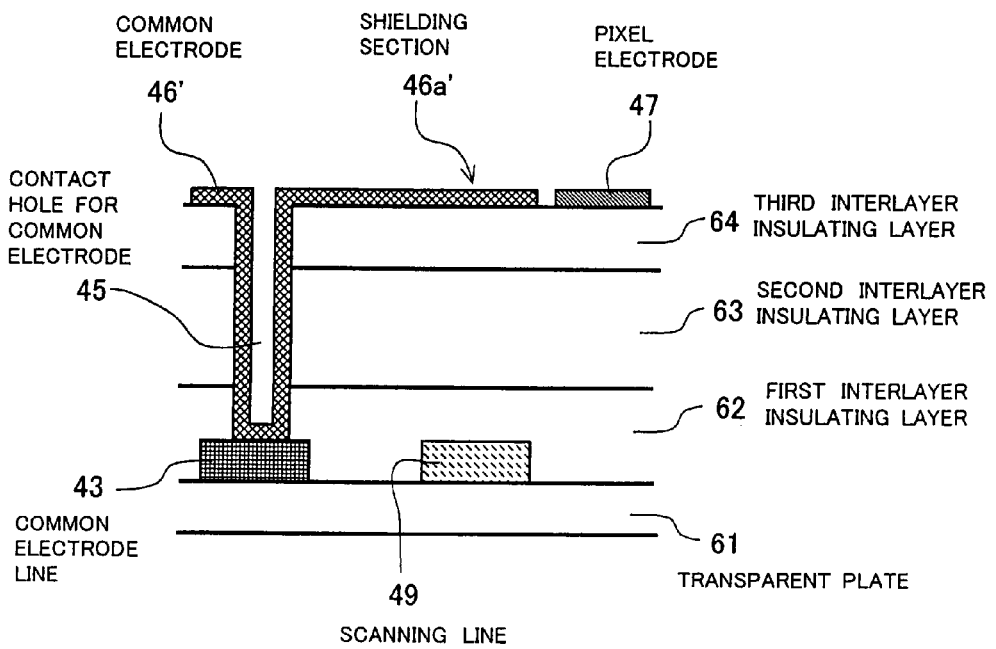
FIG. 23B is an explanatory partial cross-sectional view of the TFT substrate along the line XXIIIB-XXIIIB in FIG. 22.

A LCD device according to a third embodiment of the invention comprises the above-described color filter of the first embodiment and the TFT substrate 26a shown in FIGS. 22, 23A, and 23B, forming the structure shown in FIG. 17.

Figure 4A:
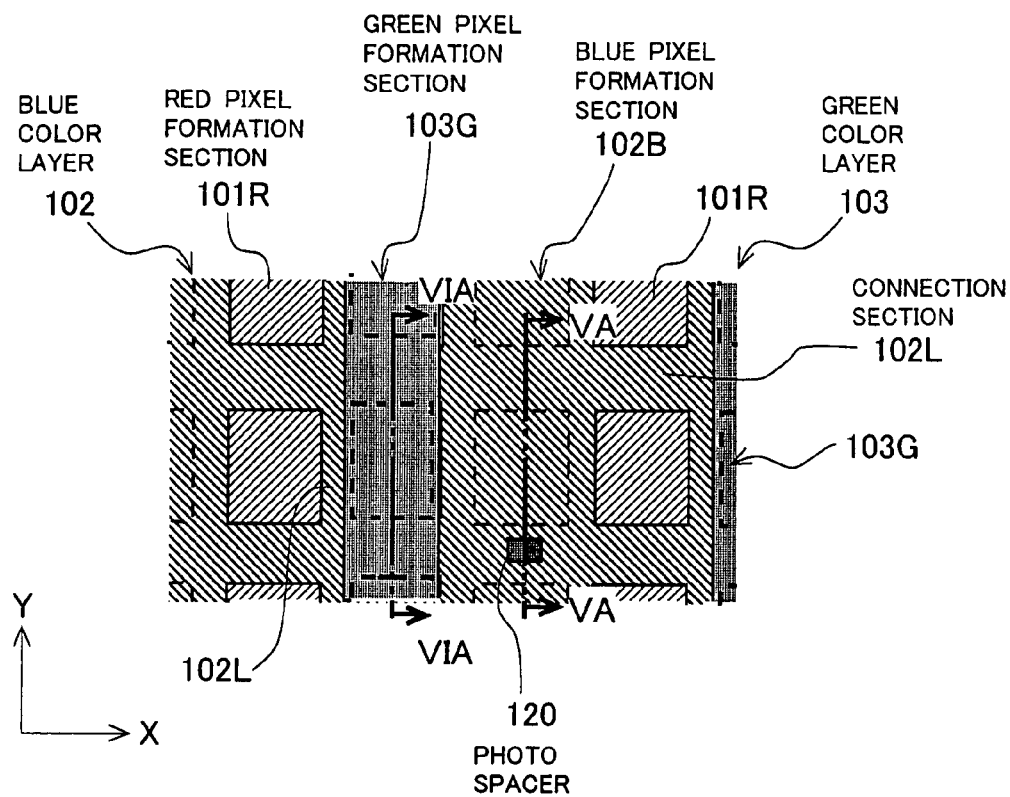
FIGS. 4A and 4B are explanatory partial plan views of the prior-art color filter of FIGS. 1A to 1C showing other examples of the layout of the photo spacers, respectively.
Figure 4B:
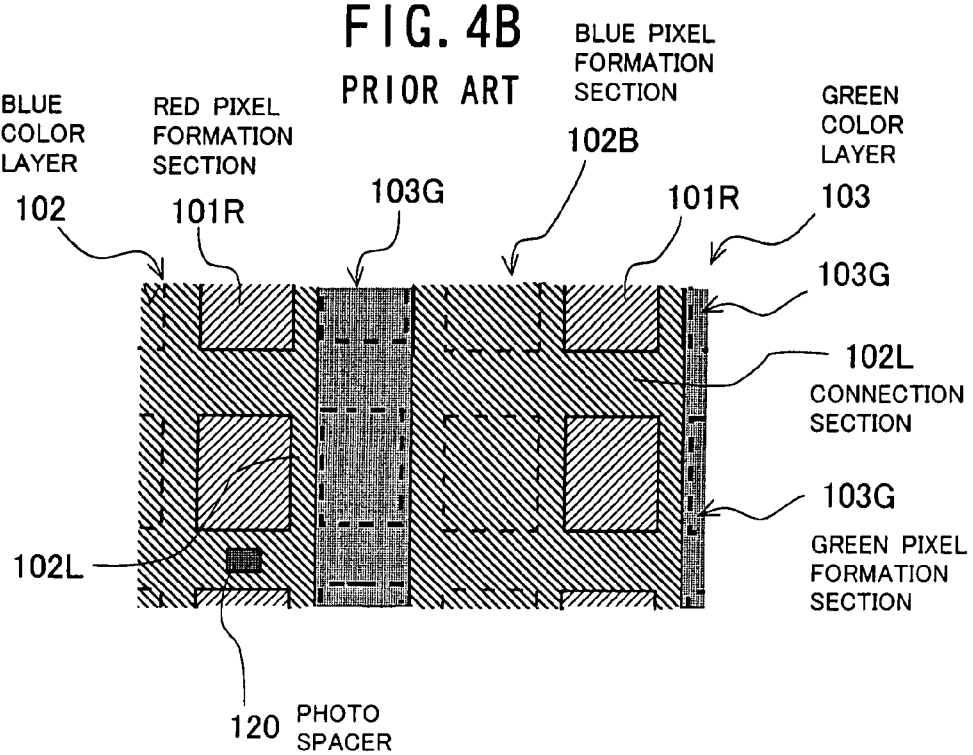

The TFT substrate 26a is approximately the same structure as that shown in FIG. 4 of the Japanese Non-Examined Patent Publication No. 2005-241923 cited in Background of the Invention.

The structure of the TFT substrate 26a is the same as the TFT substrate 26 (see FIGS. 16, 17, and 18A and 18B) except that the common electrodes 46' have a different structure. Therefore, the explanation about the same structure is omitted here by attaching the same reference symbols to the corresponding elements and only the different points will be explained below.

With the TFT substrate 26 used in the first embodiment, as seen from FIG. 16, the common electrodes 46 are formed in such a way that the field-shielding sections 46a of the electrodes 46 do not overlap with the corresponding TFTs 51. On the other hand, with the TFT substrate 26a used in the second embodiment, as seen from FIGS. 22 and 23A, the common electrodes 46' are formed in such a way that the field-shielding sections 46a' of the electrode 46' overlap with the corresponding TFTs 51. The field-shielding sections 46a' prevent the leaked electric field from the scanning lines 49 and the data lines 50 from being applied to the liquid-crystal layer 80. The sections 46a are patterned to overhang the scanning and data lines 49 and 50 on the third interlayer insulating layer 64. By shielding the leaked electric field from the TFT substrate 26 with the field-shielding sections 46a', the amount of electrification of the red, blue and green color layers 1a, 2a, and 3a can be decreased. Therefore, the defective orientation of liquid-crystal molecules (e.g., disclination) is suppressed or avoided and as a result, display defects such as color irregularity can be prevented.

With the TFT substrate 26a, since the field-shielding sections 46a' overhang the TFTs 51, the field-shielding effect is higher than the TFT substrate 26 used in the first embodiment. On the other hand, there is a high possibility that the sections 46a' gives a bad effect to the operation characteristics of the TFTs 51 if the thickness of the second and third interlayer insulating layers 63 and 64 fluctuates toward the smaller side due to errors occurring during the fabrication processes. However, if no problem occurs about the safety margins for the operation characteristics of the LCD device, the TFT substrate 26a may be used without any practical problems.

With the LCD device according to the third embodiment, the color filter of the first embodiment and the TFT substrate 26a shown in FIGS. 22, 23A and 23B are used in combination. Moreover, the difference between the TFT substrates 26 and 26a is the above-described effect caused by the pattern difference of the field-shielding sections 46a'. Therefore, the same advantages as those of the LCD device according to the first embodiment are obtained.

LCD Device of Fourth Embodiment

A LCD device according to a fourth embodiment of the invention comprises the above-described color filter of the second embodiment and the TFT substrate 26a used in the third embodiment, forming the structure shown in FIG. 17.

With the LCD device according to the fourth embodiment, the color filter of the second embodiment and the TFT substrate 26a shown in FIGS. 22, 23A and 23B are used in combination. Moreover, the difference between the TFT substrates 26 and 26a is the above-described effect alone which is caused by the pattern difference of the field-shielding sections 46a'. Therefore, the it is apparent that same advantages as those of the LCD device according to the second embodiment are obtained.

Tests for Color Filters and LCD Devices of the Invention

The above-described color filters according to the first and second embodiments and the above-described LCD devices according to the first to fourth embodiments using the said filters were actually fabricated and thereafter, their effects or advantages were confirmed. The following examples 1 to 4 correspond to the first to fourth embodiments of the invention, respectively.

EXAMPLE 1

First, a red-colored composite (which was generated by dispersing a red pigment in a transparent resin along with an optical initiator, a polymeric monomer, and a solvent) was coated on the surface of the glass plate 9 (the glass plate 71) to have a predetermined thickness with a spin coater. Then, the red-colored composite film thus formed was subject to a reduced-pressure drying process and a pre-bake process. Thereafter, the said film was selectively exposed using a photomask and then, was subjected to a developing process, a cleaning process with water, and a post-bake process, forming the red color layer 1 having the pattern of FIG. 8A.

Following this, in the same way as the red color layer 1 using a blue-colored composite, the blue color layer 2 having the pattern of FIG. 8B was formed to be overlapped with the red color layer 1.

Finally, in the same way as the red color layer 1 using a green-colored composite, the green color layer 3 having the pattern of FIG. 8C was formed to be overlapped with the blue color layer 2.

In this way, the color filter 72 having the red, blue and green pixels and the two-layered light-shielding sections 12 comprising the red and blue color layers 1 and 2 was obtained. The formation order of the red and blue color layers 1 and 2 may be reversed. At this stage, the level difference "f" on the green pixel (the green pixel formation section 3G) in FIG. 12B was 2.0 to 2.5 µm.

In addition, regarding the various alignment markers formed on the opposite substrate 70 simultaneously with the color filter 72, the patterned blue color layer 2 formed solely and/or the two-layered patterned blue and red color layers 2 and 1 were used. This was to ensure the recognizability of monochromatic cameras frequently used for various processes and laser sensors for the wavelength of approximately 600 nm.

Subsequently, the overlapped parts (protruding parts) 10 of the green color layer 3 on the light-shielding sections 12 were removed by polishing the entire surface of the glass plate 9. At this stage, the thicknesses of the red, blue, and green color layers 1, 2, and 3 in the pixels were 2.0 µm, 2.0 µm, and 2.0 µm, respectively. The chromaticity of the respective color layers 1, 2, and 3 were adjusted to satisfy the EBU standard.

Furthermore, a liquid of transparent thermosetting resin was coated on the whole surface of the color filter using a spin coater to form a transparent thermosetting resin film. The film was cured in an oven to form the overcoat layer 23 (73). The thickness of the overcoat layer 23 (73) was approximately 1.0 µm. At this stage, the level difference "f" (see FIG. 12B) on the green pixel (the green pixel formation section 3G) was approximately 1.5 µm.

Thereafter, on the overcoat layer 23 (73) thus formed, a photosensitive resin was coated with a spin coater to form a photosensitive resin film. Next, this film was subjected to a reduced-pressure drying process and a pre-bake process. Then, this film was selectively exposed using a photomask and was subjected to a developing process, a cleaning process with water, and a post-bake process, forming the photo spacers 20 (81). At this stage, by adjusting the height of the spacers 20 (81), the cell gap was set at 3.0 μm. These spacers 20 (81), which have the shape shown in FIGS. 13A and 13B, were located to be overlapped with the green color layer 3 on the light-shielding sections 12. In this way, the opposite substrate 70 on which the color filter 72 of the first embodiment was mounted was obtained.

The arrangement of the photo spacers 20 may be changed to the positions overlapped with the red or blue color layer 1 or 2 over the light-shielding sections 12 as necessary. Moreover, the photo spacers 20 may be placed at the positions overlapped with two of the red, blue and green color layers 1, 2 and 3 over the light-shielding sections 12 or at the positions overlapped with all the color layers 1, 2 and 3.

On the other hand, the TFT substrate 26 shown in FIG. 16 was formed in the following way.

First, a metal film (e.g., Cr film or Al alloy film) was deposited on the transparent plate 61 and then, the metal film was patterned to form the scanning lines 49 and the common electrode lines 43. Next, on the metal film thus patterned, a silicon nitride layer was formed as the first interlayer insulating layer 62, where the first interlayer insulating layer 62 serves as the gate insulating films. Thus, the scanning lines 49 and the common electrode lines 43 were covered with the first interlayer insulating layer 62.

Next, on the first interlayer insulating layer 62, an a-Si film and an n-type a-Si film were successively deposited and patterned, forming the a-Si film 54. A metal film (e.g., Cr film or Al alloy film) was then formed on the first interlayer insulating layer 62 and was patterned to form the pixel auxiliary electrodes 56, the data lines 50 and the drain and source electrodes 53 and 53 of the TFTs 51.

Thereafter, the structure thus formed was covered with an insulating film made of an organic resin, inorganic silicon nitride or the like as the second interlayer insulating layer 63. Then, an insulating film made of an organic resin, inorganic silicon nitride or the like as the third interlayer insulating layer 64 was formed on the second interlayer insulating layer 63.

The second and third interlayer insulating layers 63 and 64 were selectively etched to form the contact holes 48 for the pixel electrodes 47, where the contact holes 48 reach the corresponding pixel electrodes 47 and the source electrodes 52. The first, second and third interlayer insulating layers 62, 63 and 64 were selectively etched to form the contact holes 45 for the common electrodes 46, where the contact holes 45 reach the corresponding common electrodes 46 and the common electrode lines 43.

Furthermore, a transparent conductive film such as ITO was formed on the third interlayer insulating layer 64 and patterned, forming the pixel electrodes 47 and the common electrodes 46. At this stage, the pixel electrodes 47 were electrically connected to the corresponding pixel and source electrodes 47 and 52 by way of the corresponding contact holes 48. The common electrodes 46 were electrically connected to the corresponding common electrode lines 43 by way of the corresponding contact holes 45.

In this way, the TFT substrate 26 with the structure of FIG. 16 was obtained.

On the inner surfaces of the opposite substrate 70 (on which the color filter of the first embodiment was mounted) and the TFT substrate 26, alignment layers 74 and 65 were respectively formed by coating. Rubbing process was applied to the alignment layer 65 in such a way that the rubbing direction for the TFT substrate 26 (i.e., the initial alignment direction of the liquid-crystal molecules) accorded with the longitudinal direction of the pixel electrodes 47 (i.e., the direction of the arrow in FIG. 16). Similar rubbing process was applied to the alignment layer 74.

After a sealing material was coated on the peripheries of the substrates 70 and 26, the substrates 70 and 26 were coupled. A liquid crystal was injected into the gap between the substrates 70 and 26 and thereafter, the gap was sealed with the sealing material. At this stage, the liquid-crystal layer 80 was formed between the substrates 70 and 26. The cell gap was set at 3.0 μm.

If the liquid crystal is injected into the gap by the known dropping method, after a sealing material is coated on the peripheries of the substrates 70 and 26, a liquid crystal is dropped on the inner surface(s) of at least one of the substrates 70 and 26. Thereafter, the substrates 70 and 26 are coupled and the gap is sealed.

Subsequently, the polarizer plates 76 and 66 were attached to the outer surfaces of the opposite and TFT substrates 70 and 26, respectively. Wiring was carried out for the backlight module, the board for supplying the signals and the external power, or the like. Thus, the LCD device was fabricated.

EXAMPLE 2

First, a red-colored composite (which was generated by dispersing a red pigment in a transparent resin along with an optical initiator, a polymeric monomer, and a solvent) was coated on the surface of the glass plate 9 (the glass plate 71) to have a predetermined thickness with a spin coater. Then, the red-colored composite film was subject to a reduced-pressure drying process and a pre-bake process. Thereafter, the film was selectively exposed using a photomask and then, was subjected to a developing process, a cleaning process with water, and a post-bake process, forming the red color layer la having the pattern of FIG. 19A.

Following this, in the same way as the red color layer la using a blue-colored composite, the blue color layer 2a having the pattern of FIG. 19B was formed to be overlapped with the red color layer 1a.

Finally, in the same way as the red color layer la using a green-colored composite, the green color layer 3a having the pattern of FIG. 19C was formed to be overlapped with the blue color layer 2a.

In this way, the color filter 72 was obtained, which has the red, blue and green pixels, the X-direction light-shielding sections 12, the red-and-green Y-direction light-shielding sections 18, the green-and-blue Y-direction light-shielding sections 19, and the blue-and-red Y-direction light-shielding sections. The X-direction light-shielding sections 12 were used for light-shielding the corresponding regions to the scanning lines 49 on the TFT substrate 26a. The red-and-green, green-and-blue, and blue-and-red Y-direction light-shielding sections 18 and 19 were used for light-shielding the corresponding regions to the data lines 50 on the TFT substrate 26a. The formation order of the red and blue color layers 1a and 2a may be reversed.

The X-direction light-shielding sections 12 had the two-layer structure comprising the red and blue color layers 1a and 2a. The red-and-green Y-direction light-shielding sections 18 had the two-layer structure comprising the red and green color layers 1a and 3a. The green-and-blue Y-direction light-shielding sections 19 had the two-layer structure comprising the green and blue color layers 3a and 2a. The blue-and-red Y-direction light-shielding sections had the two-layer structure comprising the blue and red color layers 2a and 1a.

Subsequently, the overlapped parts (protruding parts) 10 of the green color layer 3a on the two-layered X-direction light-shielding sections 12 comprising the red and blue color layers 1a and 2a were removed by polishing the entire surface of the glass plate 9. At this stage, the thicknesses of the red, blue, and green color layers 1a, 2a, and 3a in the pixels were 2.0 μm, 2.0 μm, and 2.0 μm, respectively. The chromaticity of the respective color layers 1a, 2a, and 3a was adjusted to satisfy the EBU standard.

Furthermore, a liquid of transparent thermosetting resin was coated on the whole surface of the color filter using a spin coater to form a transparent thermosetting resin film. The film was cured in an oven to form the overcoat layer 23 (73). The thickness of the overcoat layer 23 (73) was approximately 1.0 μm. At this stage, the level difference "f" (see FIG. 13B) on the green pixel (the green pixel formation section 3Ga) was approximately 1.0 μm.

Thereafter, on the overcoat layer 23 (73) thus formed, a photosensitive resin was coated with a spin coater to form a photosensitive resin film. Next, this film was subjected to a reduced-pressure drying process and a pre-bake process. Then, this film was selectively exposed using a photomask and was subjected to a developing process, a cleaning process with water, and a post-bake process, forming the photo spacers 20 (81). At this stage, by adjusting the height of the spacers 20 (81), the cell gap was set at 3.0 μm.

On the inner surfaces of the opposite substrate 70 (on which the color filter of the example 1 was mounted) fabricated in the above-mentioned way and the TFT substrate 26 fabricated in the same way as the example 1, alignment layers 74 and 65 were respectively formed by coating. Similar rubbing processes to the example 1 were applied to the alignment layers 74 and 65.

After a sealing material was coated on the peripheries of the substrates 70 and 26, the substrates 70 and 26 were coupled. A liquid crystal was injected into the gap between the substrates 70 and 26 and thereafter, the gap was sealed with the sealing material. The cell gap was set at 3.0 μm.

Subsequently, the polarizer plates 76 and 66 were attached to the outer surfaces of the opposite and TFT substrates 70 and 26, respectively. Wiring was carried out for the backlight module, the board for supplying the signals and the external power, or the like. Thus, the LCD device was fabricated.

EXAMPLE 3

The opposite substrate 70 (on which the color filter of the example 1 was mounted) fabricated in the same way as the example 1 and the TFT substrate 26a fabricated in the same way as the third embodiment were coupled. A liquid crystal was injected into the gap between the substrates 70 and 26a and thereafter, the gap was sealed with the sealing material. The cell gap was set at 3.0 μm. Thereafter, the LCD device was obtained through the same process steps as those of the example 1.

EXAMPLE 4

The opposite substrate 70 (on which the color filter of the example 2 was mounted) fabricated in the same way as the example 2 and the TFT substrate 26a fabricated in the same way as the third embodiment were coupled. A liquid crystal was injected into the gap between the substrates 70 and 26a and thereafter, the gap was sealed with the sealing material. The cell gap was set at 3.0 μm. Thereafter, the LCD device was obtained through the same process steps as those of the example 2.

COMPARATIVE EXAMPLE 1

Figure 2:
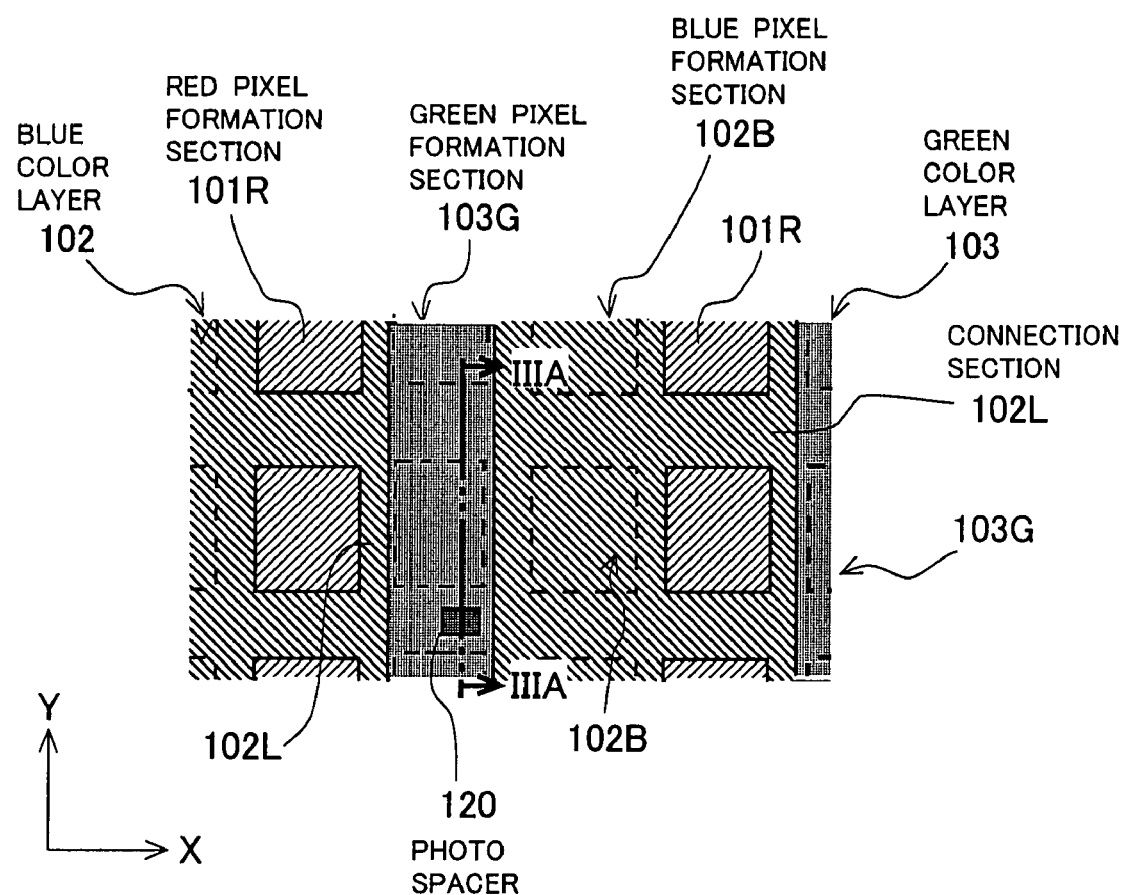
FIG. 2 is an explanatory partial plan view of the prior-art color filter comprising the color layers of FIGS. 1A to 1C, which shows an example of the layout of the photo spacers.
Figure 3B:
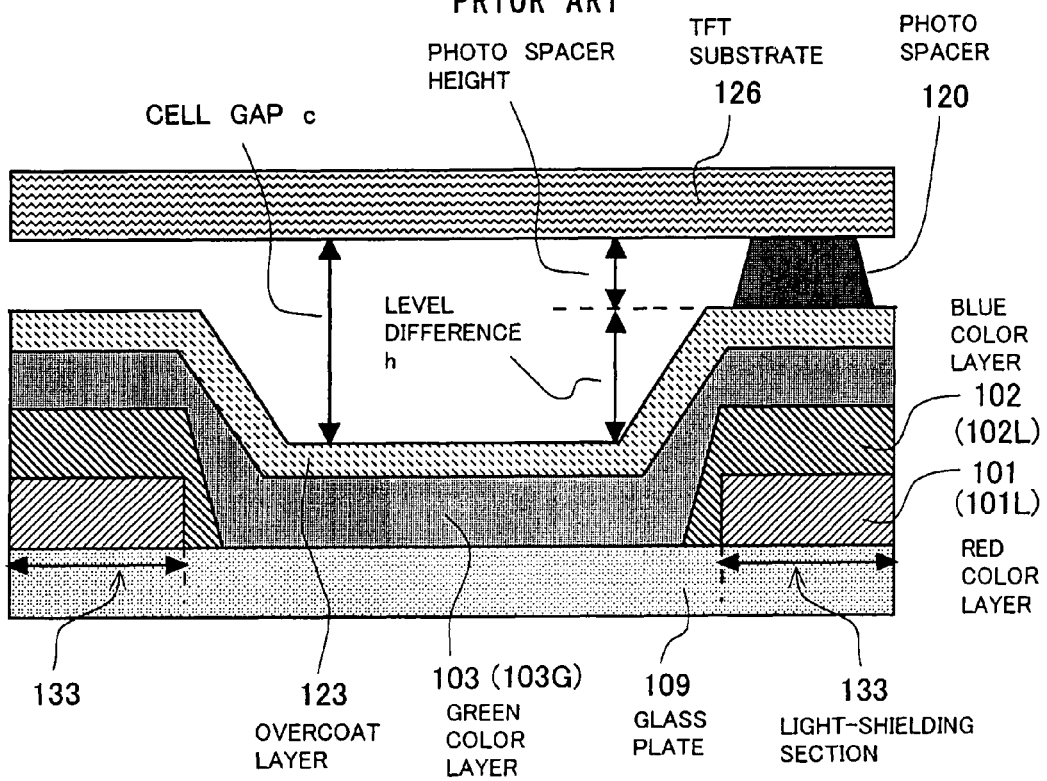
FIG. 3B is an explanatory partial cross-sectional view showing the state where the TFT substrate is coupled with the structure of FIG. 3A.

Using the red, blue, and green color layers 101, 102 and 103 shown in FIGS. 1A, 1B and 1C, the prior-art color filter of FIG. 2 was fabricated through the method described in BACKGROUND OF THE INVENTION.

With this prior-art color filter, the light-shielding sections 133 had the three-layer structure comprising the red, blue and green color layers 101, 102 and 103, and the light-shielding sections 133a had the two-layer structure comprising the red and blue color layers 101 and 102. The thicknesses of the red, blue, and green color layers 101, 102, and 103 in the pixels were 2.0 μm, 2.0 μm, and 2.0 μm, respectively. The thickness of the overcoat layer 123 was approximately 1.0 μm. The level difference "h" (see FIG. 3A) on the green pixels (the green pixel formation sections 103G) was approximately 2.5 μm. The height of the photo spacers 120 (81) was adjusted in such a way that the cell gap was 3.0 μm. The photo spacers 120 (81) were arranged on the light-shielding sections 133 to be overlapped with the green color layers 103, as shown in FIG. 2.

The opposite substrate was fabricated using the prior-art color filter thus fabricated and thereafter, it was coupled with the prior-art TFT substrate shown in FIG. 7 (where the common electrodes 146 do not have the field-shielding sections for shielding the leaked electric field from the TFTs 151). In this way, the prior-art LCD device was fabricated.

COMPARATIVE EXAMPLE 2

Using the red, blue, and green color layers 101, 102 and 103 shown in FIGS. 1A, 1B and 1C, the prior-art color filter of FIG. 4A was fabricated through the method described in BACKGROUND OF THE INVENTION.

Figure 5A:
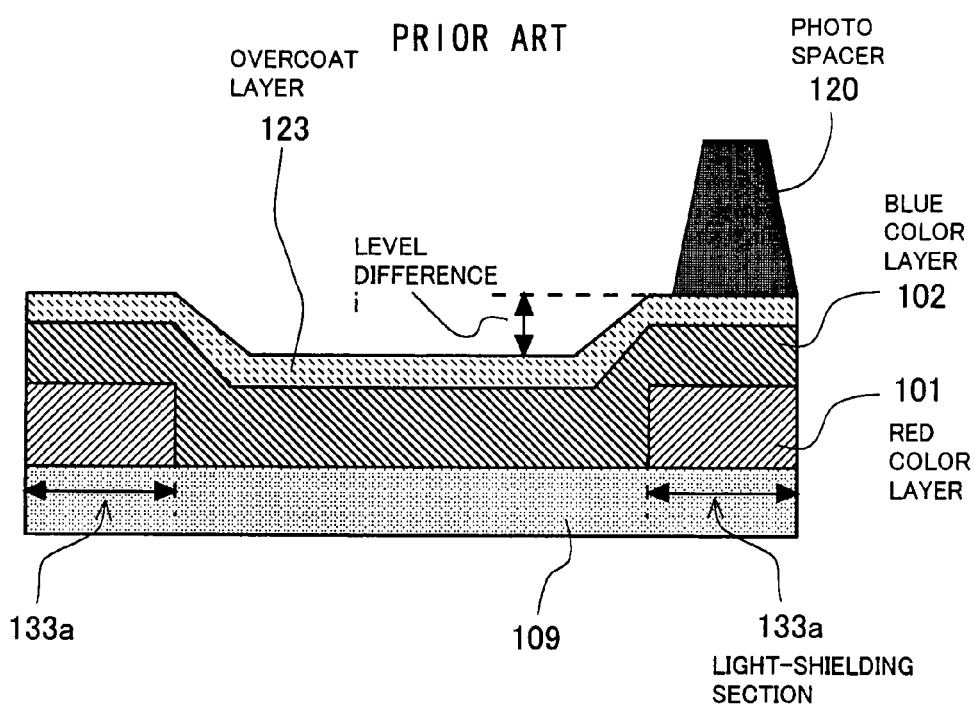
FIG. 5A is an explanatory partial cross-sectional view along the line VA-VA in FIG. 4A.
Figure 5B:
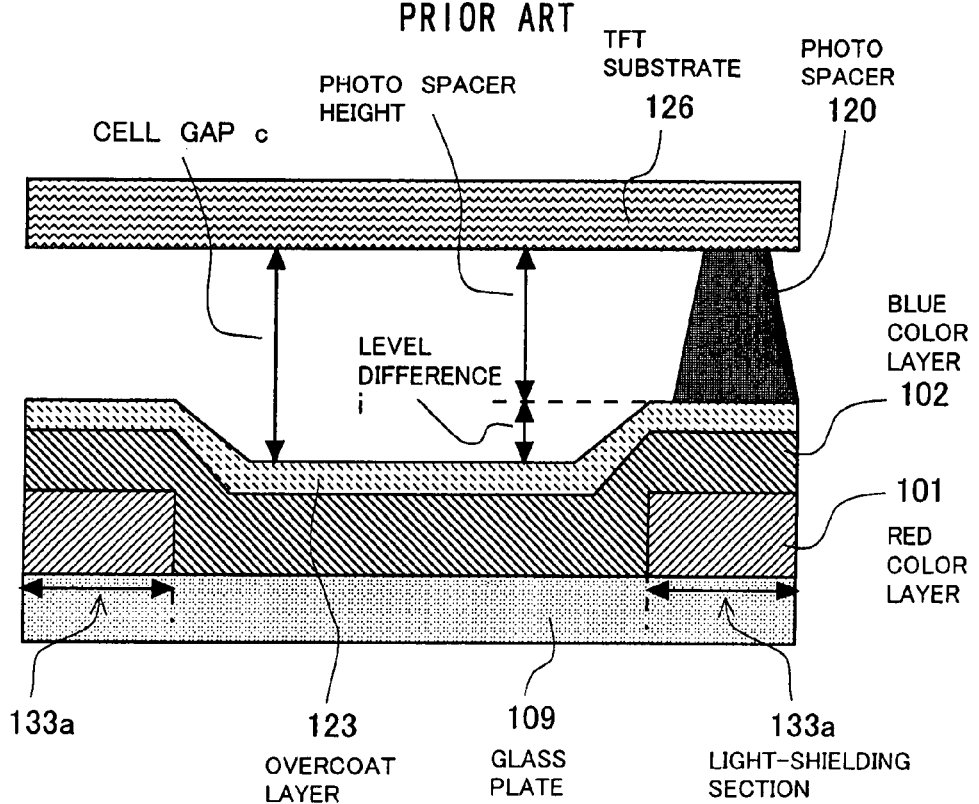
FIG. 5B is an explanatory partial cross-sectional view showing the state where the TFT substrate is coupled with the structure of FIG. 5A.
Figure 6A:
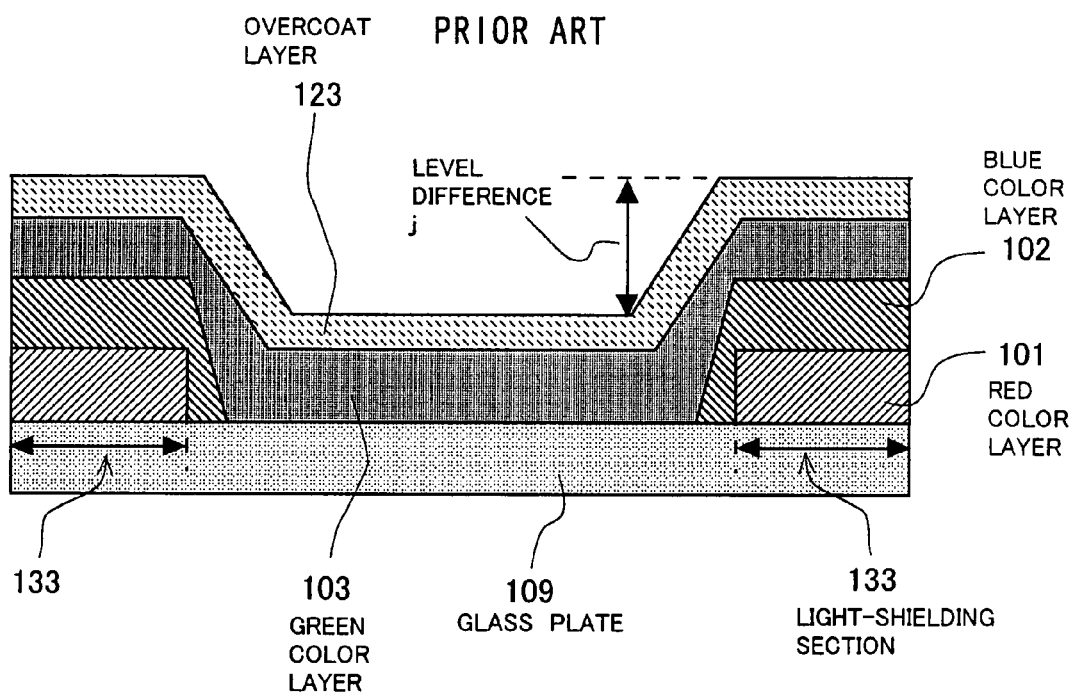
FIG. 6A is an explanatory partial cross-sectional view along the line VIA-VIA in FIG. 4A.

With this prior-art color filter, the light-shielding sections 133 had the three-layer structure comprising the red, blue and green color layers 101, 102 and 103, and the light-shielding sections 133a had the two-layer structure comprising the red and blue color layers 101 and 102. The thicknesses of the red, blue, and green color layers 101, 102, and 103 in the pixels were 2.0 μm, 2.0 μm, and 2.0 μm, respectively. The thickness of the overcoat layer 123 was approximately 1.0 μm. The level difference "i" (see FIG. 5A) on the blue pixels (the blue pixel formation sections 102B) was approximately 1.0 μm. The level difference "j" (see FIG. 6A) on the green pixels (the green pixel formation sections 103G) was approximately 2.5 μm. The height of the photo spacers 120 (81) was adjusted in such a way that the cell gap was 3.0 μm. The photo spacers 120 (81) were arranged on the two-layered light-shielding sections 133a to be overlapped with the blue color layers 102, as shown in FIG. 4A.

The opposite substrate was fabricated using the above-described prior-art color filter and thereafter, it was coupled with the prior-art TFT substrate shown in FIG. 7 (where the common electrodes 146 do not have the field-shielding sections for shielding the leaked electric field from the TFTs 151). In this way, the prior-art LCD device was fabricated.

Evaluation

The evaluation results for the above-described examples 1 to 4 and the above-described comparative examples 1 and 2 are shown in Table 1 below.

TABLE 1

|  | CONTRAST LEVEL | CELL GAP & UNEVENNESS | JUDGMENT |
| --- | --- | --- | --- |
| EXAMPLE 1 | 2 | 2 | ○ |
| EXAMPLE 2 | 3 | 1 | ○ |
| EXAMPLE 3 | 1 | 2 | ○ |
| EXAMPLE 4 | 2 | 1 | ○ |
| COMPARATIVE EXAMPLE 1 | 5 | 4 | X |
| COMPARATIVE EXAMPLE 2 | 5 | 5 | X |

The "contrast level" and "cell gap & unevenness" in TABLE 1 were evaluated according to the five-grade system from 1 to 5, where Level 1 is the best. The "JUDGMENT" in TABLE 1 was evaluated according to the two-grade system, where "○" means that the display quality is good while "X" means that the display quality is not good (bad).

Regarding the examples 1 to 4, the evaluation results for both "contrast level" and "cell gap & unevenness" were the best or near the best. This means that no problem occurred for the display quality.

With the color filters of the examples 2 and 4, not only the level difference on the green pixels was reduced but also the said level difference was eliminated by surface polishing.

With the LCD devices of the examples 1 to 4, it was confirmed that sufficient light-shielding performance was realized without damaging the cell gap formation.

Regarding the comparative example 1, the level difference "h" (see FIGS. 3A and 3B) on the green pixels was extremely large. Moreover, since the photo spacers 120 were arranged on the three-layered light-shielding sections 133, the height of the spacers 120 was extremely small due to the excessive difference "h". As a result, local gap defects were likely to occur.

Figure 6B:
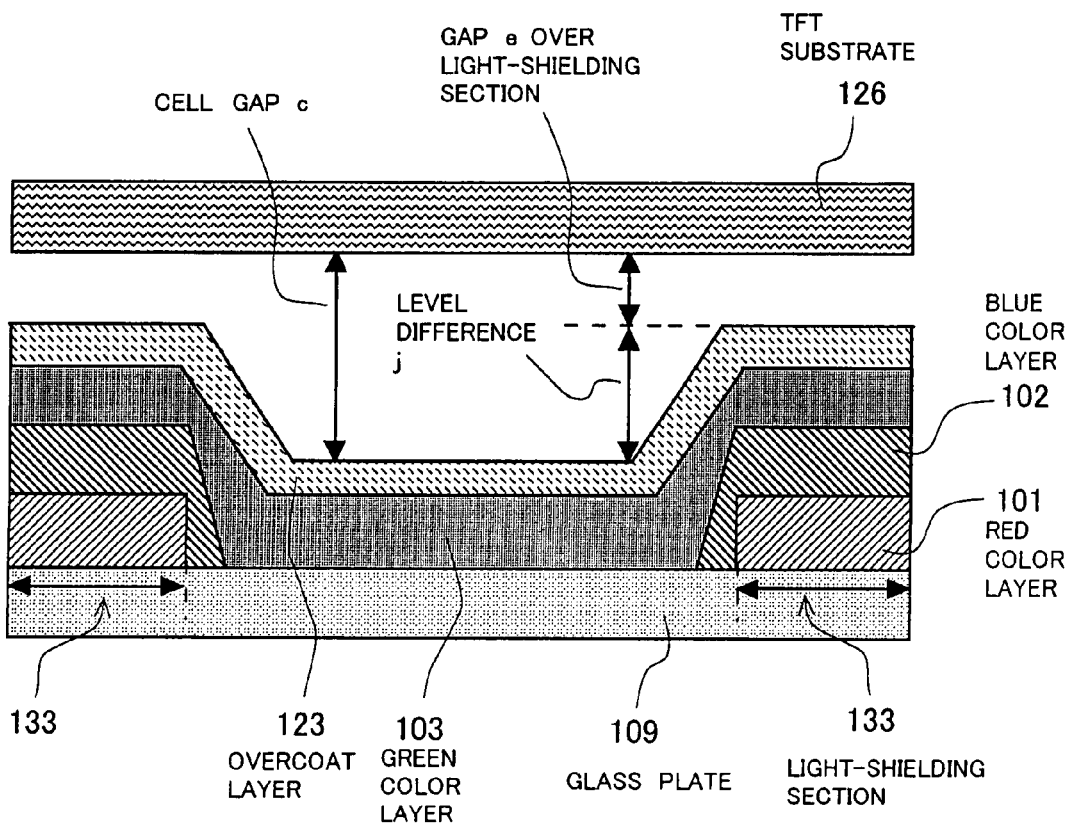
FIG. 6B is an explanatory partial cross-sectional view showing the state where the TFT substrate is coupled with the structure of FIG. 6A.

Regarding the comparative example 2, the level difference "j" (see FIGS. 6A and 6B) on the green pixels was approximately 2.5 μm. Since the cell gap was 3.0 μm, the gap "e" on the light-shielding sections 133 was approximately 0.5 μm, which means that the opposite substrate nearly contacted the TFT substrate. Moreover, since the gap "e" on the light-shielding sections 133 was as small as approximately 0.5 μm, foreign objects were likely to be caught in such the narrowed gap.

Variations

The above-described first to fourth embodiments are preferred embodied examples of the present invention. Therefore, it is needless to say that the present invention is not limited to these embodiments. Any other modification is applicable to the embodiments.

For example, in the above-described embodiments of the invention, color layers of three primary colors (i.e., red, blue and green color layers) are used. However, the invention is not limited to this. Four or more color layers may be used, where other color layer(s) is/are added to the three primary color layers. However, if the light-shielding sections are formed by the combination of the color layers that minimizes the optical transmittance, it is preferred that the level difference between the pixels adjacent to the light-shielding sections is smaller than the cell gap.

Moreover, in the above-described embodiments, the pixels are rectangular and arranged according to the stripe layout. However, the invention is not limited to this. The shape of the pixels may be changed to any other one. The arrangement or layout of the pixels may be the mosaic or delta or the like.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A color filter, comprising:
a transparent support;
a first color layer formed on the transparent support, in a plan view, the first color layer having stripe-shaped first color pixel formation sections, second color pixel windows, and third color pixel windows, which are arranged at predetermined intervals, respectively;
a second color layer formed to overlap with the first color layer, in the plan view, the second color layer having stripe-shaped second color pixel formation sections, first color pixel windows, and third color pixel windows, which are arranged at predetermined intervals, respectively; and, in the plan view,
a third color layer having island-shaped third color pixel formation sections apart from each other,
wherein the first color pixel formation sections of the first color layer are overlapped with the first color pixel windows of the second color layer, thereby defining first color pixels, and the second color pixel formation sections of the second color layer are overlapped with the second color pixel windows of the first color layer, thereby defining second color pixels,
wherein the third color pixel formation sections of the third color layer are arranged in the third color pixel windows of the first color layer and the third color pixel windows of the second color layer, the third color pixel windows of the first color layer being overlapped with the third color pixel windows of the second color layer, thereby defining third color pixels, and
wherein overlapped parts of the first color layer and the second color layer function as light-shielding sections.

2. The color filter according to claim 1, wherein the first color pixel formation sections of the first color layer are arranged along a first direction at predetermined intervals and are extended along a second direction perpendicular to the first direction, and the second and third color pixel windows of the first color layer are defined by connection sections that connect the first color pixel formation sections adjacent to each other, and
wherein the second color pixel formation sections of the second color layer are arranged along the first direction at predetermined intervals and are extended along the second direction, and the first and third color pixel windows of the second color layer are defined by connection sections that connect the second color pixel formation sections adjacent to each other.

3. The color filter according to claim 1, wherein peripheries of the third color pixel formation sections are overlapped with the light-shielding sections to have overlapped widths of 5.0 μm or less.

4. The color filter according to claim 3, further comprising spacers arranged to bury or fill the overlapped peripheries of the third color pixel formation sections with the light shielding sections.

5. The color filter according to claim 1, wherein peripheries of the third color pixel formation sections are not overlapped with the light-shielding sections.

6. The color filter according to claim 5, further comprising spacers arranged on the light-shielding sections.

7. The color filter according to claim 1, wherein the first color layer comprises one of a red color layer and a blue color layer, and the second color layer comprises the other of the red color layer and the blue color layer.

8. The color filter according to claim 1, wherein the first color layer or the second color layer comprises a red color layer.

9. A liquid-crystal display device comprising:
a first substrate having the color filter according to claim 1; and
a second substrate having active elements for switching.

10. The device according to claim 9, wherein the device is designed to operate in a normally black mode,
wherein a common electrode formed on the second substrate comprises shielding sections for shielding electric field leaked from the second substrate, and
wherein the shielding sections conduct their light-shielding operation in vicinities of scanning lines formed on the second substrate.

11. The device according to claim 9, wherein first light shielding sections of the color filter are used for shielding light at corresponding locations to scanning lines formed on the second substrate, and
wherein second light-shielding sections of the color filter are used for shielding light at corresponding locations to data lines formed on the second substrate.

12. The device according to claim 9, wherein second light-shielding sections of the color filter are assigned to locations where backlight is shielded by wiring lines formed on the second substrate, and
wherein first light-shielding sections of the color filter are assigned to locations where backlight is not shielded by wiring lines formed on the second substrate.

13. The color filter according to claim 1, wherein among the first color layer, the second color layer, and the third color layer, only the third color layer has island-shaped color pixel formation sections.

14. The color filter according to claim 1, wherein the overlapped parts of the first color layer and the second color layer form the light-shielding sections without the third color layer.

15. The color filter according to claim 1, wherein the first color pixel formation sections of the first color layer are arranged along a first direction at predetermined intervals and are extended along a second direction perpendicular to the first direction, and the second and third color pixel windows of the first color layer are defined by connection sections that connect the first color pixel formation sections adjacent to each other,
wherein the second color pixel formation sections of the second color layer are arranged along the first direction at predetermined intervals and are extended along the second direction, and the first and third color pixel windows of the second color layer are defined by connection sections that connect the second color pixel formation sections adjacent to each other, and
wherein peripheries of the third color pixel formation sections are overlapped with the light-shielding sections to have overlapped widths of 5.0 µm or less.

16. The color filter according to claim 1, wherein the first color pixel formation sections of the first color layer are arranged along a first direction at predetermined intervals and are extended along a second direction perpendicular to the first direction, and the second and third color pixel windows of the first color layer are defined by connection sections that connect the first color pixel formation sections adjacent to each other, wherein the second color pixel formation sections of the second color layer are arranged along the first direction at predetermined intervals and are extended along the second direction, and the first and third color pixel windows of the second color layer are defined by connection sections that connect the second color pixel formation sections adjacent to each other, and
wherein the color filter further comprises spacers arranged to bury or fill overlapped peripheries of the third color pixel formation sections with the light shielding sections.

17. A method of fabricating a color filter, said method comprising
forming a first color layer on a transparent support, in a plan view, the first color layer having stripe-shaped first color pixel formation sections, second color pixel windows, and third color pixel windows, which are arranged at predetermined intervals, respectively;
forming a second color layer to overlap with the first color layer, in the plan view, the second color layer having stripe-shaped second color pixel formation sections, first color pixel windows, and third color pixel windows, which are arranged at predetermined intervals, respectively; and, in the plan view,
forming a third color layer having island-shaped third color pixel formation sections apart from each other,
wherein in the forming the second color layer, the first color pixel formation sections of the first color layer are overlapped with the first color pixel windows of the second color layer, thereby defining first color pixels, and the second color pixel formation sections of the second color layer are overlapped with the second color pixel windows of the first color layer, thereby defining second color pixels,
wherein in the forming the third color layer, the third color pixel formation sections of the third color layer are arranged in the third color pixel window of the first color layer and the third color pixel windows of the second color layer, the third color pixel windows of the first color layer being overlapped with the third color pixel windows of the second color layer, thereby defining third color pixels, and
wherein overlapped parts of the first color layer and the second color layer function as light-shielding sections.

18. The method according to claim 17, wherein in forming the first color layer, the first color pixel formation sections of the first color layer are arranged along a first direction at predetermined intervals and are extended along a second direction perpendicular to the first direction,
wherein the second color pixel windows and the third color pixel windows of the first color layer are defined by connection sections that connect the first color pixel formation sections thereof adjacent to each other,
wherein in forming the second color layer, the second color pixel formation sections of the second color layer are arranged along the first direction at predetermined intervals and are extended along the second direction, and
the first color pixel windows and the third color pixel windows of the second color layer are defined by connection sections that connect the second color pixel formation sections thereof adjacent to each other.

19. The method according to claim 17, wherein in the forming the third color layer, peripheries of the third color pixel formation sections are overlapped with the light shielding sections to have overlapped widths of 5.0 μm or less.

20. The method according to claim 19, further comprising forming spacers in such a way as to bury or fill the overlapped peripheries of the third color pixel formation sections with the light-shielding sections.

21. The method according to claim 17, wherein after the forming the third color layer is completed, polishing the third color layer is carried out to remove peripheries of the third color pixel formation sections placed on the light-shielding sections.

22. The method according to claim 17, wherein the first color layer comprises one of a red color layer and a blue color layer, and the second color layer comprises the other of the red color layer and the blue color layer.

23. The method according to claim 17, wherein the first color layer or the second color layer comprises a red color layer.

24. The method according to claim 17, wherein among the first color layer, the second color layer, and the third color layer, only the third color layer has island-shaped color pixel formation sections.

25. The method according to claim 17, wherein the overlapped parts of the first color layer and the second color layer form the light-shielding sections without the third color layer.

* * * * *